US010593034B2

(12) United States Patent
Spinella et al.

(10) Patent No.: US 10,593,034 B2
(45) Date of Patent: Mar. 17, 2020

(54) RESISTANCE WELDING FASTENERS, APPARATUS AND METHODS FOR JOINING DISSIMILAR MATERIALS AND ASSESSING JOINTS MADE THEREBY

(71) Applicant: Arconic Inc., Pittsburgh, PA (US)

(72) Inventors: Donald J. Spinella, Greensburg, PA (US); Daniel Bergstrom, Sarver, PA (US); Stanley E. Wojciechowski, Waco, TX (US); Robert Wilcox, West Hurley, NY (US); Justin K. Williams, Indiana, PA (US)

(73) Assignee: Arconic Inc., Pittsburgh, PA (US)

( * ) Notice: Subject to any disclaimer, the term of this patent is extended or adjusted under 35 U.S.C. 154(b) by 338 days.

(21) Appl. No.: 15/469,161

(22) Filed: Mar. 24, 2017

(65) Prior Publication Data

US 2017/0316556 A1 Nov. 2, 2017

Related U.S. Application Data

(63) Continuation-in-part of application No. 15/266,331, filed on Sep. 15, 2016, now Pat. No. 10,507,514.
(Continued)

(51) Int. Cl.
*B21J 15/02* (2006.01)
*B23K 11/20* (2006.01)
(Continued)

(52) U.S. Cl.
CPC .............. *G06T 7/001* (2013.01); *B21J 15/02* (2013.01); *B21J 15/28* (2013.01); *B21J 15/32* (2013.01);
(Continued)

(58) Field of Classification Search
CPC .......... G06T 7/001; G06T 2207/30136; B23K 11/0066; B23K 11/20; B23K 11/0053;
(Continued)

(56) References Cited

U.S. PATENT DOCUMENTS 2,096,598 A * 10/1937 Sheane ................... F16B 19/04
411/501
2,302,772 A 11/1942 Huck
(Continued)

FOREIGN PATENT DOCUMENTS

CN 101375066 A 2/2009
CN 101590598 12/2009
(Continued)

OTHER PUBLICATIONS

International Search Report and Written Opinion dated Nov. 15, 2017, issued by the European Patent Office in International Application No. PCT/US2017/024093 (22 pages).
(Continued)

*Primary Examiner* — Robert F Long
(74) *Attorney, Agent, or Firm* — Greenberg Traurig, LLP

(57) ABSTRACT

An apparatus and method for method for joining materials includes a rivet that may extend through a first sheet to be resistance welded to a second sheet. The head of the rivet has a cavity and vents allowing adhesive extruded from a pilot hole to be received in the cavity and vented in a direction parallel to the first sheet. The rivet is deformed to an hourglass shape that fills the pilot hole and displaces the first sheet into the cavity. Rivet dimension allow for holding with a robotic gripper that can be withdrawn before welding. Methods of monitoring joint quality include comparing welding parameter profiles and images of good and discrepant joints.

25 Claims, 33 Drawing Sheets

Related U.S. Application Data

(60) Provisional application No. 62/313,363, filed on Mar. 25, 2016.

(51) Int. Cl.

| | | |
|---|---|---|
| *G06T 7/00* | (2017.01) | |
| *B21J 15/28* | (2006.01) | |
| *B21J 15/32* | (2006.01) | |
| *G01B 11/24* | (2006.01) | |
| *B23K 11/00* | (2006.01) | |
| *B23K 103/04* | (2006.01) | |
| *B23K 103/00* | (2006.01) | |
| *B23K 103/18* | (2006.01) | |
| *B23K 103/08* | (2006.01) | |
| *B23K 103/20* | (2006.01) | |
| *B23K 103/16* | (2006.01) | |

(52) U.S. Cl.
CPC ...... *B23K 11/0053* (2013.01); *B23K 11/0066* (2013.01); *B23K 11/20* (2013.01); *G01B 11/24* (2013.01); *B23K 2103/04* (2018.08); *B23K 2103/15* (2018.08); *B23K 2103/16* (2018.08); *B23K 2103/18* (2018.08); *B23K 2103/20* (2018.08); *B23K 2103/42* (2018.08); *G06T 2207/30136* (2013.01)

(58) Field of Classification Search
CPC ............ B23K 2103/18; B23K 2103/16; B23K 2103/15; B23K 2103/42; B23K 2103/20; B23K 2103/04; B21J 15/32; B21J 15/28; B21J 15/02; G01B 11/24
USPC .... 227/56–58, 119–120, 123–129, 132–139; 173/13–14, 53–56, 90–115, 118, 173/202–203, 128, 130–133, 210–211, 173/141, 144, 147–149, 162.1–162.2, 173/213, 165, 170–171
See application file for complete search history.

(56) References Cited

U.S. PATENT DOCUMENTS

| | | | |
|---|---|---|---|
| 2,319,455 A | | 5/1943 | Hardman et al. |
| 2,410,398 A | * | 10/1946 | Williams, Jr. .......... F16B 19/06 411/501 |
| 2,563,107 A | | 8/1951 | Fanger |
| 2,569,059 A | | 9/1951 | Huff et al. |
| 3,095,951 A | | 7/1963 | Rood et al. |
| 3,104,312 A | | 9/1963 | Gentry |
| 3,400,509 A | | 9/1968 | Setzer |
| 3,576,964 A | | 5/1971 | Williams |
| 3,774,009 A | | 11/1973 | Hodges |
| 3,858,024 A | | 12/1974 | Hinden |
| 4,119,827 A | | 10/1978 | Lenox |
| 4,355,531 A | * | 10/1982 | Rosman ................... B21J 15/02 29/243.529 |
| 4,650,951 A | | 3/1987 | Koga et al. |
| 4,677,473 A | | 6/1987 | Okamoto et al. |
| 5,030,814 A | | 7/1991 | Tange et al. |
| 5,273,386 A | | 12/1993 | Luhm |
| 5,365,654 A | * | 11/1994 | Moulton ................. F16B 19/04 257/E23.086 |
| 5,473,134 A | | 12/1995 | Susgin |
| 5,557,835 A | * | 9/1996 | Brandts ................... B21J 15/02 29/243.54 |
| 5,644,830 A | * | 7/1997 | Ladouceur ............. B23P 19/062 29/432.2 |
| 5,697,521 A | | 12/1997 | Dixon |
| 5,725,541 A | * | 3/1998 | Anspach ............ A61B 17/0401 606/151 |
| 5,739,498 A | | 4/1998 | Sunamoto et al. |
| 5,939,498 A | | 8/1999 | Sunamoto et al. |
| 6,037,559 A | | 3/2000 | Okabe et al. |
| 6,054,668 A | | 4/2000 | Van Otteren et al. |
| 6,247,209 B1 | * | 6/2001 | Pferdehirt ............... A44B 1/08 24/113 MP |
| 6,291,792 B1 | | 9/2001 | Fussnegger |
| 6,414,261 B1 | | 7/2002 | Maetschke |
| 6,515,251 B1 | | 2/2003 | Wind |
| 6,796,454 B1 | | 9/2004 | Matthews et al. |
| 7,030,333 B2 | | 4/2006 | Bradley |
| 7,176,401 B2 | | 2/2007 | Sakoda |
| 7,267,736 B2 | | 9/2007 | Hou et al. |
| 7,645,105 B2 | | 1/2010 | Hengel et al. |
| 7,870,656 B2 | | 1/2011 | Eberlein |
| 7,880,112 B2 | | 2/2011 | Hengel et al. |
| 8,230,571 B2 | * | 7/2012 | Kovac ................... B23P 19/062 29/243.53 |
| 8,261,422 B2 | * | 9/2012 | Babej ................... B23P 19/062 29/432.1 |
| 8,424,961 B2 | | 4/2013 | Carsley et al. |
| 8,461,484 B2 | | 6/2013 | Tetzlaff et al. |
| 8,466,386 B2 | | 6/2013 | Wang |
| 8,552,332 B2 | | 10/2013 | Aoyama |
| 8,595,914 B2 | | 12/2013 | Koppitz et al. |
| 8,596,092 B2 | * | 12/2013 | Kawai ................. H01L 21/4803 65/56 |
| 8,920,095 B2 | | 12/2014 | Baugh, Sr. |
| 8,973,248 B2 | | 3/2015 | Honnikoppa |
| 9,012,029 B2 | | 4/2015 | Lang et al. |
| 9,021,688 B2 | | 5/2015 | Krejci |
| 9,067,276 B2 | | 6/2015 | Koppitz et al. |
| 9,174,298 B2 | | 11/2015 | Kasukawa et al. |
| 10,208,781 B2 | * | 2/2019 | Campbell ............... F16B 19/08 |
| 2001/0054635 A1 | * | 12/2001 | Schmitz ................ B25C 5/1693 227/15 |
| 2002/0121069 A1 | * | 9/2002 | Smeja ..................... E04D 5/142 52/746.11 |
| 2002/0134817 A1 | | 9/2002 | Shepard |
| 2004/0022603 A1 | | 2/2004 | Litwinski et al. |
| 2004/0169017 A1 | | 9/2004 | Sakoda |
| 2005/0133483 A1 | | 6/2005 | Hou et al. |
| 2005/0161442 A1 | | 7/2005 | Bradley |
| 2005/0183885 A1 | * | 8/2005 | Lo ....................... H01R 9/0515 174/261 |
| 2006/0213954 A1 | | 9/2006 | Ruther et al. |
| 2007/0295698 A1 | | 12/2007 | Hengel et al. |
| 2008/0085568 A1 | | 4/2008 | Wang et al. |
| 2008/0193255 A1 | | 8/2008 | Hengel et al. |
| 2008/0229570 A1 | | 9/2008 | Koppitz et al. |
| 2008/0235932 A1 | * | 10/2008 | Wang ................... B23K 11/115 29/464 |
| 2008/0296267 A1 | | 12/2008 | Hill |
| 2009/0128625 A1 | | 5/2009 | Loipetsberger |
| 2009/0139821 A1 | | 6/2009 | Koppitz et al. |
| 2009/0260413 A1 | | 10/2009 | Tomchick |
| 2009/0261075 A1 | | 10/2009 | Aoyama |
| 2009/0294410 A1 | | 12/2009 | Iwase et al. |
| 2010/0084380 A1 | | 4/2010 | Tetzlaff et al. |
| 2010/0140243 A1 | | 6/2010 | Roddy et al. |
| 2010/0183897 A1 | | 7/2010 | Nobuhiro et al. |
| 2010/0193210 A1 | * | 8/2010 | Krauter .................. B25F 5/006 173/171 |
| 2011/0097142 A1 | | 4/2011 | Bassler |
| 2011/0159313 A1 | | 6/2011 | Kasukawa et al. |
| 2013/0122327 A1 | | 5/2013 | Sheu et al. |
| 2013/0189023 A1 | | 7/2013 | Spinella |
| 2013/0192050 A1 | * | 8/2013 | LeMieux ................ B21J 15/28 29/524.1 |
| 2013/0247672 A1 | | 9/2013 | Lev et al. |
| 2013/0270229 A1 | | 10/2013 | Pedersen et al. |
| 2014/0096366 A1 | | 4/2014 | Honnikoppa |
| 2015/0000956 A1 | | 1/2015 | Spinella |
| 2015/0001187 A1 | | 1/2015 | Spinella |
| 2015/0001189 A1 | | 1/2015 | Spinella et al. |
| 2015/0144602 A1 | | 5/2015 | Draht et al. |
| 2015/0165544 A1 | | 6/2015 | Mesa et al. |
| 2015/0184689 A1 | | 7/2015 | Godfrey |
| 2015/0217395 A1 | | 8/2015 | Spinella |

(56) References Cited

U.S. PATENT DOCUMENTS

| | | | |
|---|---|---|---|
| 2015/0251240 A1* | 9/2015 | LeMieux | B21J 15/28 29/715 |
| 2015/0258624 A1 | 9/2015 | Draht et al. | |
| 2015/0317786 A1 | 11/2015 | Spinella et al. | |
| 2015/0330884 A1 | 11/2015 | Spinella et al. | |
| 2016/0158873 A1 | 6/2016 | Amedick et al. | |
| 2016/0167158 A1 | 6/2016 | Spinella et al. | |
| 2017/0023038 A1 | 1/2017 | Izuhara | |
| 2019/0223297 A1* | 7/2019 | Chen | H01R 43/205 |

FOREIGN PATENT DOCUMENTS

| | | |
|---|---|---|
| CN | 101653861 A | 2/2010 |
| CN | 101890564 | 11/2010 |
| CN | 102133682 | 7/2011 |
| CN | 204221184 | 3/2015 |
| CN | 205629649 | 10/2016 |
| DE | 42 40 823 | 10/1993 |
| DE | 4237361 | 9/1996 |
| DE | 100 59 659 | 6/2002 |
| DE | 102004025493 | 12/2005 |
| DE | 102005006253 | 3/2007 |
| DE | 102007036416 | 2/2009 |
| DE | 102004025492 | 8/2009 |
| DE | 102009055608 A1 | 5/2011 |
| DE | 102009044888 | 6/2011 |
| DE | 102010006670 | 8/2011 |
| DE | 102010026040 | 1/2012 |
| DE | 102010034183 | 2/2012 |
| DE | 10060390 | 4/2012 |
| DE | 102011055044 | 5/2013 |
| DE | 10 2012 010 870 A1 | 12/2013 |
| DE | 102012013589 | 1/2014 |
| DE | 10 2012 018 866 A1 | 3/2014 |
| DE | 102012013325 | 10/2014 |
| DE | 102014211222 | 12/2015 |
| EP | 0865860 | 9/1998 |
| EP | 1090745 A1 | 4/2001 |
| EP | 2671662 | 12/2013 |
| EP | 2722124 | 4/2014 |
| EP | 3031564 | 6/2016 |
| EP | 3023650 B1 | 9/2017 |
| GB | 964117 | 7/1964 |
| GB | 1528730 | 10/1979 |
| JP | H07-185832 | 7/1995 |
| JP | 7-214338 | 8/1995 |
| JP | 8-132252 | 5/1996 |
| JP | H10265881 A | 10/1998 |
| JP | H11-13395 | 1/1999 |
| JP | H11209827 A | 8/1999 |
| JP | 11-315335 | 11/1999 |
| JP | 2000-87164 | 3/2000 |
| JP | 2000087162 A | 3/2000 |
| JP | 2000-144290 | 5/2000 |
| JP | 2003293060 A | 10/2003 |
| JP | 2005-161352 | 6/2005 |
| JP | 2009-183975 | 8/2009 |
| JP | 2009-285678 A | 12/2009 |
| JP | 20100025615 | 2/2010 |
| JP | 2010-168622 | 8/2010 |
| JP | 2010207898 | 9/2010 |
| JP | 2011-086933 | 7/2011 |
| JP | 2012103136 | 5/2012 |
| JP | 2012-197176 A | 10/2012 |
| JP | 2015-62916 | 4/2015 |
| JP | 2016-183217 | 10/2016 |
| KR | 10-2014-0030644 | 6/2014 |
| WO | 2006084609 | 8/2006 |
| WO | 2009135553 | 11/2009 |
| WO | 2011095191 | 8/2011 |
| WO | 2012041515 | 4/2012 |
| WO | 2012041516 | 4/2012 |
| WO | 2013064618 | 5/2013 |
| WO | 2013/096669 A2 | 6/2013 |
| WO | 2013102572 | 7/2013 |
| WO | 2013/178542 A1 | 12/2013 |
| WO | 2014/048885 | 4/2014 |
| WO | 2014/167566 | 10/2014 |
| WO | 2014210266 | 12/2014 |
| WO | 2014210278 | 12/2014 |
| WO | 2015117059 | 8/2015 |
| WO | 2016100179 | 6/2016 |

OTHER PUBLICATIONS

Extended European Search Report dated Jan. 5, 2018, issued by the European Patent Office in European Patent Application No. 15788691.2.

Written Opinion of the International Searching Authority dated Apr. 19, 2016, issued in International Application No. PCT/US2015/055287.

Third Party Observation received by the International Bureau on May 11, 2016 in International Patent Application No. PCT/US2015/055287.

European Aluminium Association, The Aluminium Automotive Manual, Joining Dissimilar Materials, (2015), pp. 1-31.

FDS, Produkte, Verbindungstechnik, EJOT Industrie, <http://www.industrie.ejot.de/Verbindungstechnik/Produkte/FDS%3Csup%3E%26reg%3B%3C-sup%3E/p/VBT_FDS>.

First Office Action issued in regard to Chinese Patent Application for Invention No. 201410299463.2, dated Dec. 17, 2015 {with English translation).

International Search Report and Written Opinion of the International Searching Authority dated Feb. 16, 2016 regarding International Patent Application No. PCT/US2015/065491.

International Search Report and Written Opinion of the International Searching Authority dated Jun. 10, 2015 in reference to International Patent Application No. PCT/US2015/014062.

International Search Report and Written Opinion of the International Searching Authority dated Oct. 30, 2014 in reference to International Patent Application No. PCT/US2014/044267.

International Search Report and Written Opinion of the International Searching Authority dated Oct. 30, 2014 in reference to International Patent Application No. PCT/US2014/044286.

Main Alloys Cast and Chemical Composition, downloaded from http://www.sssmile.com.tw on 12115/2016.

Meschut, G. et al., Hybrid technologies for joining ultra-high-strength boron steels with aluminum alloy sfor lightweight car body structures, Procedia CIRP, 23, (2014), pp. 19-23.

Non-Final Office Action regarding U.S. Appl. No. 14/315,698, dated Dec. 22, 2016.

PCT Application No. PCT/US15/65491, filed Dec. 14, 2015.

Second Office Action issued in regard to Chinese Patent Application for Invention No. 201410299463.2, dated Sep. 12, 2016 {with English translation).

Weickum, B., Friction Bit Joining of 5754 Aluminum to DP980 Ultra-High-Strength Steel: A Feasibility Study, All Theses and Dissertations, (2011), Paper 2789.

International Search Report and Written Opinion dated Dec. 21, 2016 in International Patent Application No. PCT/US2016/051870.

\* cited by examiner

Rivet to Pilot Tolerance — Centered — +/-$D_p$/3 off Center

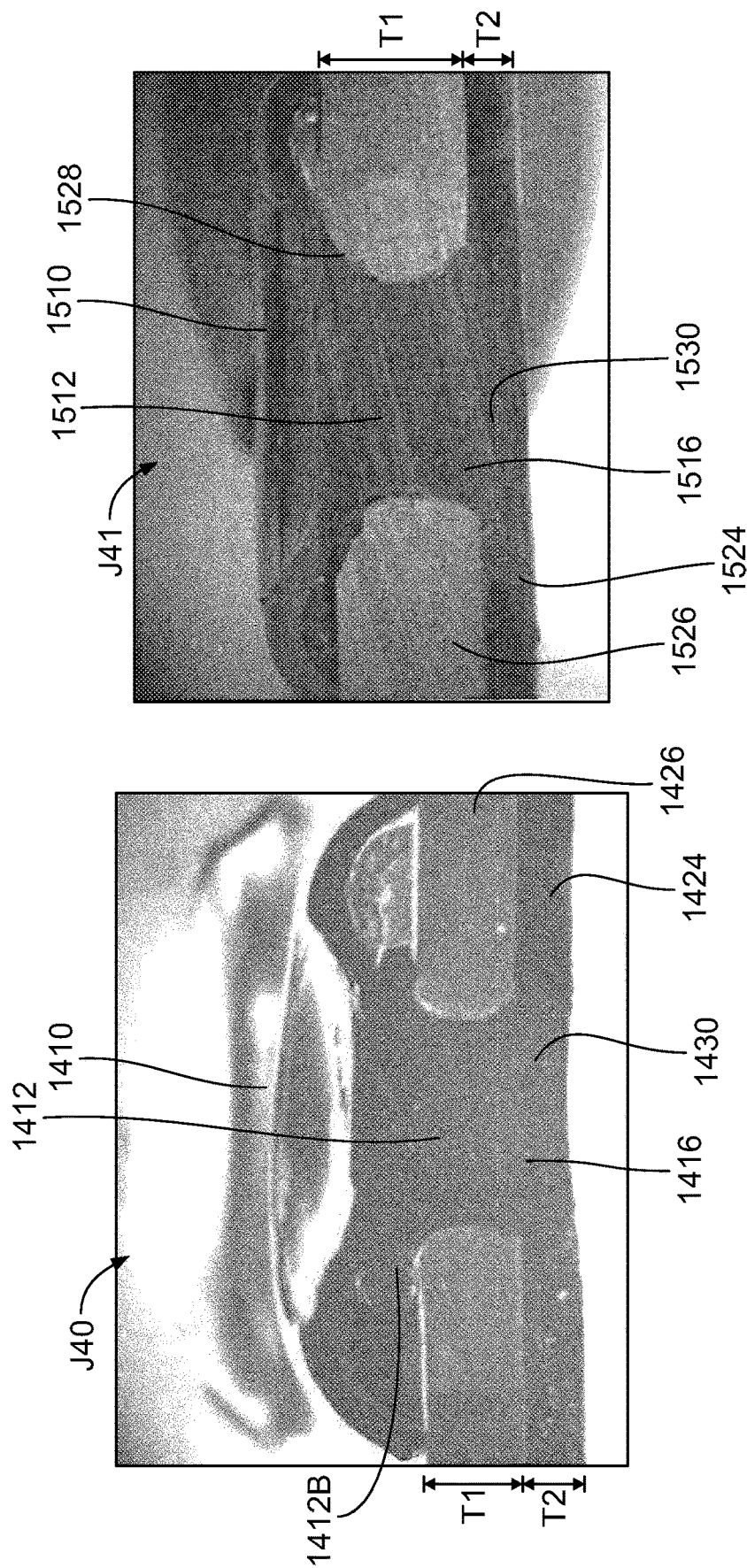

RESISTANCE WELDING FASTENERS, APPARATUS AND METHODS FOR JOINING DISSIMILAR MATERIALS AND ASSESSING JOINTS MADE THEREBY

CROSS REFERENCE TO RELATED APPLICATIONS

The present application claims the benefit of U.S. Provisional Application Ser. No. 62/313,363, filed Mar. 25, 2016, entitled, Resistance Welding Fasteners, Apparatus and Methods for Joining Dissimilar Materials and Assessing Joints Made Thereby and U.S. application Ser. No. 15/266,331, filed Sep. 15, 2016, entitled Rivet Feeding Apparatus, which applications are incorporated by reference herein in their entirety.

FIELD

The present invention relates to apparatus, manufactures and methods for joining dissimilar materials and more particularly, relating to electrical resistance spot welding with rivet-like fasteners and to apparatus and methods to facilitate such joining processes, namely, for providing and holding fasteners and for ascertaining weld quality.

BACKGROUND OF THE INVENTION

Technologies for joining materials that differ in composition, such as aluminum and steel, are known, including mechanical clinching, self-pierce riveting, friction stir spot welding, resistance spot welding (RSW), flow drill screws—commonly called EJOTS, friction bit joining—commonly called EJOWELD, Rivtak, resistance spot welding with process tapes—commonly called Deltaspot, GMAW fusion welding—commonly called CMT or cold metal transfer) and Resistance Element Welding (REW). Alternative methods and apparatus for joining dissimilar materials, for feeding fasteners and assessing joints, remain desirable.

SUMMARY

The disclosed subject matter relates to a method for fastening a first material to a second electrically conductive material using electrical resistance welding, including: forming a pilot hole in the first material; placing the first material over the second material; infusing an adhesive in the pilot hole; placing an electrically conductive rivet with a head having a downwardly extending peripheral lip at least partially defining a cavity under the head and a pin that is weldable to the second material in electrical contact with the second material by extending the pin through the adhesive and the pilot hole, the rivet having at least one vent in the head; applying an electrical potential across the rivet and the second material, inducing a current to flow through the rivet and the second material; and urging the rivet towards the second material, the step of applying causing resistive heating of the rivet, the current causing the rivet to weld to the second material forming a weld, the step of urging causing compression of the pin, the head capturing material extruded from the pilot hole during the steps of placing the fastener in electrical contact with the second material, applying the electrical potential, urging and forming the weld.

In accordance with another embodiment, further including the step of venting material from under the head through the at least one vent during the step of applying.

In accordance with another embodiment, the material extruded includes the adhesive and is projected through the at least one vent in a direction parallel to the upper sheet.

In accordance with another embodiment, the rivet pin has a diameter smaller than the pilot hole before the step of applying and the pin expands radially within the pilot hole during the step of urging, the step of urging being conducted in a continuous manner.

In accordance with another embodiment, the pin of the rivet expands radially at the tip thereof to a greater extent than at portions of the pin distal to the tip.

In accordance with another embodiment, the radial expansion of the tip extends between the first material and the second material.

In accordance with another embodiment, the radial expansion of the tip causes the first material to be pushed toward the head.

In accordance with another embodiment, the pushing of the first material causes the first material to enter into the cavity under the head.

In accordance with another embodiment, the first material pushed into the cavity keys into a wall dividing the cavity constraining relative rotation of the first material relative to the head.

In accordance with another embodiment, further including steps of gripping the rivet in a gripper, positioning the rivet in the pilot hole below a welding electrode, moving the welding electrode down on the rivet, pinning the rivet between the electrode and the bottom sheet; and withdrawing the gripper from the rivet before the step of applying the current.

In accordance with another embodiment, the rivet has a grip range ≥20% of the pin length.

In accordance with another embodiment, the tolerance in pilot hole diameter is <9%. In accordance with another embodiment, the tolerance in placement position of the rivet during the step of placing in the pilot hole is between 1.2 and 1.8 times a diameter of the pin.

In accordance with another embodiment, the adhesive is a dielectric and further comprising the step of controlling the direction of current flow by interposing the adhesive between the rivet and the first material during the step of applying.

In accordance with another embodiment, the position of the pin during the step of placement has an off-center tolerance range of at least 1 mm where the pilot hole has a diameter in the range of 3.6 to 12.6 mm and the pin diameter is in the range of 3.0 to 7.0 mm.

In accordance with another embodiment, a method for fastening a first electrically conductive material to a second electrically conductive material using electrical resistance welding, includes: placing the first and second materials together in physical and electrical contact, the first material having a lower melting point than the second material; placing an electrically conductive rivet that is weldable to the second material and which has a higher melting point than the first material in electrical contact with the first material to form an electrically conductive stack inclusive of the rivet, the first material and the second material, the rivet having a head and a pin extending from the head, the head having a downwardly directed peripheral lip at least partially defining a cavity under the head, the pin having a tip distal to the head; applying an electrical potential across the stack, inducing a current to flow through the stack and causing resistive heating, the resistive heating causing a softening of the first material; urging the rivet through the softened first material toward the second material and into contact with the second material, further urging the fastener after contacting the second material resulting in expanding the tip of the fastener in a radial direction, the expansion of the tip pushing the first material toward the head; and after the pin contacts the second material, welding the rivet to the second material; and capturing an upwelled portion of the first material that is displaced when the rivet is urged through the first material and welded to the second material, the upwelled portion being captured within the cavity in the cap.

In accordance with another embodiment, a rivet for fastening a first material having a pilot hole therein to a second material that is electrically conductive using electrical resistance welding, has a head with a downwardly directed reversely curved peripheral lip, a pin extending from the cap and having a tip at an end distal to the head, the pin capable of inserting through the pilot hole when the first and second materials are placed in a stack, the rivet being formed from electrically conductive material and capable when subjected to an electrical potential applied across the rivet and the second material of conducting an electrical current that passes through the second material, the current causing resistive heating of the rivet, welding the rivet at the tip to the second material and capturing the first material between the head and the second material after the tip is welded to the second material with the peripheral lip contacting the first material, the head capable of capturing material extruded from the pilot hole during welding, the pin distal to the head assuming a cross-sectional area greater than a cross-sectional area of the pin proximate the head and inducing flow of the material extruded during welding along the surface of the shaft in the direction from distal the cap to proximate the cap toward and along a bottom surface of the reversely curved peripheral lip.

In accordance with another embodiment, the pin has a vent groove extending along at least a portion of its length.

In accordance with another embodiment, the pin has a length and diameter sufficient to fill a pilot hole having a diameter in a range of 1.2 to 1.8 times the diameter of the pin when the rivet is welded and compressed such that the head contacts the first material.

In accordance with another embodiment, the reversely curved peripheral lip has a radius R.

In accordance with another embodiment, a joint has: an upper sheet having a pilot hole therein; a lower sheet of electrically conductive material; a rivet with a head and pin that is welded to the lower sheet by electrical resistance welding, the pin extending through the pilot hole and welding to the lower sheet, the head pressing against the upper sheet clamping the upper sheet between the head and the lower sheet; and an adhesive disposed between the rivet and the upper sheet.

In accordance with another embodiment, the pin has a tip distal to the head that is welded to the lower sheet, the tip being enlarged to a greater radial dimension than that of the pilot hole before welding occurs.

In accordance with another embodiment, the pin has an hourglass shape between the head and the tip.

In accordance with another embodiment, the upper sheet in the area of the pilot hole conforms to the hourglass shape of the pin in a complementary fashion.

In accordance with another embodiment, the diameter of the weld formed between the pin and the lower sheet has a diameter greater than $1.5*\sqrt{}$ (the thickness in millimeters of the lower sheet).

In accordance with another embodiment, a method of ascertaining quality of an RSR joint, includes the steps of: recording a profile of at least one electrical welding parameter over time during the formation of a reference joint of acceptable quality; obtaining a profile of at least one electrical welding parameter over time during the formation of a joint to be evaluated; comparing the profiles obtained.

In accordance with another embodiment, a method of ascertaining quality of an RSR joint, includes the steps of: recording a reference image of a reference joint of acceptable quality; obtaining an image of a joint to be evaluated; and comparing the images obtained.

In accordance with another embodiment, the reference image includes an ejection pattern of material ejected from at least one vent in a rivet used to form the joint and the step of comparing includes comparing the ejection pattern of the reference image to the image of the joint to be evaluated to determine if a similar ejection pattern is present in the image of the joint to be evaluated.

In accordance with another embodiment, the step of comparing is conducted by a computer using image analysis software.

BRIEF DESCRIPTION OF THE DRAWINGS

For a more complete understanding of the present disclosure, reference is made to the following detailed description of exemplary embodiments considered in conjunction with the accompanying drawings.

FIG. 49 is a photograph of a cross-section of an RSR joint made in accordance with the present disclosure.

FIG. 50 is a photograph of a cross-section of an RSR joint made in accordance with the present disclosure.

DETAILED DESCRIPTION OF EXEMPLARY EMBODIMENTS

Figure 1:
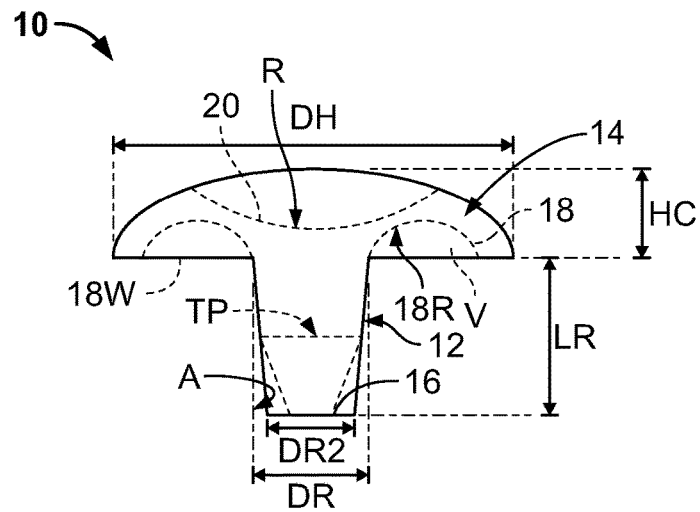
FIG. 1 is a side view of a resistance spot rivet (RSR) fastener (hereinafter, "rivet" for ease of reference) in accordance with an embodiment of the present disclosure.

Resistance spot riveting (RSR) is a process for joining materials, e.g. a plurality of metal layers using a specialized type of rivet-like fastener, hereinafter, "rivet" and conventional resistance spot welding (RSW) equipment. Different aspects of RSR have been disclosed in prior applications owned by the Assignee of the present application. The present application incorporates U.S. Provisional Application No. 61/839,478, entitled, Apparatus and Method For Joining Dissimilar Materials, filed Jun. 26, 2013, U.S. application Ser. No. 14/315,598, entitled, Apparatus and Method For Joining Dissimilar Materials, filed Jun. 26, 2014, U.S. Provisional Application No. 61/839,473, entitled, Resistance Welding Fastener, Apparatus and Methods, filed Jun. 26, 2013, U.S. Provisional Application No. 62/091,980, filed Dec. 15, 2014, entitled, Resistance Welding Fastener, Apparatus and Methods for Joining Similar and Dissimilar Materials, U.S. application Ser. No. 14/315,698, entitled, Resistance Welding Fastener, Apparatus and Methods, filed Jun. 26, 2014, U.S. application Ser. No. 14/611,555, filed Feb. 2, 2015, entitled, Resistance Welding Fastener, Apparatus and Methods, U.S. Provisional Application No. 61/934,951, filed Feb. 3, 2014, entitled, Resistance Welding Fastener, Apparatus and Methods, U.S. application Ser. No. 14/967,777, filed Dec. 14, 2015, entitled Resistance Welding Fastener, Apparatus and Methods for Joining Similar and Dissimilar Materials, by reference herein in their entirety.

The present disclosure has a variety of aspects, including rivet feeding and holding apparatus, rivet geometries promoting cooperation with the feed equipment that increases the effectiveness of the process for a variety of applications including those requiring a pilot hole in an upper captured layer or in pilotless (self-piloting/self-piercing) applications. Rivets are disclosed herein with channels, grooves and/or holes in the head and/or shaft regions of the fastener to allow gases, adhesives, and/or lubricants to vent in a controlled manner during the joining process and that may otherwise cause expulsion and/or joint porosity. In another aspect of the disclosure, weld quality can be monitored by observing dynamic welding parameters, such as force, voltage, current, resistance and displacement parameters. This monitoring process can be applied to joining operations using a pilot hole or without a pilot hole. The monitoring may include recording the parameters and comparing sets of observed parameters to previously observed parameters for model/sample joints to determine weld quality and detect problems in weld development, rivet alignment, etc. In another aspect, the RSR rivet is used in conjunction with an adhesive that seals the resultant joint and/or is used as an insulator to aid in directing welding current.

The RSR fastener may include a pin (shaft) and head (cap) design that, in conjunction with the feed system, can join both pilot and non-pilot applications in any welding gun alignment position (vertical, horizontal, etc.). The pin may be been sized such that it is matched with the underlying material it is to be welded to for both non-pilot and pilot applications. Depending on the application, the weld diameter between the rivet and underlying sheet will be greater than 1.5*sqrt (thickness in mm of the underlying sheet). The weld can be either fusion or solid-state (i.e. a forge weld) or a combination of both modes. Additionally, the rivet length may be sized such that it can accommodate a wide variety of gauges and pilot hole diameters in addition to the constraints required by the feed system. The present disclosure presents rivet designs that are flexible enough to join a wide variety of thicknesses for both pilot and non-pilot modes, in any gun alignment position and accommodate a wide rivet location tolerance range. A rivet in accordance with one embodiment of the present disclosure may have a smaller head diameter, as well as, a reduced head height, while maintaining pin dimensions. This type of low profile head (LPH) design accommodates the use of smaller flange widths as well as improving clearance issues between the rivet head and mating structures. The LPH rivet may be used with piloted rivet applications due to the reduced amount of spall in piloted rivet applications, due to the reduced volume under the head to encapsulate the spall.

In accordance with one embodiment, the fastener has a pin that is a solid body with a diameter matched to the thickness of the lower sheet (steel) thickness. Spot welds of materials of approximately equal gauge are stronger than those where the gauges of the joined components are mismatched in dimensions. In accordance with another embodiment, channels, grooves and/or holes may be incorporated into the head and/or pin of the standard and LPH rivet to allow pressures from lubricants, adhesives, weld fumes, rivet coatings, sheet coatings, and upset materials to be vented during the joining process. These features greatly improve the consistency of the joint since the heat and insertion forces generated during the process can cause a high level of expulsion and joint porosity if not allowed to adequately vent.

Channels or holes on the rivet head allow more uniform upset under the rivet head since high pressure gas, weld fume and adhesive pockets (created when the rivet head seals on the top surface) are reduced. Channels, grooves, or holes in the rivet head and/or shaft may act as an anti-rotational interlock between the captured sheet and the rivet. As the rivet is formed and welded to the sheet joints, the channels will interlock with the upper sheet either through mechanical or adhesive coupling or a combination of the two. When channels, grooves or holes in the rivet cap are used in conjunction with pilot holes and adhesives they can also serve as a visual quality assurance indicator to ensure adhesive was applied near the rivet.

An aspect of the present disclosure is the recognition that it may be advantageous for an RSR rivet in accordance with the above referenced applications or those described herein to be amenable for use in non-piloting applications (no pilot hole in the upper material or layer that is to be fastened to a lower material or layer), as well as in piloting applications. That is, it would be desirable for one type of fastener to be amenable to both uses.

A pilot hole may be useful when joining through a painted or heavily coated sheet but it also is advantageous from a manufacturing cycle time perspective since the weld can be done in about 10 to 50% of the time of the non-pilot version. In addition to the advantage of the decreased cycle time, less heat is required, so the overall properties (both mechanical strength and corrosion) of the piloted sheet may be improved over the non-pilot technique. Rivet designs disclosed in the present application are compatible with a wide range of pilot hole diameters which allows conventional robot location tolerances to be employed rather than requiring a more expensive control system for the robot coordinate system. A rivet that is less sensitive to the location of the rivet relative to the pilot hole does not need to be placed in the exact center of the hole, but rather can be inserted at a plurality of locations within the hole and still produce good welds, resulting in a process that is more robust to typical tolerance variations during the insertion and welding process. Rivet designs disclosed herein allow a range of compression and expansion and can fill pilot holes much larger in diameter than the rivet pin while still maintaining excellent weld quality. The present disclosure discloses a rivet head with a capture cavity to receive materials that are extruded or displaced upon penetration or welding. In accordance with an aspect of the present disclosure, the geometry of the rivet may be selected to ensure that the rivet is long enough to be able to be inserted within a pilot hole but still have enough clearance between the feed system and the captured sheet, such that feed system rivet holding apparatus can be retracted away from the electrodes once the rivet has been securely held, isolating the holding apparatus from surface lubricants, joint adhesives, weld current, weld spall, sparks, expulsion, etc.). A rivet in accordance with the present disclosure may allow the user to be able to form piloted and non-piloted joints at the same welding station. For example, a single rivet could join 3 mm aluminum to steel with a pilot hole but also join 1.5 mm aluminum to steel without a pilot hole. This could be accomplished within one welding cell, lowering the overall cost of fabrication due to fewer welding cells and lower inventory, while improving the cycle time. These and other aspects of the present disclosure are further described below in conjunction with the figures.

FIG. 1 shows an RSR rivet-like fastener, i.e., rivet 10 in accordance with one embodiment of the present disclosure. The rivet 10 has a pin (shaft) 12 and a head (cap) 14. The pin 12 has a diameter (DR) adjacent the head 14, which in some embodiments, tapers at an angle A to diameter DR2 at the tip 16. The taper from DR to DR2 may start at some length down the pin instead of right from under the head 14, i.e., the pin may have a tapered point TP. If the taper is not present or is inconsequential to rivet function in a given application, for simplicity, the pin diameter will be referred to as DR. The pin 12 has a length (LR) between the head 14 and the tip 16 and the head 14 has a diameter (DH). The dimensions of the rivet 10 can be varied depending on the application, as described more fully below. In one embodiment, a single head diameter DH may be capable of doing both piloted and pilotless joining. If the user only intends piloted applications, a smaller head diameter DH can be used. A rivet 10 with a smaller head may retain the same pin diameter DR1, DR2, and angle A or diameter DR as a rivet 10 within a larger head 14, as required by the application. The rivet head 14 may include one or more cavities (recesses) 18 of volume V to contain materials expelled or extruded during the joining process, as described below. In one embodiment, the cavities 18 may be separated by one or more dividing walls 18W. The height HC of the head 14 may also be varied to suit specific applications. The rivet head 14 may have an upper surface 20 with a geometry that accepts an electrode profile. In one example, the upper surface 20 is radiused and has a radius of curvature R. Alternative electrode face geometries are shown in the applications incorporated by reference herein. The present disclosure will describe selection of dimensions LR, DR1, DR2 and DH for enhanced joining in the context of piloted and non-piloted joints given constraints such as pilot hole placement, dimension and feed system tolerances.

Figure 2:
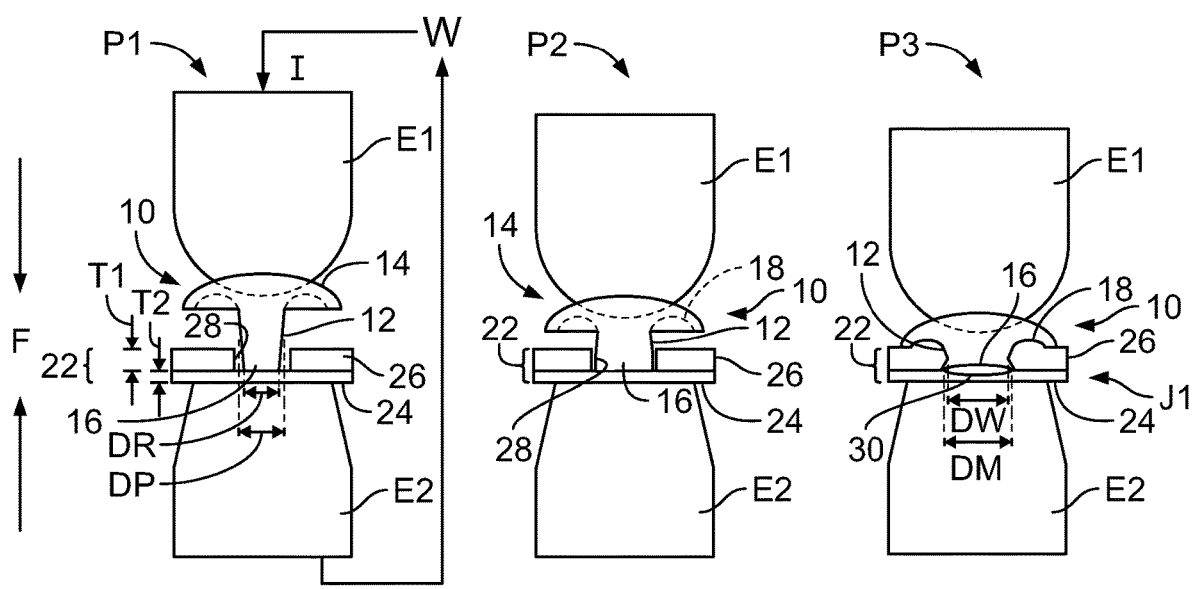
FIG. 2 is a schematic view of phases of resistance spot riveting using a rivet like that of FIG. 1 to join sheets of different materials.
Figure 30:
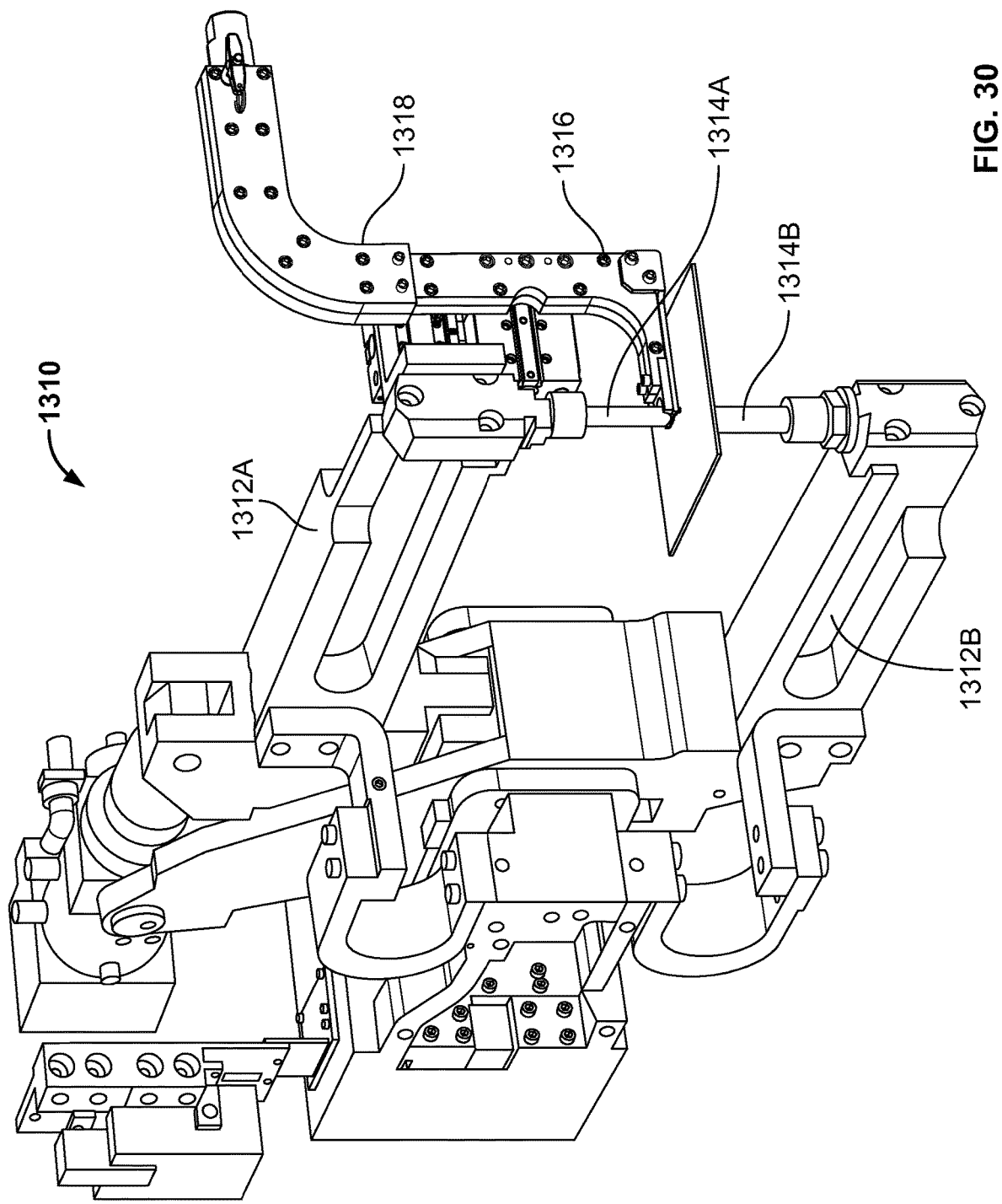
FIG. 30 is a perspective view of a welding apparatus and RSR rivet feeder in accordance with an embodiment of the present disclosure.

FIG. 2 shows a sequence of phases P1, P2, P3 of resistance spot riveting (RSR) in accordance with one embodiment of the present disclosure. A stack-up 22 has a lower metallic member, e.g., a sheet 24 with thickness T2, which may be made from a material, such as steel or another metal and an member, e.g., upper sheet 26 with thickness T1, which may be made from a different material, such as aluminum, magnesium, plastic or composites. While the sheets 24, 26 could be composed of the same material, an aspect of the present disclosure is to provide apparatus and methods for joining dissimilar materials. The upper sheet 26 may include a plurality of layers of similar or dissimilar materials. In FIG. 2, the upper sheet 26 has a pilot hole 28 with diameter DP through which pin 12 of a rivet 10 may be extended, such that the tip 16 thereof contacts the lower sheet 24. A pair of welding electrodes E1 and E2 of welding system W. e.g., a standard resistance spot welding system as would be used on an automobile assembly line, are placed on either side of the stack-up 22, with E1 capturing the rivet 10 against the bottom plate 24. Welding system W is only shown at phase P1 for simplicity but would also be present at phases P2 and P3. The diameter DP of the pilot hole 28 is larger than the diameter DR of the pin 12. At phase P2, the rivet 10 is welded to the lower sheet 24, capturing the upper sheet 22 between the bottom sheet 24 and the head 14 of the rivet 10. In actual applications, such as on an automated (robotic) automobile assembly line, a practical consideration in forming an RSR joint in this way is that the rivet 10 must be consistently delivered to and inserted into the pilot hole 28. Both the pilot hole 28 and the accuracy of the delivery system, e.g., a robotically positioned apparatus, e.g., see FIG. 30, will have a tolerance associated with it. For example, the pilot hole 28 diameter DP may be 6 mm with a tolerance band of +/−0.5 mm. Thus, the pilot hole 28 could be as small as 5.5 mm or as large as 6.5 mm, representing a tolerance band of about 8%. The placement/positioning accuracy of the robot (not shown) may also have a tolerance of +/−0.5 mm. For applications using a pilot hole 28 in the upper sheet 22, the rivet diameter DR must be such that it can be placed within the pilot hole 28, considering the pilot hole diameter, pilot hole position and robotic positioning tolerances. To provide a joint of sufficient strength, the rivet pin diameter must be sized such that the resultant weld strength is sufficient, which constitutes another limiting condition that bears upon automation of rivet placement in a given pilot hole. More particularly, the larger the rivet pin diameter DP relative to the pilot hole, the less tolerance may be permitted. In addition, the thickness T1 of the upper sheet 26, as well as the change in dimensions of the rivet 10 as welding and compression take place (as shown in phases P2 and P3), are also considered by the present disclosure. An aspect of the present disclosure is recognizing these considerations as the problem presented and the selection of a rivet of appropriate dimensions and characteristics that can be used in a realistic context with realistic boundary conditions to form a good joint.

As shown in phases P1-P3, after the rivet 10 is placed in the pilot hole 28, the electrodes E1, E2 of the welding system W apply a compressive force F and a welding current I for a period of time to produce a weld (F and I are not shown, but present in phases P2 and P3 as in P1). The rivet 10 is heated during these phases P1-P3 and the pin 12 compresses and expands radially in the pilot hole 28. Given a specific range of pin lengths LR, pilot hole diameters DP and pin diameters DR, and their relative proportions, the rivet 10 will engage the pilot hole 28 walls, causing heating and pressure on sheet 26. This may cause the sheet 26 to expand outward and up into the containment cavity 18 in the rivet head 14, as shown as stage P3. Mushrooming of the tip 16 may contribute to the upward displacement of sheet 26. The pin 12 and the area of contact with sheet 24 will also be heated, such that a weld is produced with the lower sheet 24. In general, the resultant rivet pin diameter DM at the weld zone 30 will be equal to or greater than the pilot hole diameter DP, but the diameter of the weld zone 30 DW may be less that the diameter DM of the contact area between the rivet pin 12 and the sheet 24. As noted above, real world applications typically exhibit tolerances and variations in the pilot hole 28 location and diameter DP, as well as, in rivet 10 positioning and placement within a population of a plurality of joints, so it is desirable for the rivet design and dimensions to facilitate adaptability to these variations and tolerances.

As can be seen in phase P3, the expansion or mushrooming of the pin 12 at the end 16, may result in the wedging of the peripheral edge of the end 16 into the interface between the upper sheet 26 and the lower sheet 24 proximate the pilot hole 28. This wedging effect may contribute to the upwelling of the upper sheet 26 into the cavity 18 in the head 14, contributing to the tightness of the joint J1 and the mechanical mating of the rivet 10 to the upper sheet 26. This may arrest rotation of the top sheet 26 about the axis of the pin 12, especially in instances where the cavity 18 is subdivided by a plurality of walls 18W, which key into the upwelled top sheet 26.

Figure 3:
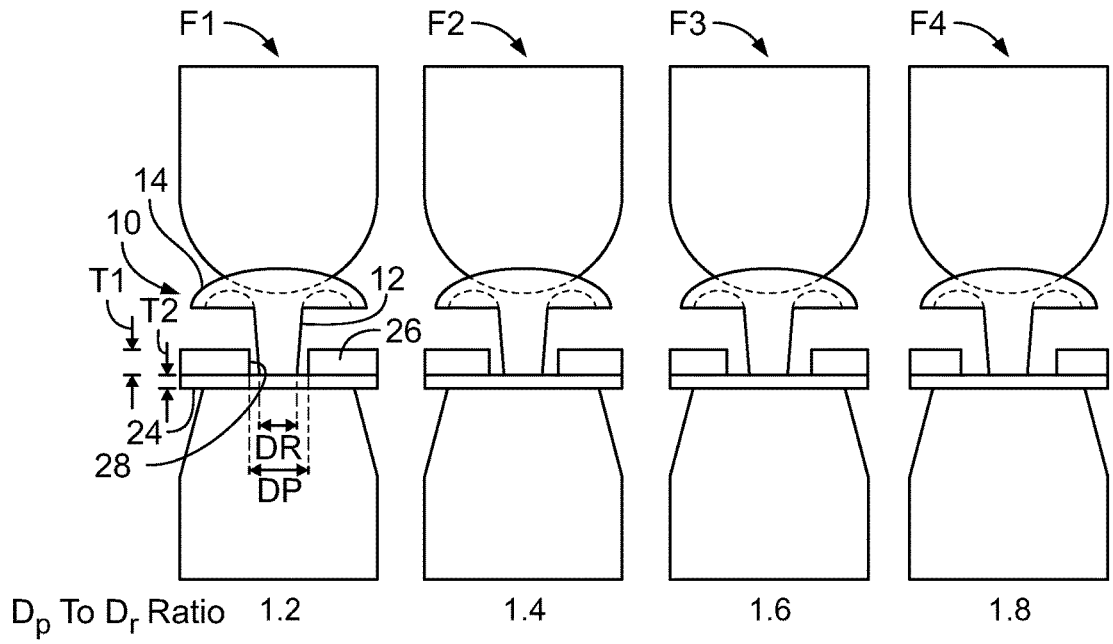
FIG. 3 is a schematic view of various ratios of pilot hole to rivet shaft diameters in accordance with an embodiment of the present disclosure.

FIG. 3 illustrates relative rivet 10 to pilot hole 28 fit ratios F1, F2, F3, F4 in accordance with the present disclosure. More particularly, the present disclosure recognizes that a rivet 10 with a given pin diameter DR may be used to join sheets, e.g., 24, 26 where the sheet 26 has a range of pilot hole 28 diameters DP. For example, the ratio of the diameter DP of the pilot hole 28 to the diameter DR of the pin 12 may be 1.2, 1.4, 1.6 or 1.8, as shown. While theoretically, the ratio could be as low as 1, i.e., the rivet diameter DR is the same as the pilot hole diameter DP, as applied to an automated rivet welding operation with pilot hole and robotic placement tolerances, it would be extremely difficult to feed a rivet 10 with the ratio being smaller than 1.2. If the ratio is greater than 2, it will reduce the amount of pin 12 material available to fill the pilot hole 28 and reduce the upwell into the head 14, while reducing the overlap of the head 14 relative to the upper sheet 26 proximate the pilot hole 28, which could lower the overall joint strength. In one example, given a pin length of 5.5 mm and upper sheet thickness of 2.0 mm, for a pin diameter DR of 4 mm, pilot hole diameters from 1.2*4=4.8 mm to 1.8*4=7.2 mm, would provide workable joints. This would correspond to an average hole diameter of, e.g., 5 mm to 6 mm with a tolerance of +/−1 mm that could be joined. The relationship between the foregoing can be expressed as: $1.2*DR \leq DP \leq 1.8*DR$ where $DP-1.2*DR \geq 0.5$ mm and $1.8*DR-DP \geq 0.5$ mm.

Figure 4:
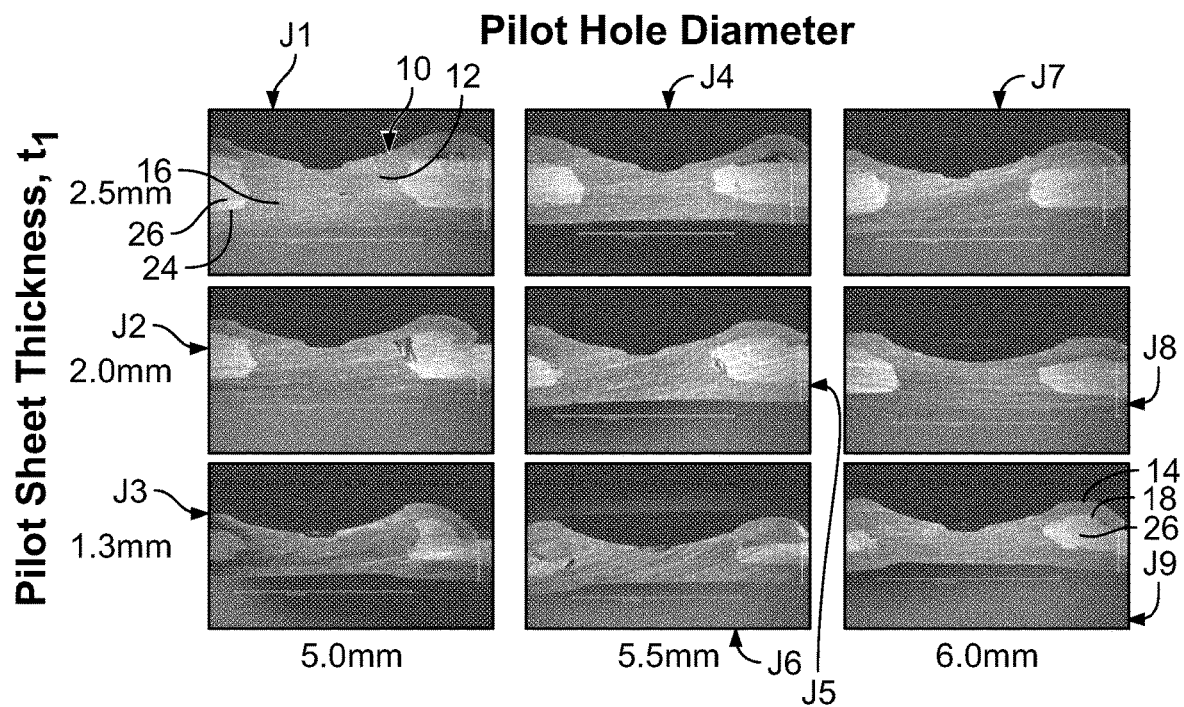
FIG. 4 is a matrix of images of cross-sections of joints made in accordance with the present disclosure.

FIG. 4 shows cross-sections of joints J1-J9 produced in accordance with the present disclosure and showing variations in pilot hole diameter DP (as indicated by the column labels) and top sheet 26 thickness T1 (FIG. 1) as indicated by the row labels. The starting diameter DR (FIG. 3) of the pin 12 of the rivet 10 used for each joint J1-J9 was 4 mm and the length LR (from head 14 to tip 16) was 5.5 mm (see FIG. 1). The same weld settings were used for each joint J1-J9, i.e. 12 kA for 158 msec and 501 daN. Welds were produced for a variety of pilot hole diameters, namely, 5 mm, 5.5 mm and 6 mm for a variety of top/captured sheet 24 thicknesses T1, viz., 1.3 mm, 2.0 mm, and 2.5 mm. The joints J1-J9 show good welds and excellent fill for the same rivet 10 for well over a 1 mm gauge range (1.3 to 2.5 mm) and 1 mm pilot hole diameter range (5 to 6 mm). While not shown in FIG. 4, the same rivet 10 with the dimensions described above and welded under the same welding conditions was found to show excellent welding for pilot diameters of 4.8 mm (ratio of 1.2) and 7 mm (ratio of 1.8). As noted above with respect to phase P3 of FIG. 2, the rivet 10 can be seen to form an "hour glass" shape, e.g., in J1, J2, J4, J5, J7, J8 and J9, attributable to the mushrooming of the tip 16 and the infiltration of the mushroomed tip 16 along the interface between the top sheet 26 and the bottom sheet 24. The increased contact area between the rivet 10 and sheets 24, 26 provides a larger load bearing interface at changing angular orientations to strengthen the joints. This is particularly true in light of the fact that this phenomenon takes place along the entire periphery of the weld in three dimensional space. The displacement of sheet 26 material up into the cavity 18 in the head 14 is particularly prominent in joint J9. This may be caused in part due to the mushrooming of the tip 16.

Figure 5:
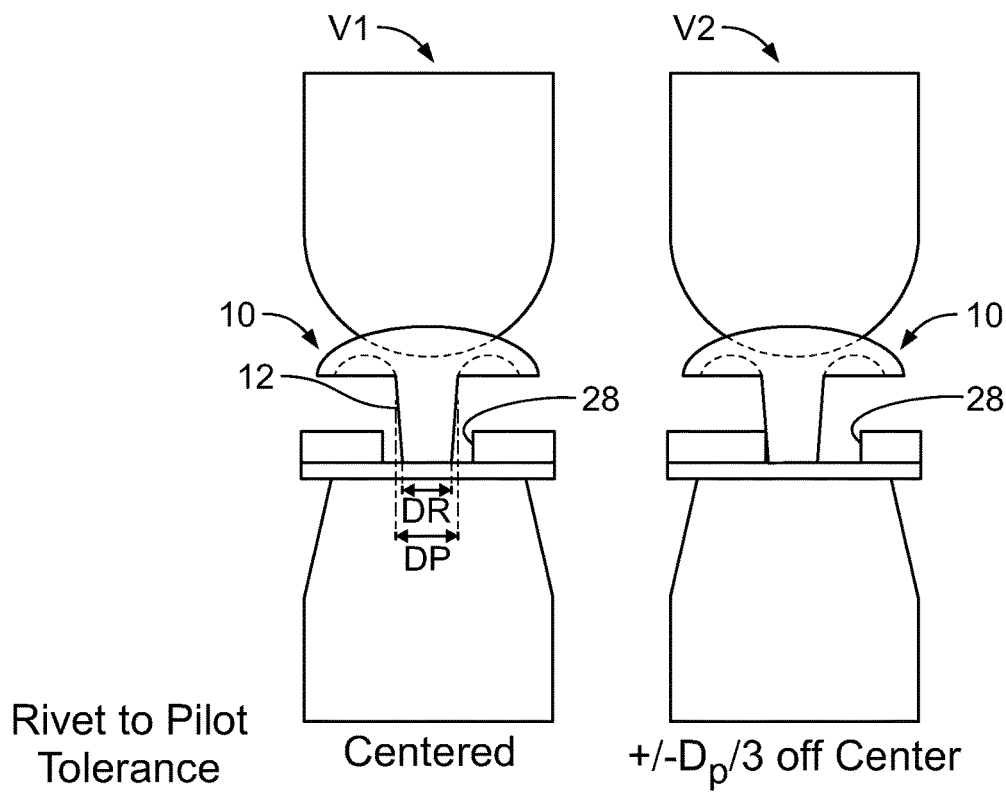
FIG. 5 is a schematic view of two conditions of rivet to pilot hole positioning in accordance with an embodiment of the present disclosure.

FIG. 5 shows two variations V1, V2 of rivet 10-to-pilot hole 28 placement. In real world applications, the tolerance in robot placement of the rivet 10 relative to the pilot hole 28 may vary by over 1 mm. Having a rivet 10 with a pin 12 that can easily fit within the pilot hole 28 but also expand to fill the pilot hole 28 during the welding process is desirable. The examples shown in FIG. 5 have a pilot hole 28 diameter DP that is 1.5× the diameter DR of the rivet pin 12. In one example, the rivet 10 can be off center up to ⅓ of the pilot hole diameter DP and still complete a successful joint. For example, if DR=4 mm and DP=6 mm, then the placement of the rivet 10 can be off-center from the pilot hole 28 up to 2 mm or ⅓*DP. As the pin 12 diameter DR and pilot hole diameter DP changes, the amount the rivet 10 can be off center may vary. In accordance with one embodiment of the present disclosure, it is preferred to limit the off-center range to be at least 1 mm for real-world tolerances where the pilot hole 28 has a diameter DP in the range of 3.6 to 12.6 mm and the pin diameter DR is in the range of 3.0 to 7.0 mm.

Figure 6:
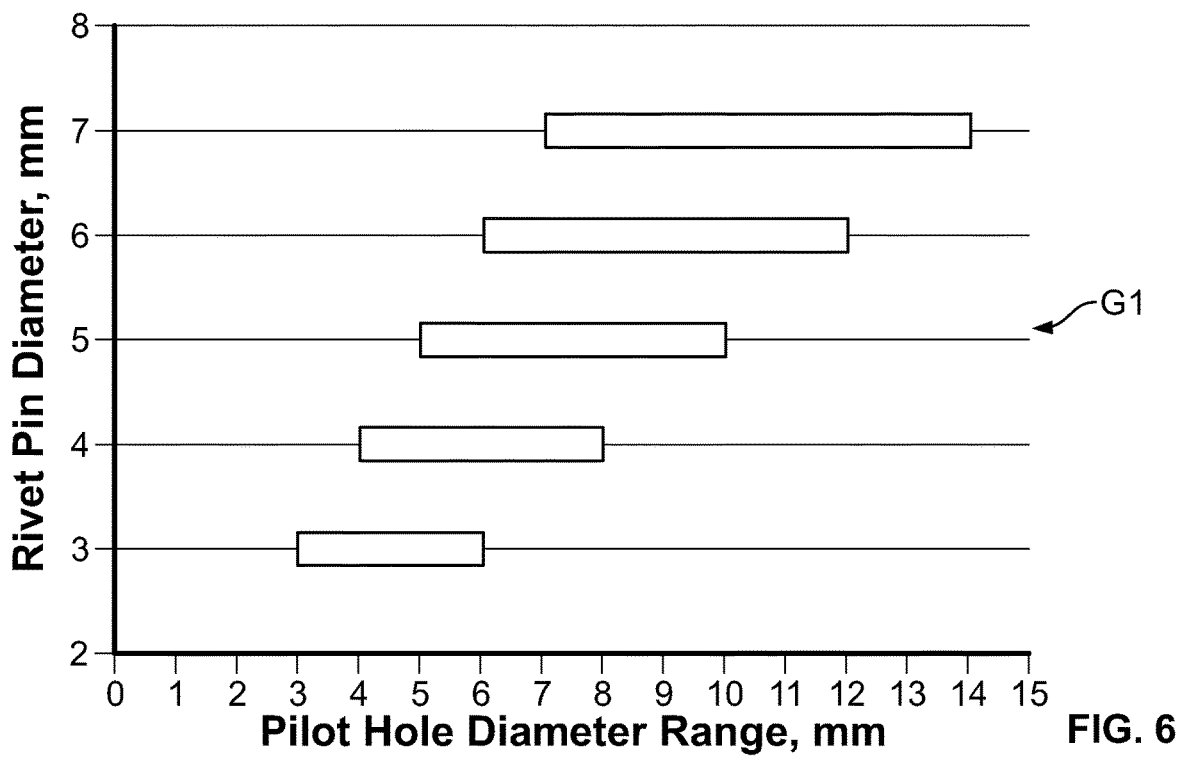
FIG. 6 is a graph of rivet pin diameter to pilot hole diameter range in accordance with an embodiment of the present disclosure.

FIG. 6 shows a graph G1 of rivet pin 12 diameter DP to pilot hole 28 diameter DP range in accordance with an embodiment of the present disclosure. The rivet pin diameter DR is selected as a function of the intended weld size. Thus for welding to thick gauges of the lower sheet 24, e.g., 2 mm and above, a larger pin diameter DR such as 5 or 6 mm is suitable. For thinner gauges of 0.6 to 1.2 mm thickness, 3 or 4 mm pin diameters DR are appropriate. From the proportions and ratios discussed above, the pilot hole 28 requirements will be at least equal to the pin diameter DR, but could be as much as 2× the diameter DR. Considering the production tolerances of both the pilot hole 28 and rivet 10 placement, the pilot hole diameter DP-to-rivet pin diameter DR may range from 1.2 to 1.8×. If the intended application does not require weld strengths of class A (structural welds), then smaller diameter pins 12 could be used, e.g., for grades B and C (non-structural) type joints. In such applications, a smaller pin diameter DR, such as 3 or 4 mm, could be employed in an application that that requires a 5 or 6 mm pin diameter DR. The pin diameter DR is therefore partly a function of the structural requirements of the resultant joint.

Figure 7:
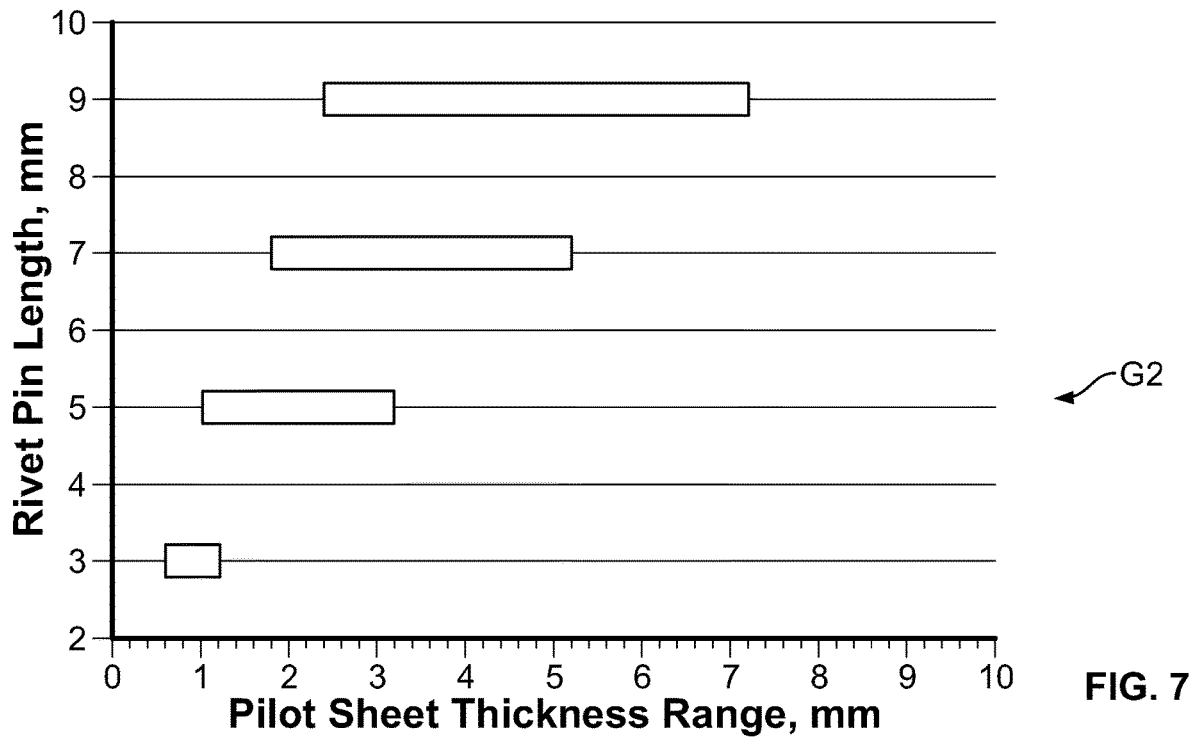
FIG. 7 is a graph of rivet pin length to pilot sheet thickness range in accordance with an embodiment of the present disclosure.
Figure 8:
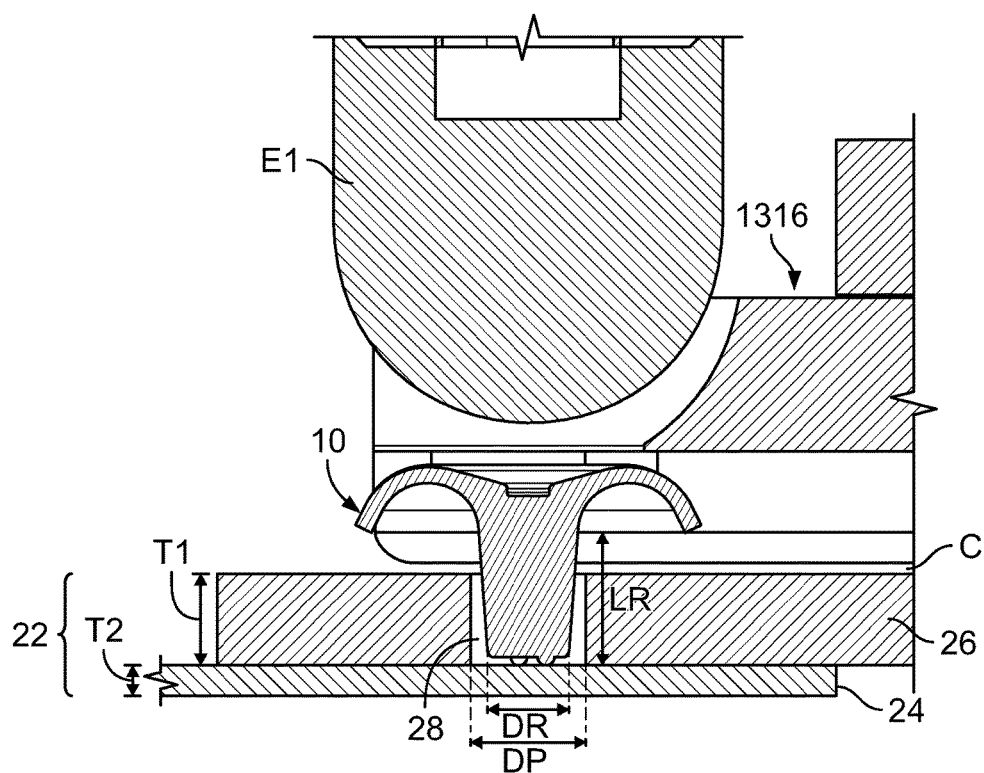
FIG. 8 is a schematic view of a rivet held by a rivet feeding apparatus in accordance with an embodiment of the present disclosure.
Figure 36:
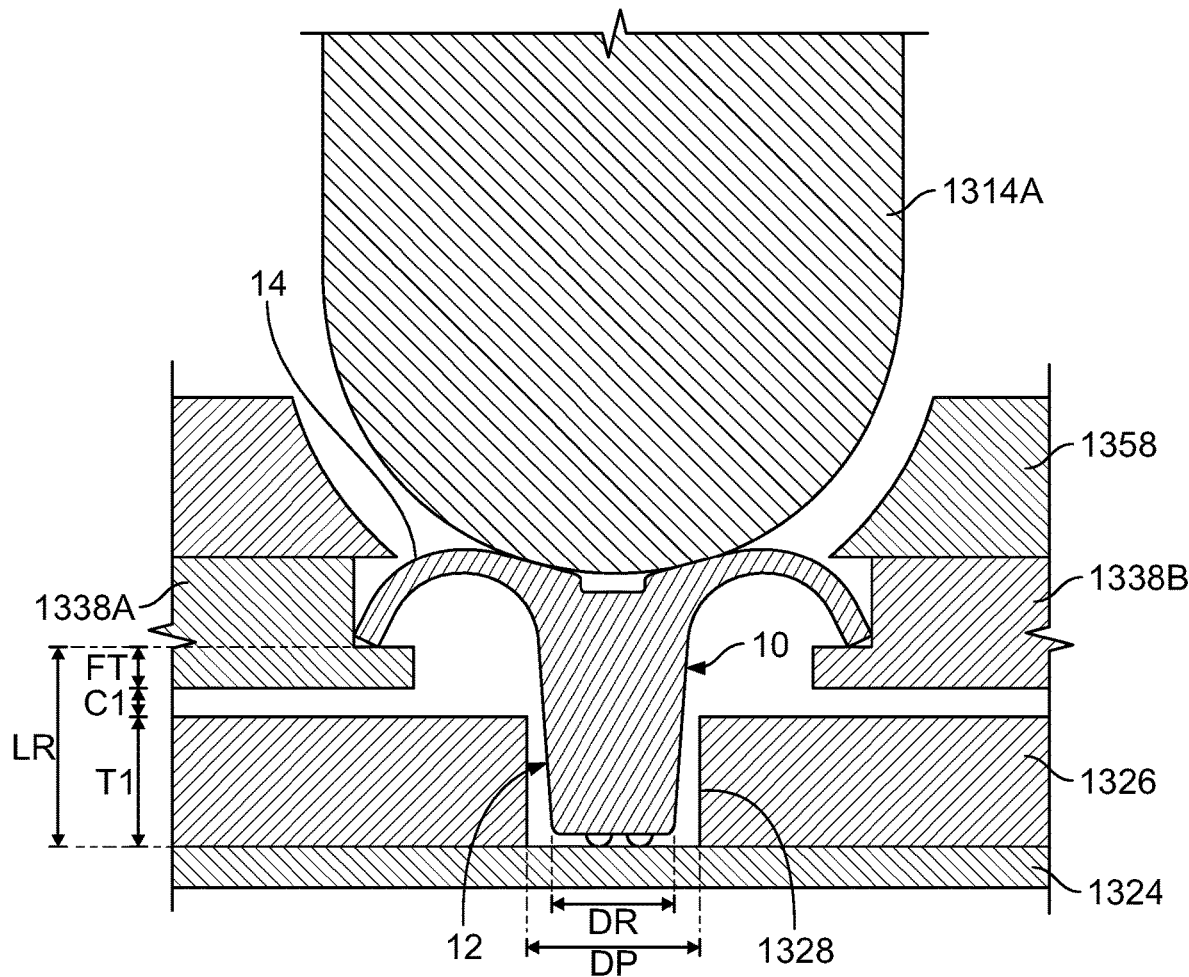
FIG. 36 is a diagrammatic cross-sectional view of the feeding block rivet feeder, electrode and rivet of FIG. 34.

FIG. 7 shows a graph G2 of rivet pin length versus pilot sheet thickness range in accordance with an embodiment of the present disclosure. For successful RSR joints to be made, the rivet 10 must be held against the stack-up 22 and in line with the electrode E1, e.g., as in FIG. 8. A portion of the length of the rivet pin will be used by an RSR feeder 1316 (FIG. 30) for holding the rivet 10. A portion of the length of the rivet LR will provide clearance C between the fastener holder 1332 and the top sheet 26. This relationship is also shown in FIG. 36, which is described in conjunction with a description of a fastener feed and holding apparatus 1310 used in cooperation with a rivet 10 in accordance with an embodiment of the present disclosure. The dimensions of the rivet 10 to allow cooperation with a rivet feeding holding and welding apparatus like apparatus 1310 (FIG. 30) and methods for holding the rivet 10 in preparation for welding are aspects of the present disclosure. The length LR of the rivet 10 that allows the rivet 10 to be held also has implications for operation of the rivet 10 when it is compressed and welded to the lower sheet 24, to the welding and compression time and to the size of the pilot hole 28 that is filled due to compression of the rivet 10, which depends upon the diameter DP of the pilot hole 28 and the thickness T1 of the upper sheet 26. Accordingly, all these parameters may be coordinated, in the context of real world tolerances, to provide good joints. The method of holding the rivet 10 in accordance with the present disclosure and as further described below in reference to FIG. 36 permits the rivet 10 to be applied to a stack-up 22 that is out-of-plane (not horizontal).

In one embodiment, the rivet 10 may be held in the RSR feeder 1316 (FIG. 30) and the electrode E1 pressed against it before transfer to the pilot hole 28. In another embodiment, the electrode E1 moves up and down along an axis that is aligned with the pilot hole 28. The RSR feeder 1316 may position the rivet 10 over the pilot hole 28 and under the electrode E1. The RSR feeder 1316 may then insert the rivet 10 into the pilot hole 28 with the electrode E1 coming down on and pressing the rivet 10 against the lower sheet 24 to hold it in the pilot hole 28. The RSR feeder 1316 may then be withdrawn to allow welding to take place, the rivet 10 being clamped into position by the electrode E1, allowing the RSR feeder to be pulled free of the rivet 10 without moving the rivet 10. A rivet 10 with a given pin length LP can be used with a range of captured upper sheet 26 thicknesses. While FIG. 7 shows 4 different rivet lengths RL, the system can accommodate a range of lengths and be tailored to a specific application, e.g., based upon the thickness T1 of the upper sheet 26. In FIG. 7, the graph G2 shows that a rivet 10 in accordance with the present disclosure with a pin diameter DP of 4 mm and a rivet length LR of 5 mm can join an upper sheet 26 of thickness T1 ranging from at least 1 mm through 3 mm with a pilot hole 28 with a range of diameters from 4.8 to 8.0 mm to a lower sheet 24 having a thickness of 0.6 to 2.0 mm. Using these parameters, the rivet 10 will compress and expand to contact the sheet 26 such that the joint J1 (FIG. 2) is tight and consolidated. The range in the upper sheet 26 gauges for a particular rivet length LR is partially defined by the materials being joined, since a given material may flow differently than another. For example, if upper sheet 26 is a composite material, then the range of sheet thickness joinable by a given rivet may be less than another material, such as aluminum, that is easily extrudable. For example, composite sheet thickness may be 1.25 to 2.0 times the thickness of a comparable aluminum sheet. Since the composite resin may not flow as it contacts the hot rivet, the grip length or working envelop of the rivet 10 may not be as wide as for a metallic sheet. Thus the grip length of a particular rivet will be less for joining through a composite sheet as compared to an all metallic joint stack-up 22.

Summarizing the foregoing, it can be appreciated that a joint J1 may be made in accordance with the present invention by taking into simultaneous consideration a set of parameters including: rivet composition, pin length LR, pin diameter DR, pilot hole diameter DP, and tolerance range for each of these parameters, rivet placement tolerance, upper sheet thickness, composition, lower sheet thickness and composition, holder thickness and clearance, required joint strength.

Use with an Adhesive/Sealant

Figure 9:
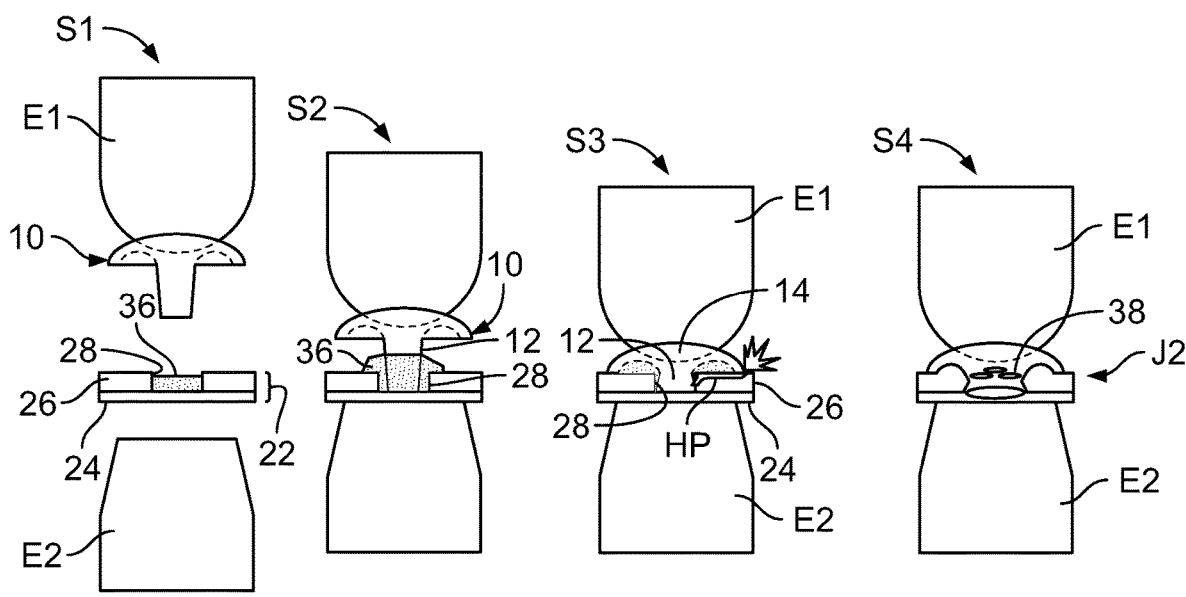
FIG. 9 is a schematic view of stages of use of a rivet like that of FIG. 1 to form a joint between sheets of different materials in accordance with an embodiment of the present disclosure.
Figure 10:
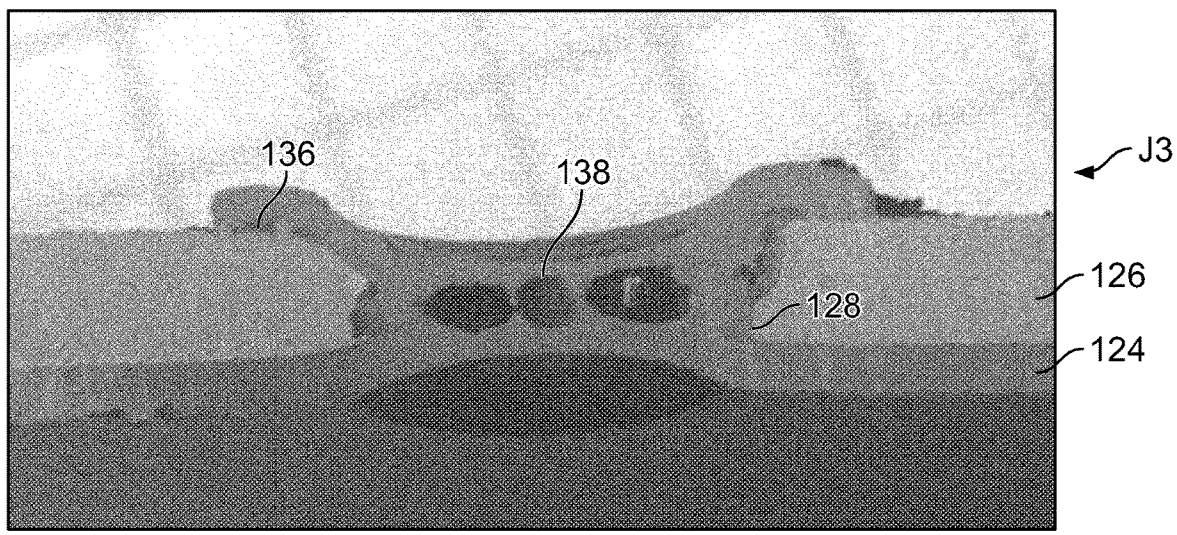
FIG. 10 is a cross-section of a joint made in accordance with the present disclosure.

In accordance with the present disclosure, using an adhesive in RSR joints J1 (FIG. 2) may benefit the structural integrity, corrosion performance and have other benefits, such as providing greater control of welding currents. FIG. 9 shows an embodiment wherein a structural adhesive 36, such as Dow 4601, is present in the pilot hole 28, as shown at state 51. Optionally, the adhesive 36 may be applied to opposing surfaces of one or both of sheets 24, 26 before they are placed together in the stack-up 22. At state S2, the rivet 10 is inserted into the pilot hole 28 and comes into contact with the joint adhesive 36, which is displaced by the pin 12 as it is inserted in the pilot hole 28. The adhesive 36 may aid in sealing the joint J2 at state S4 formed by RSR. One negative implication that may be encountered with the use of adhesive, however, is due to its expansion/vaporization upon applying welding current and heating the area to high temperatures. As shown at state S3, as the rivet 10 is heated between the spot welding electrodes, E1, E2, the pin 12 compresses and expands into the pilot hole 28, as described previously. Once the head 14 firmly seats on the top sheet 26, high pressures attributable to the heated adhesive 36 can develop very quickly. The pressures can result from a combination of contributing causes, including built-up weld and or flux fumes and spall, adhesive expansion, adhesive vaporization, combustion, outgassing of the adhesive or of sheet lubricants, sheet coatings and displaced material from sheet 26. The pressure under the head 14 can reach such high levels that high pressure pockets HP can cause portions of the top sheet 26 and/or the rivet 10 to be violently ejected (commonly referred to as expulsion) during the joining process. A loss of support between the rivet 10 and top sheet 26 due to breaches in the top sheet 26 can cause the rivet to rapidly collapse and expel material as well. This can create porosities 38 in the rivet 10, as well as in the top sheet 26, as shown in state S4. This porosity 38 may cause the joint J2 to exhibit lower mechanical and corrosion performance. Uncontrolled expulsion or spall can degrade surface appearance and coatings, e.g., paint, applied over the joint J2 subsequent to its completion. FIG. 10 shows a cross-section of an RSR joint J3 formed in the presence of a structural adhesive 136 and resulting in expulsion and porosity. In forming joint J3, a 3 mm aluminum upper sheet 126 was joined to a lower sheet 124 of 1.2 mm 590 MPa galvanized steel. A 7 mm pilot hole 128 was employed and a structural adhesive 136 (only a small portion of which remains visible) was applied between the sheets 124, 126 and in the pilot holes 128 prior to joining. The weld process conditions were as follows: weld force—1000 lbs, weld current—2 kA to 10 kA sloped over 200 msec directly followed by a constant weld pulse of 10 kA for 200 msec, hold time 67 msec.

Figure 11:
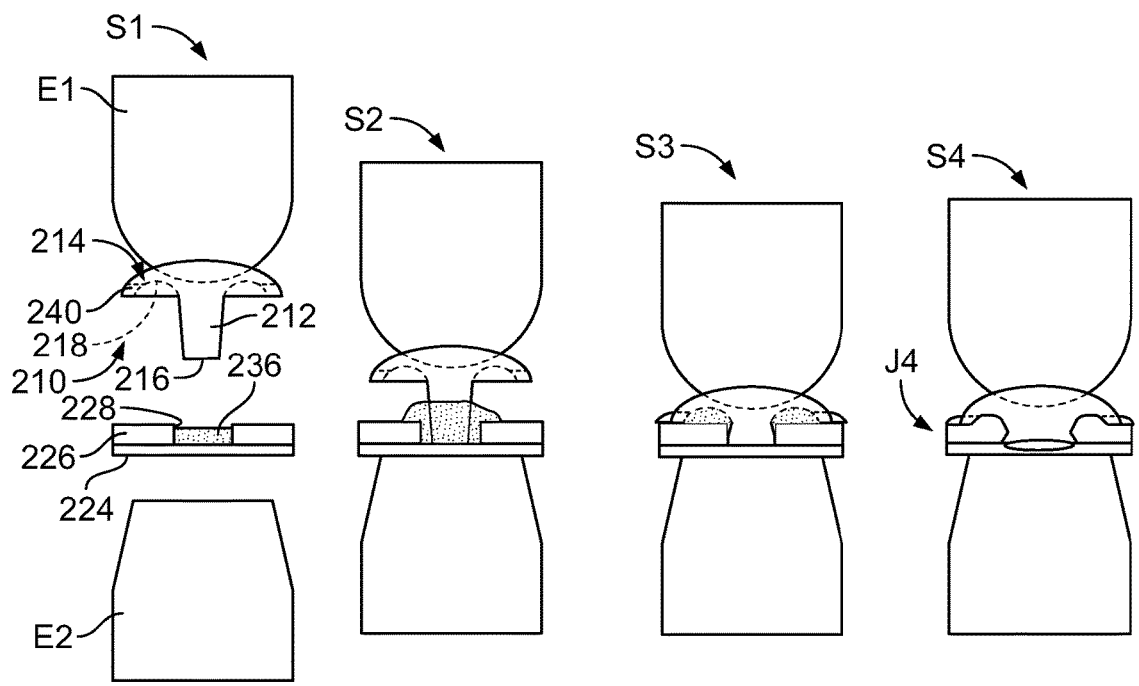
FIG. 11 is a schematic view of stages of use of a rivet like that of FIG. 12 to form a joint between sheets of different materials in accordance with an embodiment of the present disclosure.

FIG. 11 shows an embodiment wherein excess pressure/expulsion is reduced/eliminated by the use of one or more small vents 240 provided on the underside of the head 214 of rivet 216 that allow venting of the joint J9 during its formation, even after the head 214 has been pressed against and otherwise seals against the upper sheet 226. The vents 240 are located on the peripheral, annular underside of the head 214 in communication with the cavity 218. The vents 240 are effective in reducing pressures that can build up under the head 214 during the joining process. States S1 and S2 in FIG. 11 are similar to states S1 and S2 in FIG. 10, where adhesive 236 is present in the pilot hole 228 (S1) and then is displaced by the rivet pin 212 (S2). In S3 and S4 of FIG. 11, however, no pressure builds up due to heating, welding, radial expansion of the pin 212, lateral compression of the pin 212 in an axial direction and bringing the head 214 into contact with the upper sheet 226 in the presence of adhesive 236. Instead, the vents 240 allow the adhesive 236 to escape from cavity 218 while the pin 212 is expanding, the upper sheet 226 is upset and adhesive 236 is expanded due to heat and vaporization.

Figure 12:
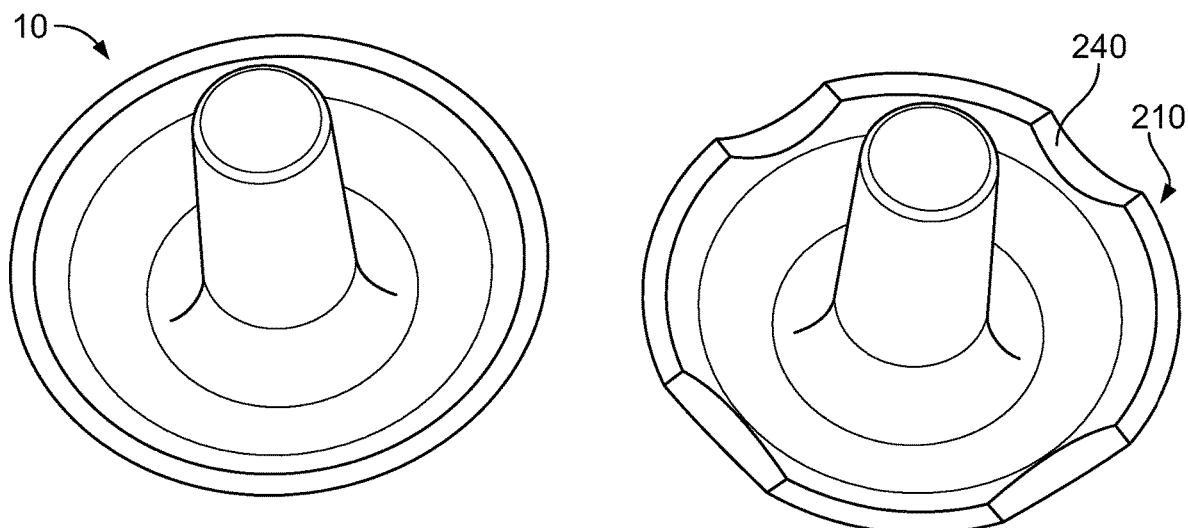
FIG. 12 is a perspective view of a rivet in accordance with an embodiment of the present disclosure.

FIG. 12 shows a rivet 210 with vents 240 next to a rivet 10 without vents. The vents 240 in rivet 210 have a generally arcuate shape with a radius that may measure, e.g., 0.05 to 1 mm, in one embodiment, from 0.08 to 0.5 mm. The vents may have other shapes, e.g., triangular, polygonal, etc. Effective joining through an adhesive 236 may can be done with a single vent 240, depending on the viscosity, thermal expansion and/or volatility of the adhesive 236 and the dimensions of the vent 240. Due to variability in the adhesive 236 that is used, one or more oversized vents 240 may be utilized, providing an over capacity for venting that will assure venting under different circumstances, e.g., when using different adhesives 236 and/or welding parameters. In general, the vents 240 should have the capacity to vent the matter extruded from the joint J4 under high pressures and within a few milliseconds, since the welding process is so fast.

The adhesive 236 may be a dielectric, such as an epoxy or polymeric composition, which in a cured state is considered an insulator. The adhesive 236 may have a viscosity of, e.g., 20 to 200 Pas. The viscosity and boiling point of the adhesive 236 may be used to calculate the amount of adhesive that will be vaporized and the rate of vaporization when welding occurs. Knowing the amount of adhesive that will by converted to a vapor will allow the calculation of the cavity 218 capacity to receive adhesive and weld material extruded from the pilot hole 228 when welding occurs. Similarly, the volume of extruded material, such as adhesive 236 and the rate at which it is extruded may be utilized to calculate the size and number of vents 240 that are needed. The vents preferably have sufficient capacity to allow the expansion of anything contained within the pilot hole 228 and under the head 214, taking into consideration offgassing and vaporization of volatiles, displacement of the upper sheet into the cap, etc. The number of vents is variable and numerous small vents can be employed, e.g., as provided by a plurality of groves on a scale like that of the edge of a U.S. Quarter Dollar coin. The amount of adhesive 236 applied in the pilot hole 228 may fill 100% of the volume of the pilot hole 228, i.e., the volume of the cylinder that is defined by the pilot hole 228. The volume of adhesive 236 present in the pilot hole 228 may also be calculated based upon the total volume of space left in the joint J4 after the joint is completed. In this manner, space within the joint J4 may be filled to the extent possible with adhesive 236. When the pin 212 of the rivet 210 is placed in the pilot hole 228 prior to welding, the pin 212 displaces the adhesive 236 upwards toward the head 214 and may flow onto the surface of the upper sheet 226. An aspect of the present disclosure is the recognition that a volume of adhesive 236 that fills the vents 240 and the cavity 218 after welding has taken place may provide protection of the joint J4 by excluding moisture from the joint J4 and preventing corrosion.

When the rivet 210 is extended through a dielectric adhesive/sealant 236, the adhesive 236 insulates the pin 212 from the surfaces of the pilot hole 228 of the upper sheet 226, preventing current bleed/short circuiting of the electrical welding current when it is applied. The significance of the insulation function may be increased by the tolerance that is operative in pilot hole 228 size, placement and rivet 210 placement by robotic apparatus, in that these tolerances may result in the rivet pin 212 approaching the pilot hole 228 surfaces closely, leading to arcing and short circuiting between the pin 214 and the sides of the pilot hole 228, rather than directing current to the tip 216 of the pin 212 where welding is intended to occur.

An aspect of the present application is that the rivet 210 is dimensioned with a given length LR and diameter DR that permits placement within a given pilot hole 228 with given tolerances in accuracy and then transitions to a shape that fits within the pilot hole 228 in the presence of an adhesive 236. Another aspect if that a given rivet 10 with given dimensions may be used over a range of upper sheet 226 thicknesses, i.e., that the rivet 210 has a variable grip range attributable to the amount of pin 214 shortening based upon weld time and pressure that the rivet 210 is subjected to.

Figure 13:
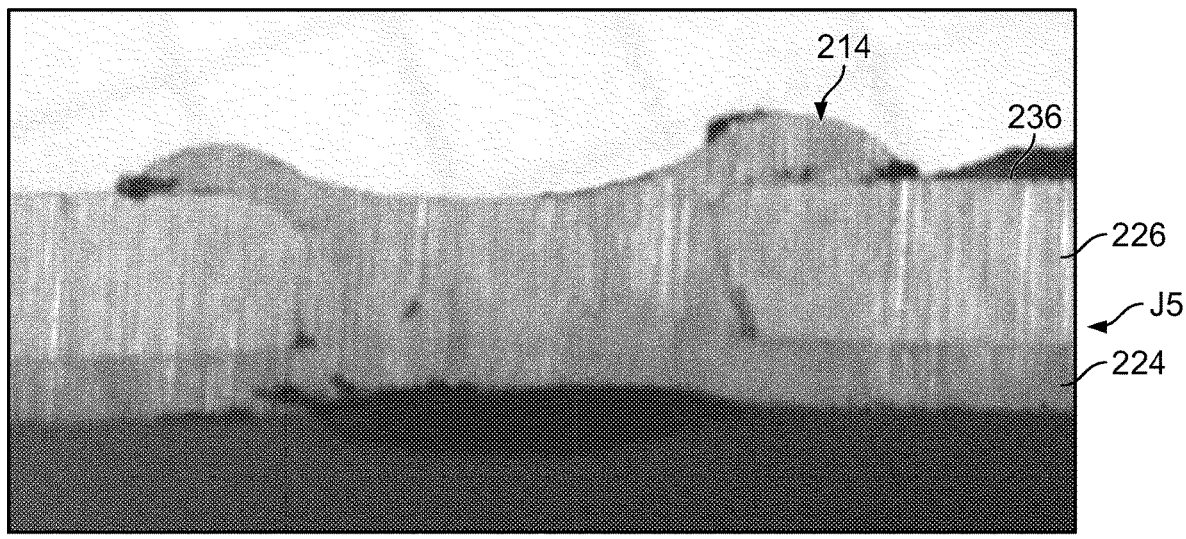
FIG. 13 is a cross-section of a resistance spot rivet (RSR) joint made in accordance with the present disclosure.

FIG. 13 shows a cross section of a joint J5 formed using the rivet of FIG. 12. The vents 240 (FIG. 12) in the rivet head 214 released pressure during the joining process, allowing the adhesive 236 to escape onto the upper sheet 226, providing a good quality joint J5.

Figure 14:
FIG. 14 is a plan view of a pair of RSR joints made in accordance with an embodiment of the present disclosure.

FIG. 14 shows the top of joints J6, J7 made by rivets 310, 410 and formed in accordance with the present disclosure. Rivet 310 has two vents 340 and rivet 410 has four vents 440. The finished joints J6, J7 show the adhesive 336, 436 vented during the joining operation. The vented adhesive 336, 436 forms a recognizable pattern P6, P7 (starburst) that may be used to identify a completed joint J6, J7 and to discriminate between good and bad joints. That is, characteristic venting patterns P6, P7 may be used to identify joints J6, J7 that are properly formed. This recognition may be performed using digital imaging, image analysis and pattern recognition.

Figure 15:
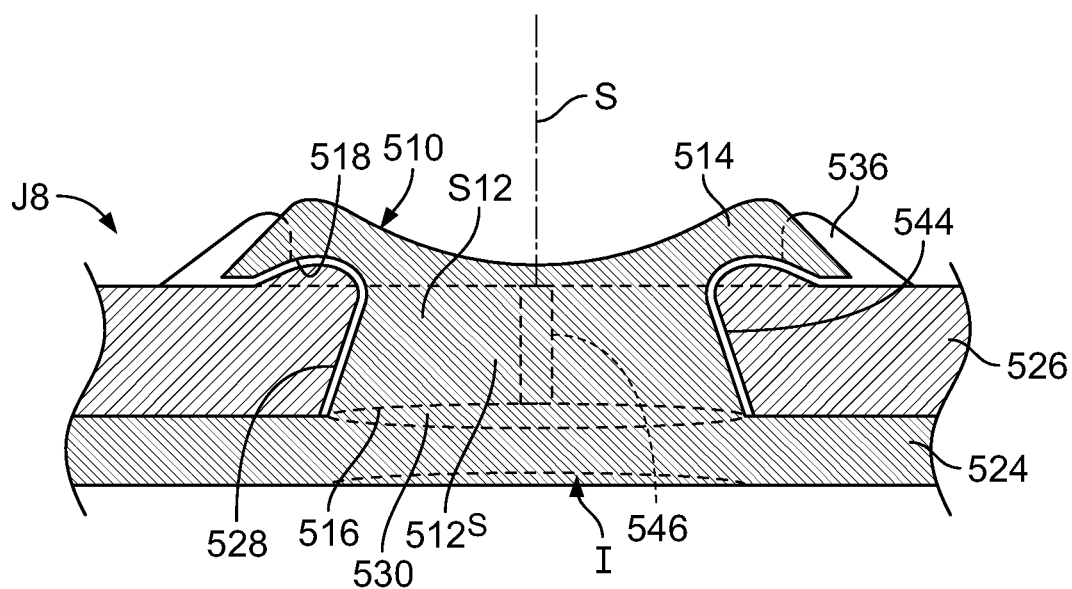
FIG. 15 is a cross-sectional view of an RSR joint like those of FIG. 14.

FIG. 15 shows a joint J8 with an adhesive coating layer 544 present between the rivet 510 and the upper sheet 526. The adhesive coating layer 544 around the rivet pin 512 and head 514 intermediates between the rivet 510 and the sheets 526, 524, sealing and preserving the joint J8 and reducing the tendency for corrosion attributable to contact or proximity between dissimilar metals in an environment with an electrolyte, e.g., rain or snow melt with road salts. When welding occurs and the pin 512 is shortened by softening and the pressure of the electrodes E1, E2 (FIG. 2), the pin 512 widens within the pilot hole 528, diminishing the clearance between the pin 512 and the pilot hole 528 and displacing adhesive 536 from between the pin 512 and the pilot hole 528. One or more reliefs 546 extending along an outer surface 512S of the shaft 512 may be provided to vent adhesive 536 and other extruded matter from the pilot hole 528 as the clearance diminishes. As described above and shown in FIG. 11, the tip 516 of the pin 512 may be softened by welding current resulting is a mushrooming of the tip 516 in an outward radial direction. The tip 516 may infiltrate under the upper sheet 526 proximate the weld zone 530 with the lower sheet 526, forming an anti-withdrawal feature, increasing the area of the weld zone 530 and establishing an anti-rotation feature relative to the upper sheet 526. In one embodiment, the reduction in clearance between the pin 512 and the pilot hole 528 may be approximately complete, such that the pin 512 is brought into close radial contact with the upper sheet 526, locking the upper sheet 526 in position relative to an axis of the pin 512 and preventing translational movement of the upper sheet 526 relative to the rivet and to the lower sheet 524 to which the rivet is welded.

Joint J8 illustrates that the bottom electrode, e.g., E2 (FIG. 2) may create an indentation I (shown by dotted lines) in the bottom sheet 524, compressing the joint J8. The implication of this is that effective volume of the pilot hole 528 is reduced. Selection of the rivet length LR and the diameter DR may need to take this into consideration to avoid overfilling of the pilot hole 528 and excessive extrusion of the upper sheet 526 beyond the capacity of the cavity 518.

Figure 16:
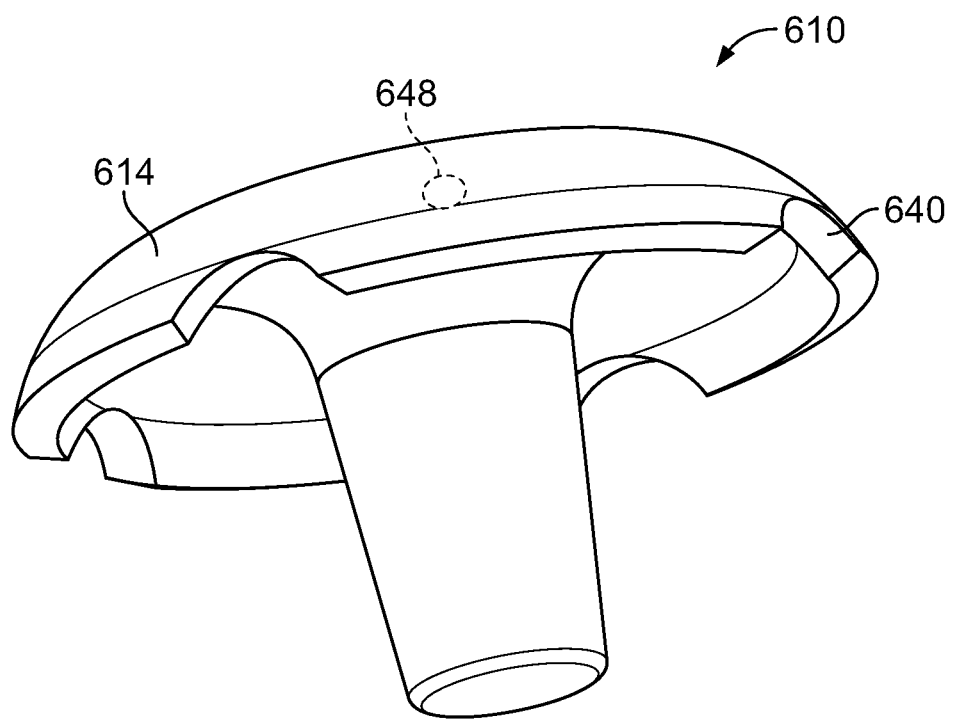
FIG. 16 is a perspective view of a rivet in accordance with an exemplary embodiment of the present disclosure.

FIG. 16 shows a rivet 610 in accordance with the present disclosure having four vents 640 that are along the underside of the rivet head 614. As noted, there could be more or fewer vents 640. The shape and size of the vents 640 can vary. The positioning of the vents 640 results in directing materials extruded/ejected/vented from the pilot hole 528 (FIG. 15) in a sideways direction, i.e., generally parallel to the upper sheet 526, where they are deposited on the upper sheet 526. This direction of extruded materials avoids extrusion of materials on or towards the electrode E1, which would otherwise be contaminated, requiring frequent cleaning. In addition, the extruded materials are ejected onto the upper sheet in a predictable pattern, which can be used as a visual signal for a successfully completed join J8 (FIG. 15). Additional vent holes may be provided in the rivet head, e.g., at or near the top of the head, if desired. Such vents may be oriented to direct extruded materials away from the electrode E1 and/or to avoid ejection of materials towards personnel or equipment.

Quality Assurance

Figure 17:
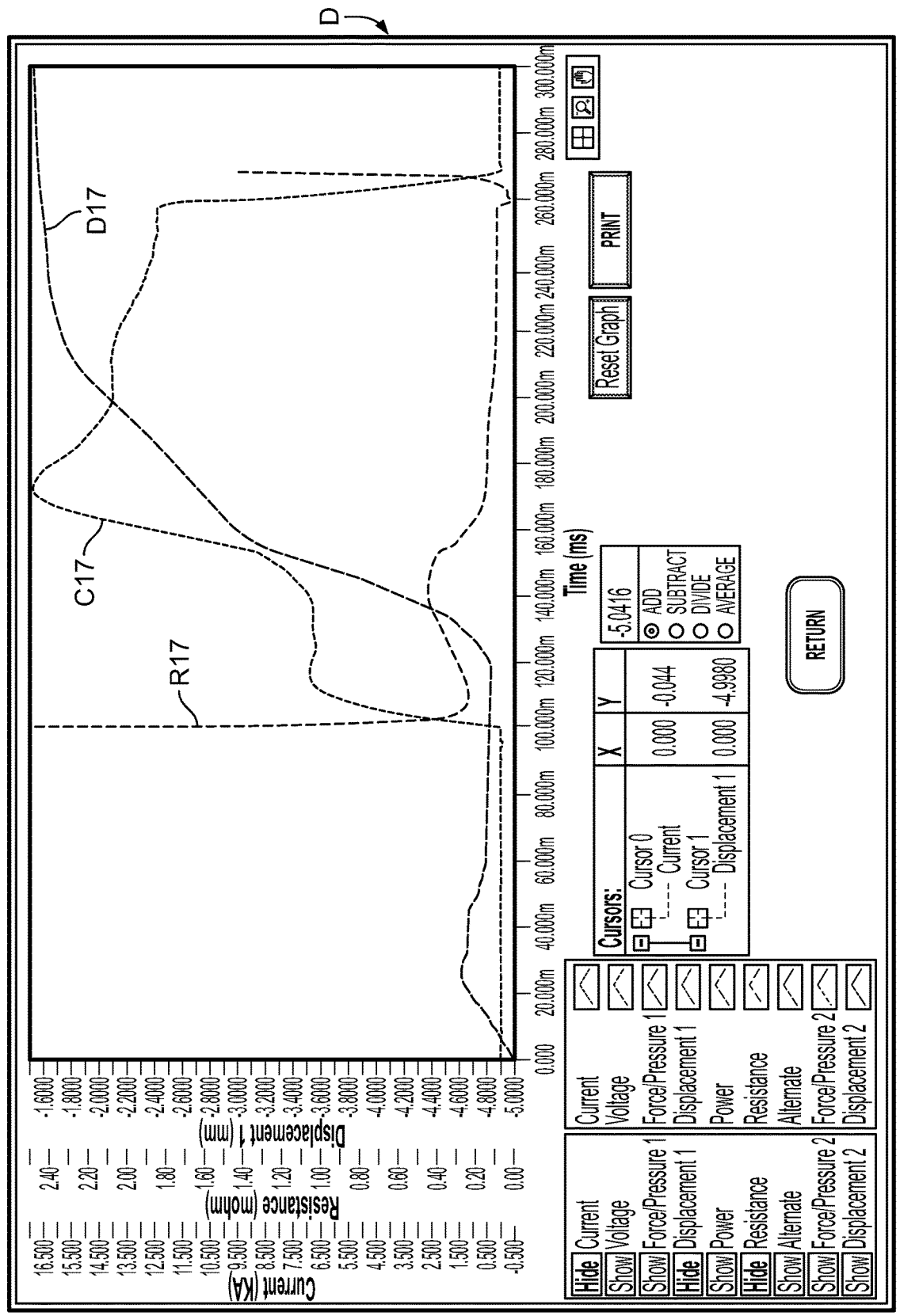
FIGS. 17-22 are screenshots of a display showing welding parameters observed during RSR welding.
Figure 18:
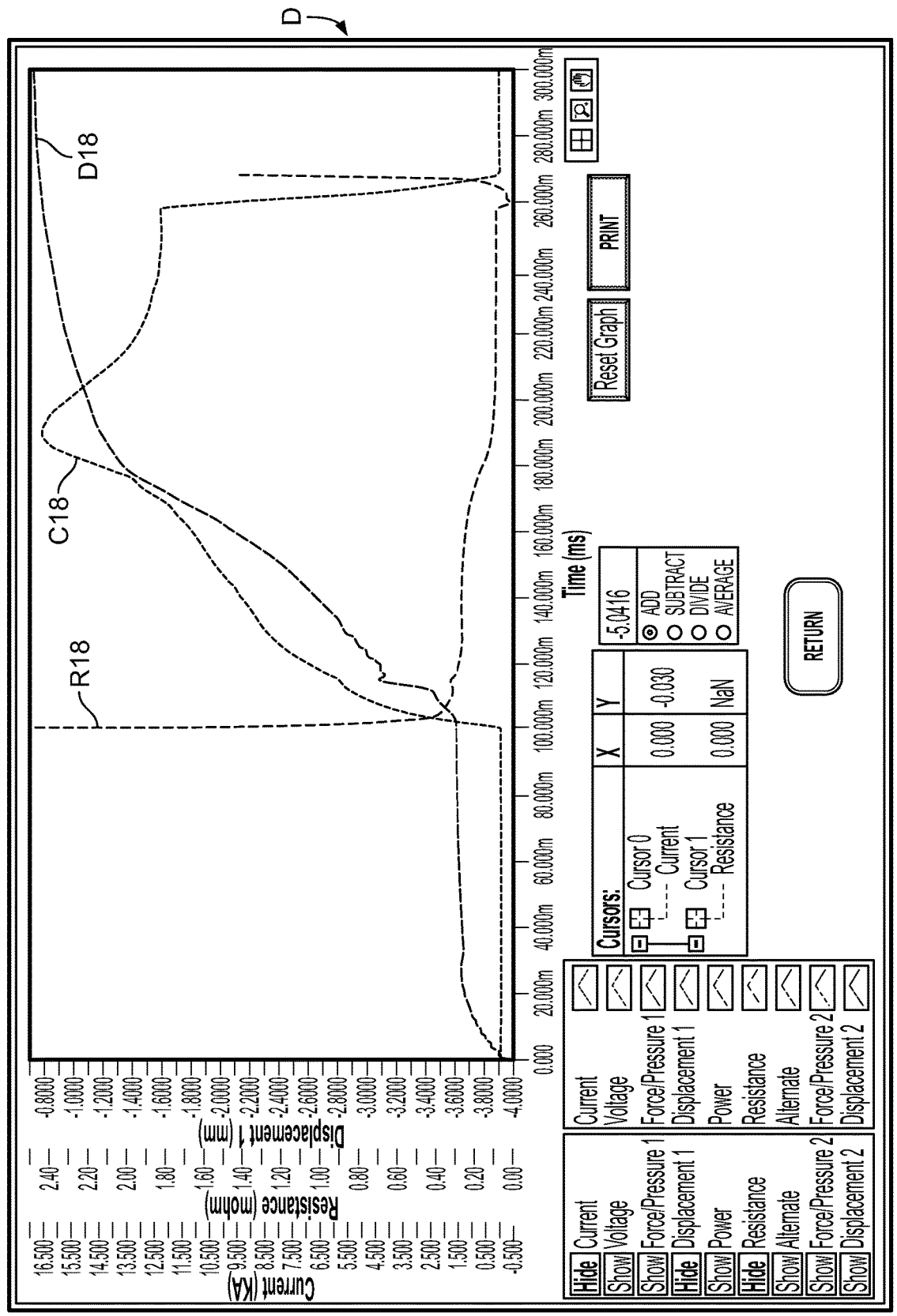

In accordance with the present disclosure, weld process control data can be used as a quality assurance tool for assessing weld quality when forming RSR joints. The weld current, voltage, power, resistance, force, and electrode displacement/position measurement signals can be used independently or in combination to assess joint quality. In one embodiment, this is done by comparison of a performance profile or range of values for a given parameter or set of parameters over time for a good weld to those of a weld that is to be assessed. FIG. 17 through FIG. 22 show a display D with a variety of parameters measured directly from resistance spot welding equipment. The measurement of welding parameters may be done using an off-the-shelf weld monitoring system, e.g., from Amada Miyachi Corporation www.amadamiyachi.com internal monitoring by a weld control system such as RAFT by WTC (http://www-.weldtechcorp.com/). The data displayed on display D in FIGS. 17-22 relate to two joints J9 and J10 that are shown in FIG. 23, J9 being an acceptable weld joint while J10 is a discrepant weld joint. The joints J9, J10 (FIG. 23) joined 2 mm 6xxx aluminum sheet 726, 826 to 1.2 mm 780 MPa galvanized steel sheet 724, 824, respectively. The aluminum sheet contained a 6 mm pilot hole and the RSR rivet 710, 810 had a diameter DR of 4 mm, a pin length LP of 5.5 mm. Both joints J9, J10 were formed under the same conditions, i.e., 12 kA for 158 msec with 501 daN of force. The discrepant weld joint J10 shown in FIG. 23 was formed as a result of the rivet 810 being misaligned with the welding electrode E1 (see FIG. 2) during welding. Discrepant weld joints may have some strength, but not at the levels of an acceptable weld joint. FIGS. 17 and 18 show the current, resistance, and weld head (electrode E1) displacement versus time during formation of acceptable and discrepant RSR joints, J9 and J10, respectively. In terms of the acceptable joint J9, a distinct pattern may be observed in the weld waveforms. In particular, the current waveform C17 shown in FIG. 17 shows a distinct shape where it rises to about 7 kA after about 115 m seconds and persists at that level for about 25 m seconds, during the first half of the weld process. This can be attributed to the current flowing through the rivet 710 and allowing it to expand and compress. Once the head 714 of the rivet 710 engages the aluminum upper sheet 726, the current waveform goes into a secondary profile, rising to about 16.7 kA at about 175 m seconds corresponding to the welding current flowing through both the aluminum upper sheet 726 and the rivet 710 before the weld 530 (FIG. 15) grows and expands. The resistance waveform R17 and the displacement waveform D17 are consistent with this dynamic. In FIG. 18, the discrepant joint J10 does not achieve current leveling during the initial heating period, as shown by C18. This is an indication that the head 814 of the rivet 810 has prematurely engaged the aluminum upper sheet 826 before the rivet 810 adequately expanded into the pilot hole 528 (FIG. 15).

Figure 19:
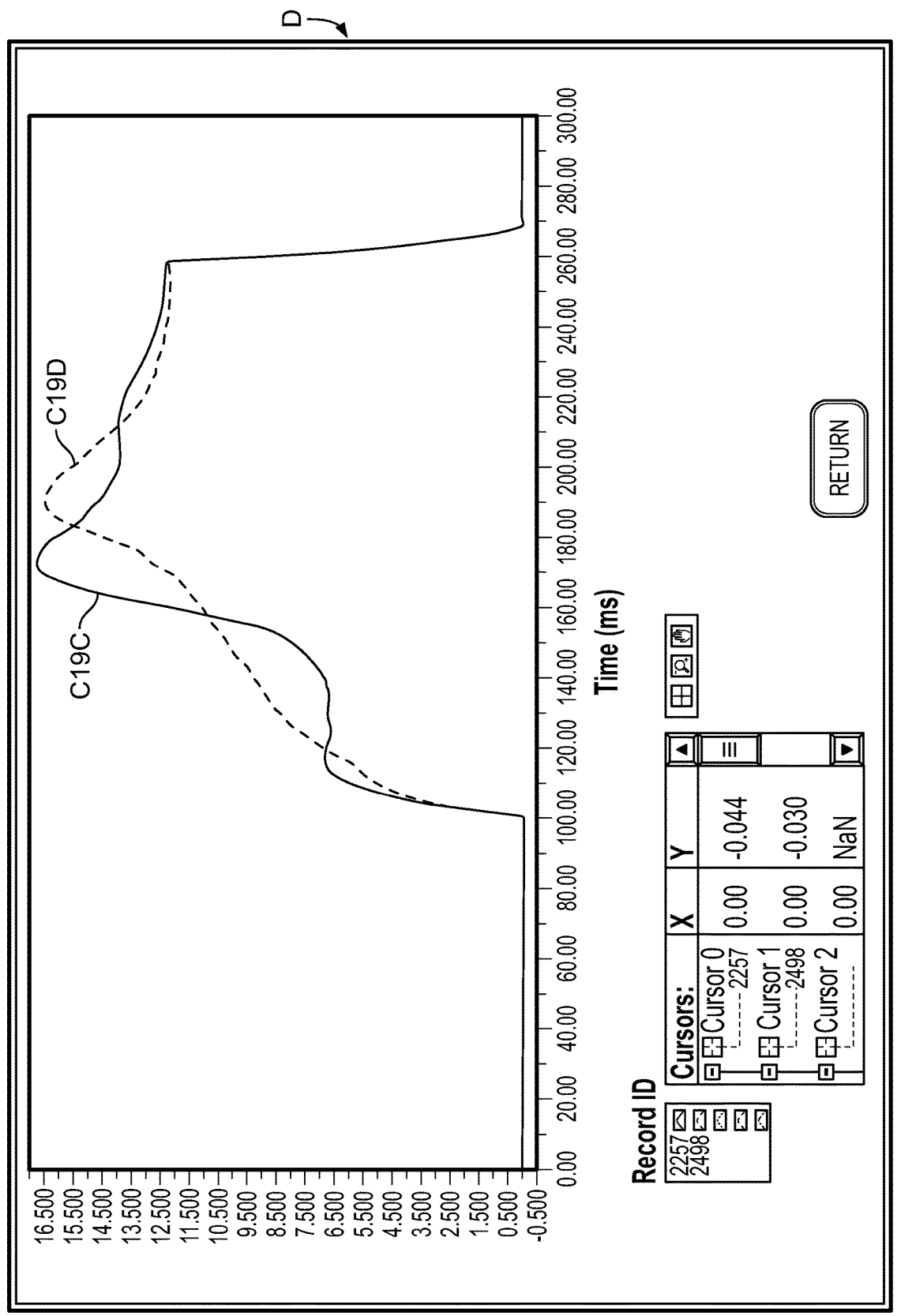

FIG. 19 shows a comparison between a current waveform C19G for a good weld joint like J9 (FIG. 23) and a current waveform C19D for a discrepant weld joint like J10 of FIG. 23.

Figure 20:
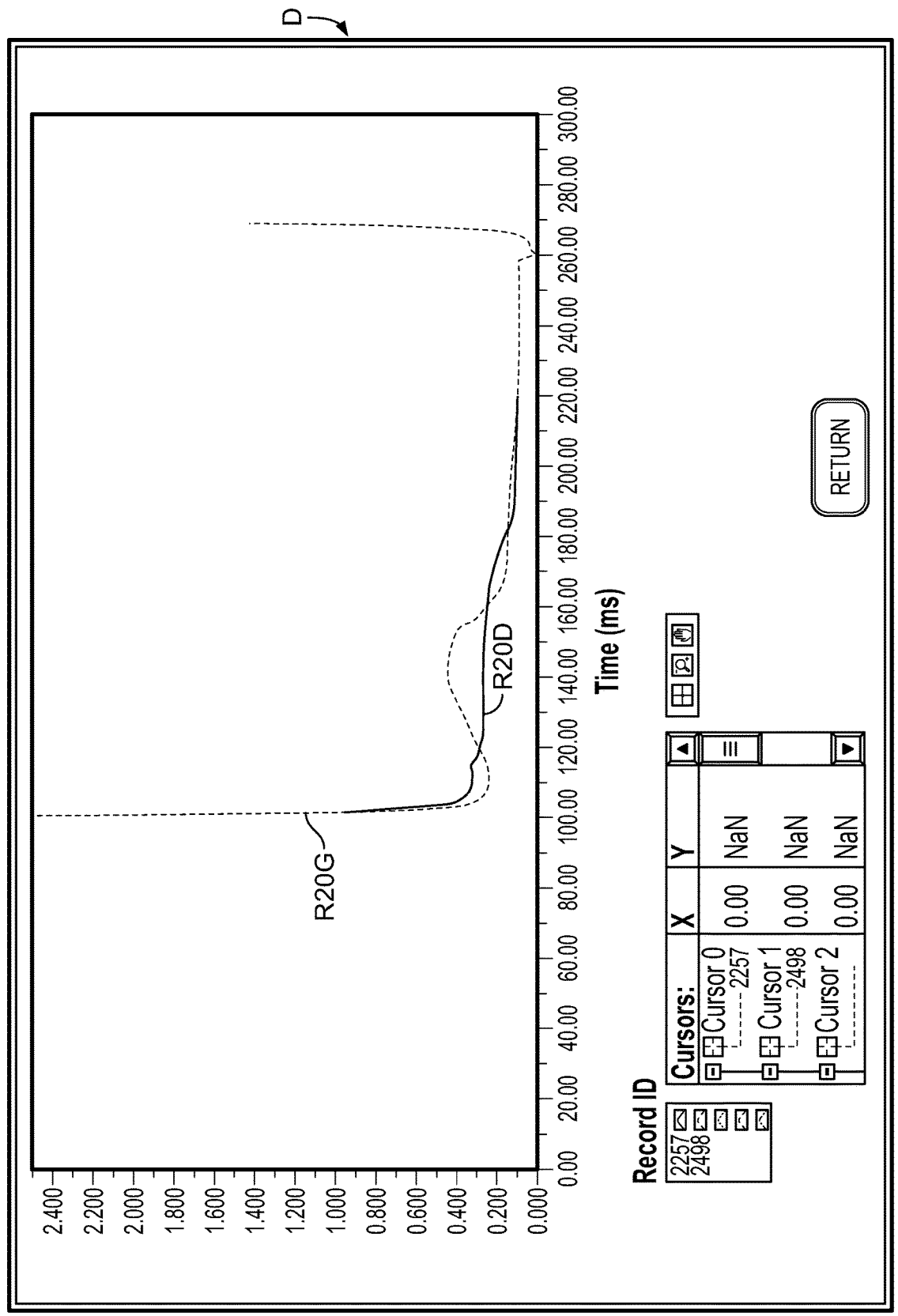

FIG. 20 shows a comparison between a resistance waveform R20G for a good weld joint like J9 and a resistance waveform R20D for a discrepant weld joint like J10 of FIG. 23.

Figure 21:
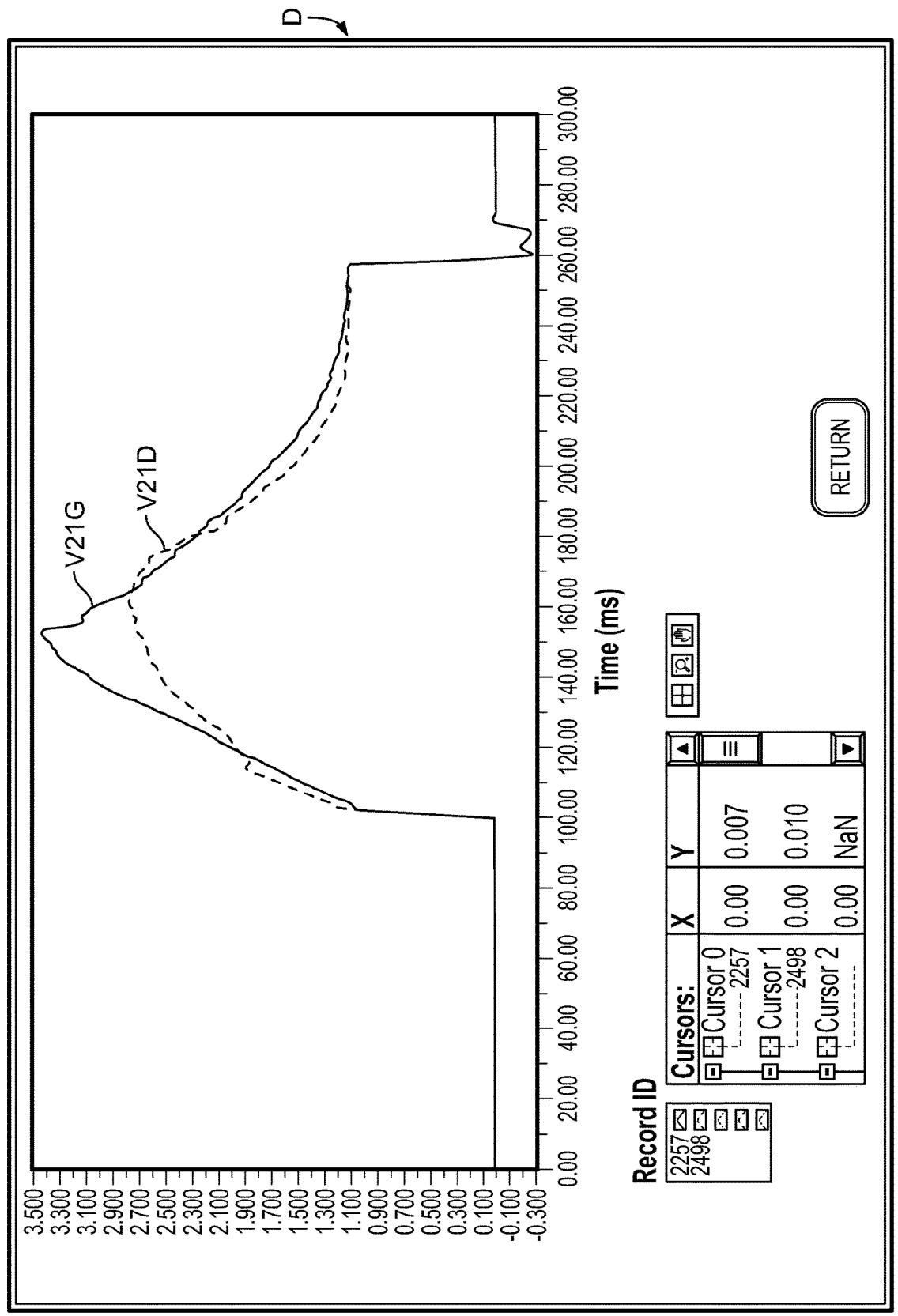

FIG. 21 shows a comparison between a voltage waveform V21G for a good weld joint like J9 and a voltage waveform V21D for a discrepant weld joint like J10 of FIG. 23.

Figure 22:
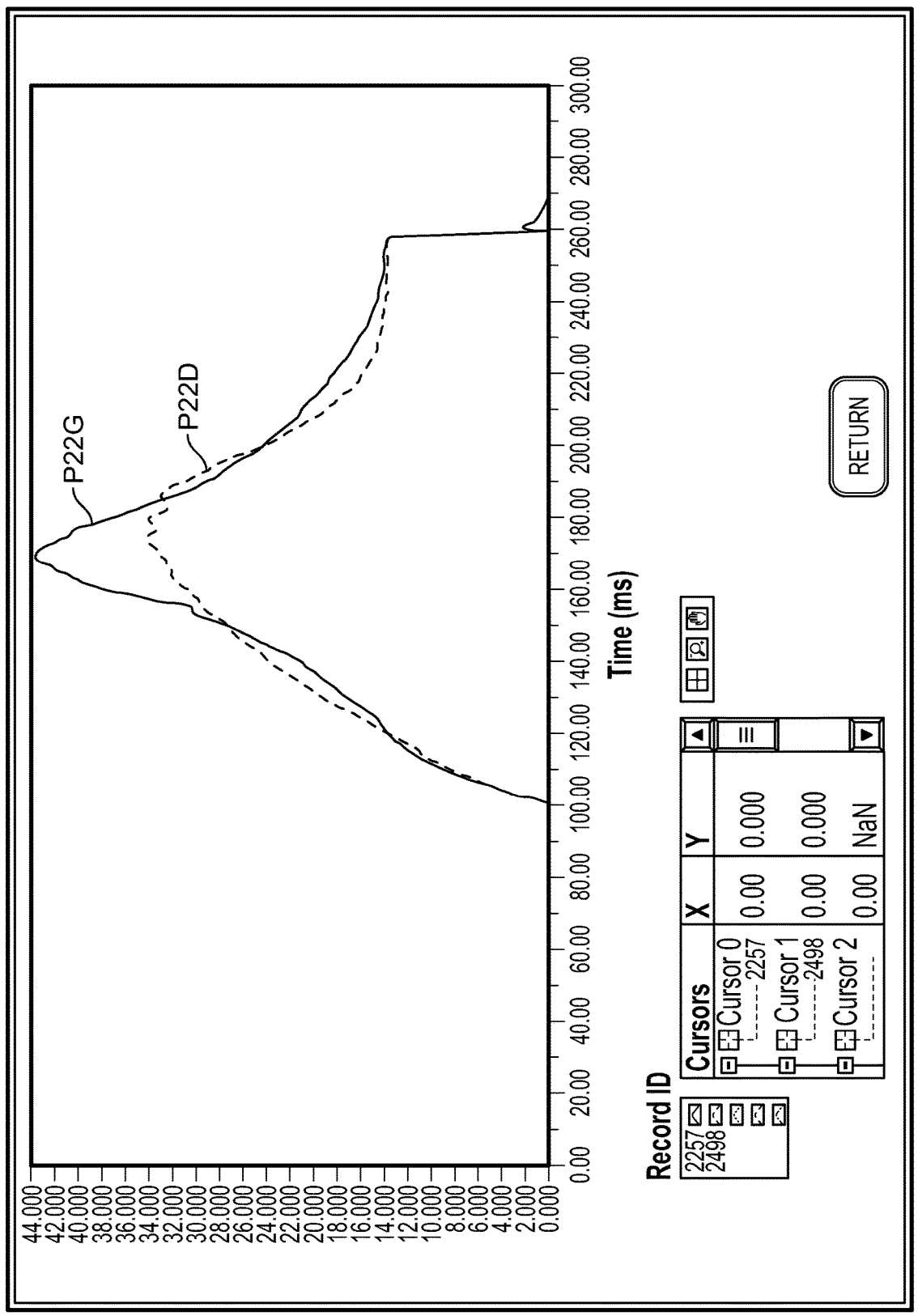
Figure 23:
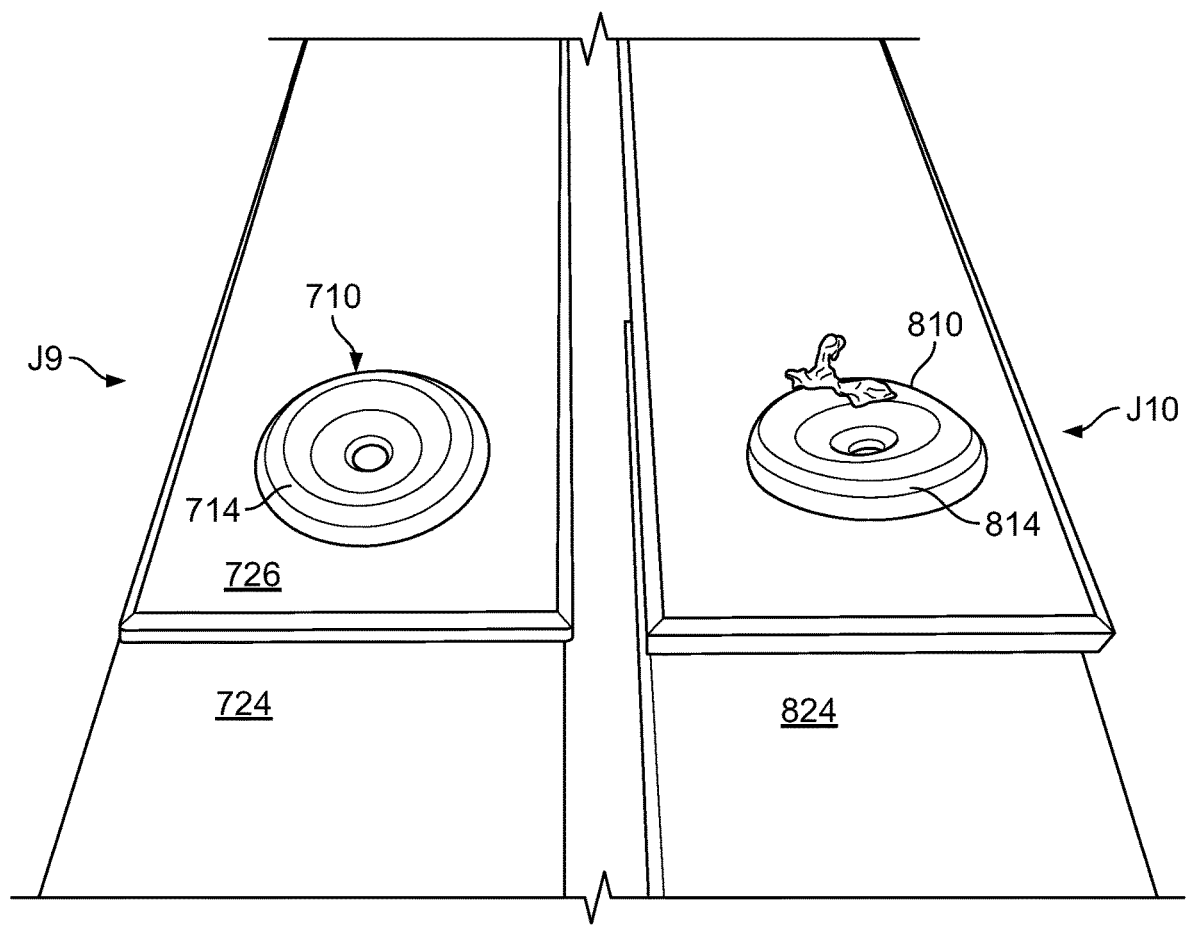
FIG. 23 is a perspective view of a pair of RSR joints, made in accordance with an embodiment of the present disclosure.

FIG. 22 shows a comparison between a power waveform P22G for a good weld joint like J9 and a power waveform P22D for a discrepant weld joint like J10 of FIG. 23.

Issues of improper RSR can be detected by monitoring welding process parameters/variables. This may be done electronically and automatically by a computer, eliminating the need for expensive and slow visual and mechanical measurement and testing systems. Alarms may be triggered by an automatic monitoring system to inform operators that a discrepant weld has been produced and/or to fulfill quality assurance documentation requirements.

As noted above in describing FIG. 15, imaging and image analysis using computer imaging analysis software may be employed to look for patterns in an image of a joint, e.g., J9 or J10 of FIG. 23, that are indicative of good/and/or bad joints. Vented adhesive 336, 436 (FIG. 15) forms a recognizable pattern P6, P7 (starburst) that may be used to identify a completed joint J6, J7 and to discriminate between good and bad joints. This recognition may be performed using digital imaging, image analysis and pattern recognition. To achieve greater reliability in such non-destructive evaluation (NDE) of RSR joints, e.g., J9, a combination of inspection methods may be used. In addition, automated assessments, such as best fit dimension sizing, identification of incomplete fusion, etc.) may be adapted from their current application to assessing resistance spot welds to RSR joints in accordance with the present disclosure. The outputs from these NDE methods may be input to a database and, using automated statistical analysis on a computer, a quality value for a pass/fail inspection can be generated. The joint, e.g., J9, may also be analyzed to determine other data, such as the dimensions of the head 714 (FIG. 23), weld diameter, depth of penetration, amount of flash or expulsion, etc., observable as to individual welds and to groups of welds characterized by, e.g., process parameters and material combinations. Robust characterizations of joint quality as a consequence of process parameters and material characteristics may be achievable using a plurality of NDE methods.

NDE methods for consideration as inputs into this type of database include, but are not limited to, data acquisition of welder output signals, as described above, and from visual, camera-based data acquisition systems. Vision-based systems to identify conditions, such as misplacement of a rivet 10 or pilot hole 28 can be obtained using commercially available apparatus for traditional rivet inspection, e.g., as shown in ADAPT Technology—http://www.adapttechteam.com/metrology-scanning.html. The use of camera systems to do 2D and 3D scanning of automotive parts, including "Good and Bad Recognition" can be conducted in accordance with NOVACAM—http://www.novacam.com/solutions/across-industries. The use of camera/laser-based systems to do quality & tolerance inspections of various parts from aerospace to automotive can be performed in accordance with COGNEX—http:www.cognex.com/products/machine-vision/checker-industrial-vision-sensor/?id=13672&langtype=1033.0.

Figure 24:
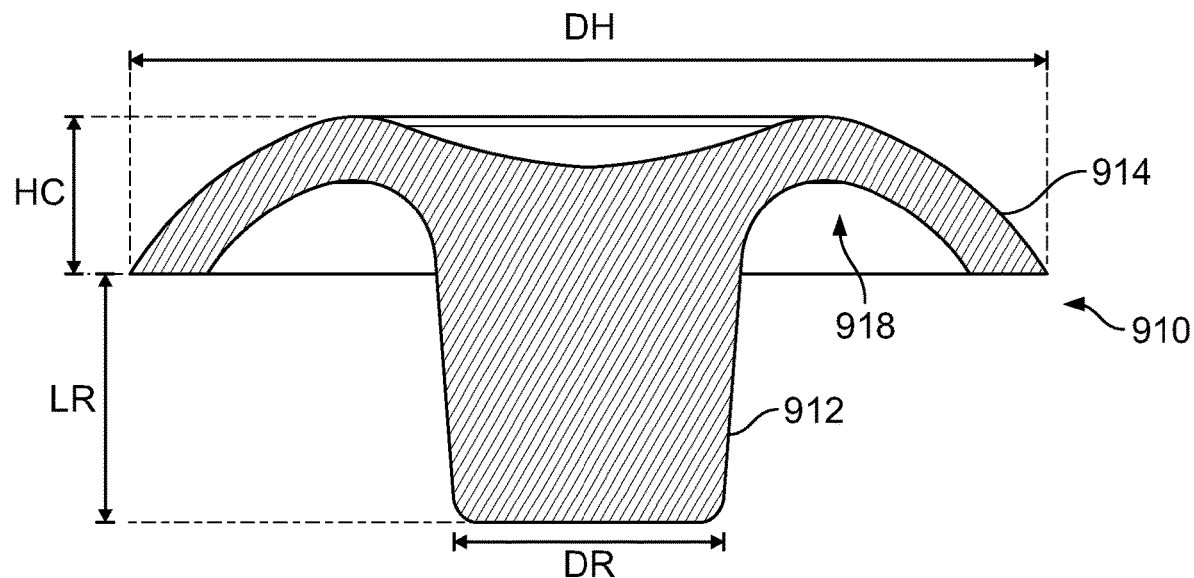
FIG. 24 is a cross-sectional view of a rivet in accordance with an embodiment of the present disclosure.
Figure 25:
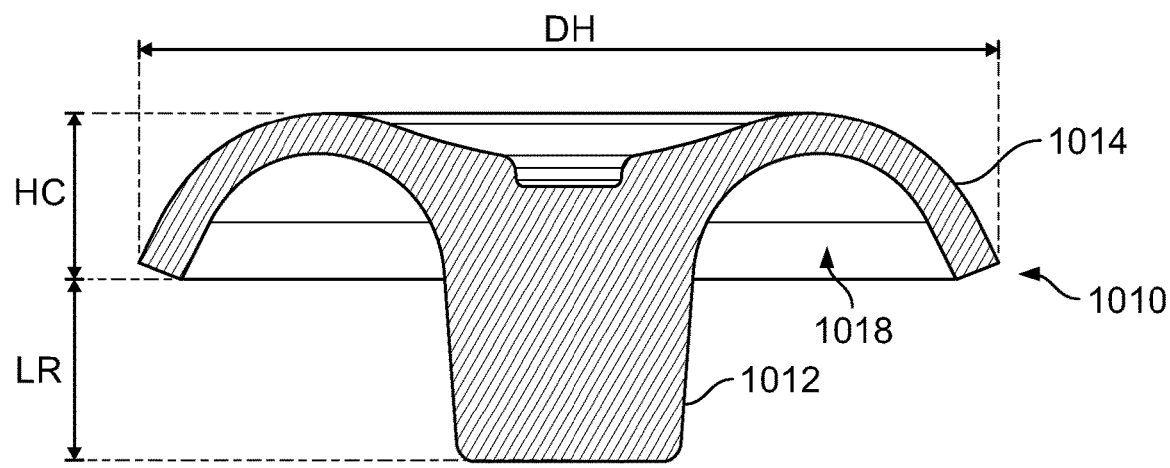
FIG. 25 is a cross-sectional view of a rivet in accordance with an embodiment of the present disclosure.

FIG. 24 shows a rivet 910 with a low profile head (LPH) 914 with a cavity 918 having a smaller capacity than the cavity 1018 of the rivet 1010 of FIG. 25, making it more suitable for capturing sheets 26 with a pilot hole 528 (FIG. 15). Rivet 1010 may be used for either piloted (with a pilot hole 528 in the upper sheet 526 of FIG. 15) or pilotless (used on an upper sheet 526 without a pilot hole in a self-piercing operation). The head 1014 of the rivet 1010 is larger in diameter (DH) and the containment cavity 1018 has enough volume to accept materials extruded during insertion (piercing of the upper sheet 526 with the rivet 1010 by softening the upper sheet 526 via a resistance welding current and simultaneous pressure urging the rivet 1010 through the softened material (pilotless joining) and during welding. The LPH rivet 910 design can also be utilized for pilotless joining, if the application is not sensitive to extruded material being deposited on the upper sheet 526. The head diameter (DH) may be 10% less and head height ((HC) 20% less than the rivet 1010, providing a narrower flange overlap on the upper sheet 526 compared with the rivet 1010, but still maintaining comparable joint strength, since the rivet pin 912 has the same diameter as pin 1012. The LPH rivet 910 may be preferred for joints that have seals placed over them, such as, on door opening panels. While the LPH rivet 910 can be used for pilotless (no hole) applications, the lower capacity cavity 918 may result in more extruded materials escaping from the containment cavity 918. By way of distinguishing the two types of rivets, the LPH rivet 910 would have dimensions such that the cavity 918 has a volume which is, e.g., about 18% of the volume of the pin 912 as determined by $(½ DR)^2 * LR$. In contrast, rivet 1010 would have dimensions such that the cavity 1018 has a volume which is about 66% greater than the volume of the pin 1012 as determined by $(½ DR)^2 * LR$.

Figure 26:
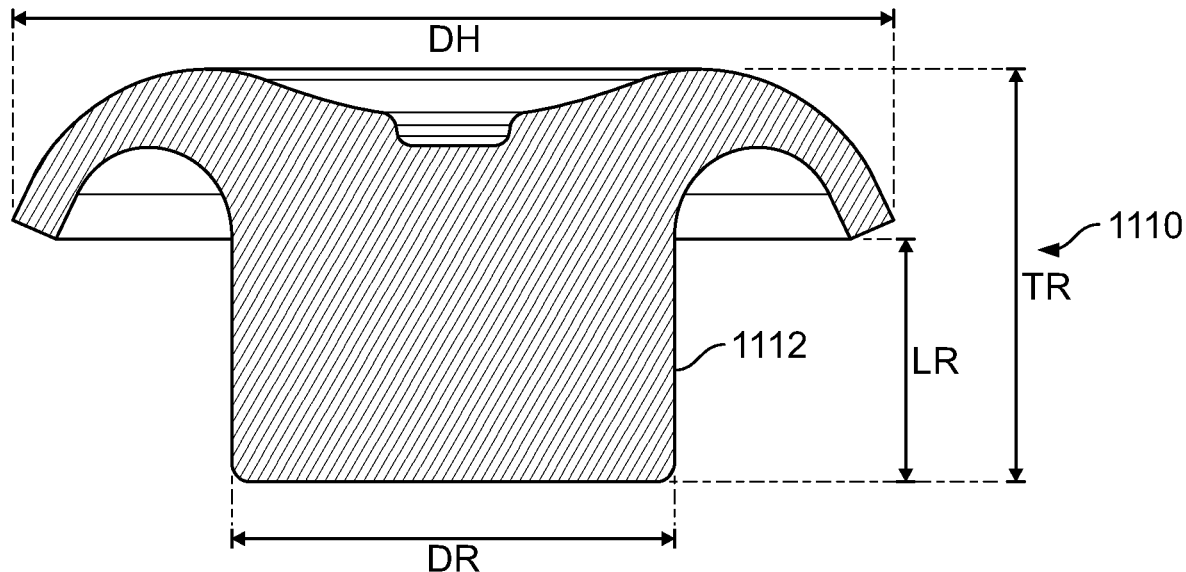
FIG. 26 is a cross-sectional view of a rivet in accordance with an embodiment of the present disclosure.

FIG. 26 shows a rivet 1110 made from aluminum or magnesium for welding to an aluminum/magnesium lower sheet 524, (FIG. 15) e.g., to capture an upper sheet 526 that may be made of the same or a different material, e.g., a steel or plastic upper sheet 526. The pin 1112 diameter DR is considerably greater than that of a steel rivet for welding to aluminum sheets 524, but is otherwise similar in structure and operation to the rivets described above. In one example, an aluminum rivet 1110 was used to successfully fasten an upper sheet 526 of 780 MPa steel of 1.20 mm thickness to a lower sheet of 6022-T4 aluminum with a thickness of 2.02 mm through a pilot hole 528 in the steel upper layer 526 having a diameter DP of 8.75 mm.

Figure 27:
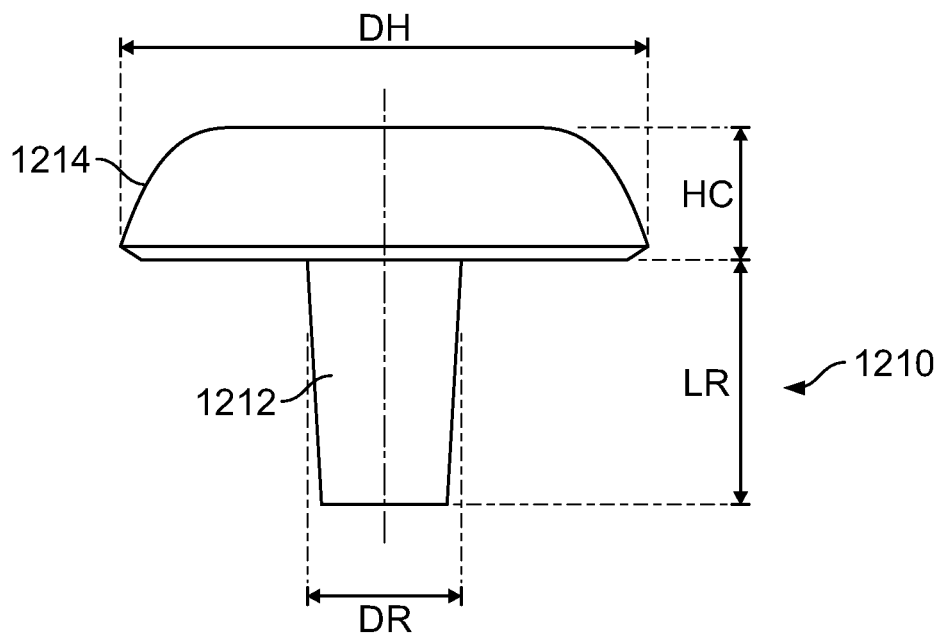
FIG. 27 is a side view of a rivet in accordance with an embodiment of the present disclosure.
Figure 28:
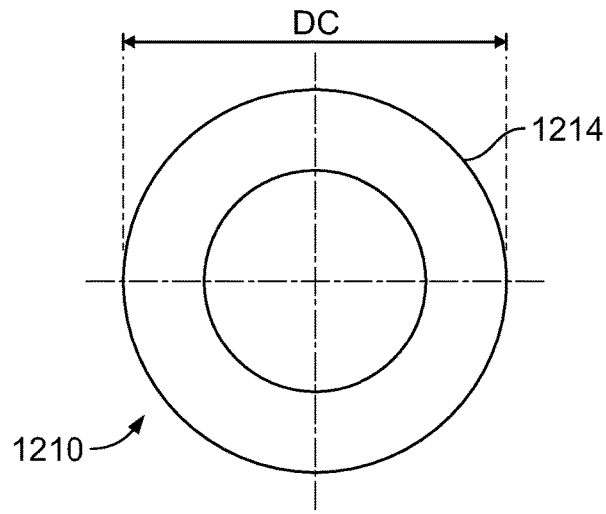
FIG. 28 is a top view of a rivet in accordance with an embodiment of the present disclosure
Figure 29:
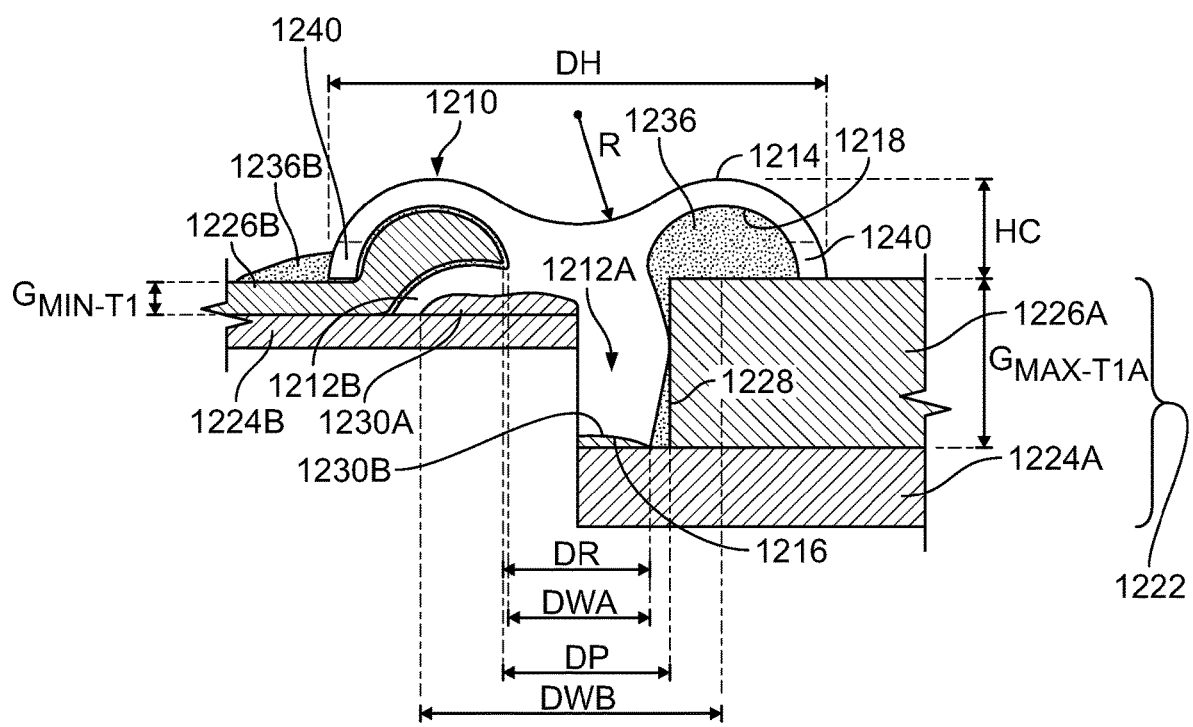
FIG. 29 is a cross-sectional side view of a rivet forming two types of joints in accordance with an embodiment of the present disclosure.

FIGS. 27 and 28 show a rivet 1210 in accordance with the present disclosure. The head 1214 has a height HC and a diameter DH. The pin 1212 has a length LR and diameter DR. FIG. 29 illustrates the grip range of the rivet 1210, i.e., showing the maximum grip length of the rivet GMAX for sheet 1226A of thickness T1A and the minimum Grip range GMIN for sheet 1226B of thickness T1B. FIG. 29 is schematic in the sense that two different sheets 1226A, 1226B with different thicknesses T1A and T1B are shown side-by-side, divided along a central axis of the rivet 1210. This is for ease of illustration and comparison only, in that the rivet 1210 in application would be applied to capture either 1226A or 1226B, but not both simultaneously. As can be appreciated, the rivet 1210 deforms in a substantially different way when applied at different values in the grip range thereof. At a maximum grip range GMAX, the end 1216 of the rivet pin 1212A contacts and welds to the bottom sheet 1224A and just bulges sufficiently to make contact with the wall of the pilot hole 1228. If radial contact between the rivet 1210 and wall of the pilot hole 1228 is not required, then the maximum grip range would be extended to the point that a weld is produced between the end 1216 of the rivet pin 1212 and the bottom sheet 1224A. At the maximum grip range GMAX, the amount of adhesive/sealant 1236 originally present in the pilot hole 1228 is displaced wholly or partially into the cavity 1218 in the head 1214, but may or may not be extruded out vents 1240. The amount of adhesive 1236 extruded would depend upon the amount of adhesive sealant 1236 initially present in the pilot hole 1228, the capacity of the cavity 1218 and the degree of expansion of the adhesive/sealant 1236 due to the heat of welding. At the minimum grip range GMIN, the mushrooming of the pin 1212B is pronounced, causing the displacement of the upper sheet 1226B into the cavity 1218 and extruding adhesive 1236B through the vents.

The following are examples of grip ranges in accordance with the present disclosure.

Example 1

A steel rivet having a head diameter of 14 mm, a pin diameter DR of 4 mm, an initial (pre-deformed) rivet length LR (See FIG. 1) of 5.5 mm, may be used to join an aluminum upper sheet 1226A, 1226B having a thickness T1 from 1.0 mm to 3.1 mm with a pilot hole having a diameter DP of 5.5 mm to 6.5 mm to a steel lower sheet 1224A, 1224B with a thickness T2 ranging from 0.5 mm to 1.6 mm to create a target weld 1230 with a diameter range DWA to DWB of 5 to 7 mm.

Weld diameters in the above examples match the governing gauge or governing metal thickness (GMT) of the stack-up 1222. For like materials, the GMT is the thinner of the two materials joined. For dissimilar materials, the GMT is the thickness of the lower strength material. In example 1, the target weld diameter is 5 mm to 7 mm. The aluminum upper sheet 1226B will determine the GMT. For the thinnest aluminum sheet, $5*GMT^{1/2}=5$ mm, so GMT=1.0 mm. For the thickest aluminum sheet, $4*GMT^{1/2}=7$ mm, so GMT=3.1. Weld diameters are sized according to Japanese Industrial Standard 3140Z, such that the min diameter=4 $GMT^{1/2}$ and a typical diameter=5 $GMT^{1/2}$.

Example 2

A steel rivet having a head diameter of 16 mm, a pin diameter DR of 6 mm, an initial (pre-deformed) rivet length LR (See FIG. 1) of 7.0 mm, may be used to join an aluminum upper sheet 1226A, 1226B having a thickness T1 from 2.0 mm to 5.1 mm with a pilot hole having a diameter DP of 7.5 mm to 8.5 mm to a steel lower sheet 1224A, 1224B with a thickness T2 ranging from 1.0 mm to 2.6 mm to create a target weld 1230 with a diameter range DWA to DWB of 7 to 9 mm.

Example 3

A steel rivet having a head diameter of 18 mm, a pin diameter DR of 8 mm, an initial (pre-deformed) rivet length LR (See FIG. 1) of 10.0 mm, may be used to join an aluminum upper sheet 1226A, 1226B having a thickness T1 from 3.2 mm to 7.6 mm with a pilot hole having a diameter DP of 9.5 mm to 10.5 mm to a steel lower sheet 1224A, 1224B with a thickness T2 ranging from 1.6 mm to 3.8 mm to create a target weld 1230 with a diameter range DWA to DWB of 9 to 11 mm.

Example 4

A steel rivet having a head diameter of 20 mm, a pin diameter DR of 10 mm, an initial (pre-deformed) rivet length LR (See FIG. 1) of 13.0 mm, may be used to join an aluminum upper sheet 1226A, 1226B having a thickness T1 from 4.8 mm to 10.6 mm with a pilot hole having a diameter DP of 11.5 mm to 12.5 mm to a steel lower sheet 1224A, 1224B with a thickness T2 ranging from 2.4 mm to 5.3 mm to create a target weld 1230 with a diameter range DWA to DWB of 11 to 13 mm.

Figure 51:
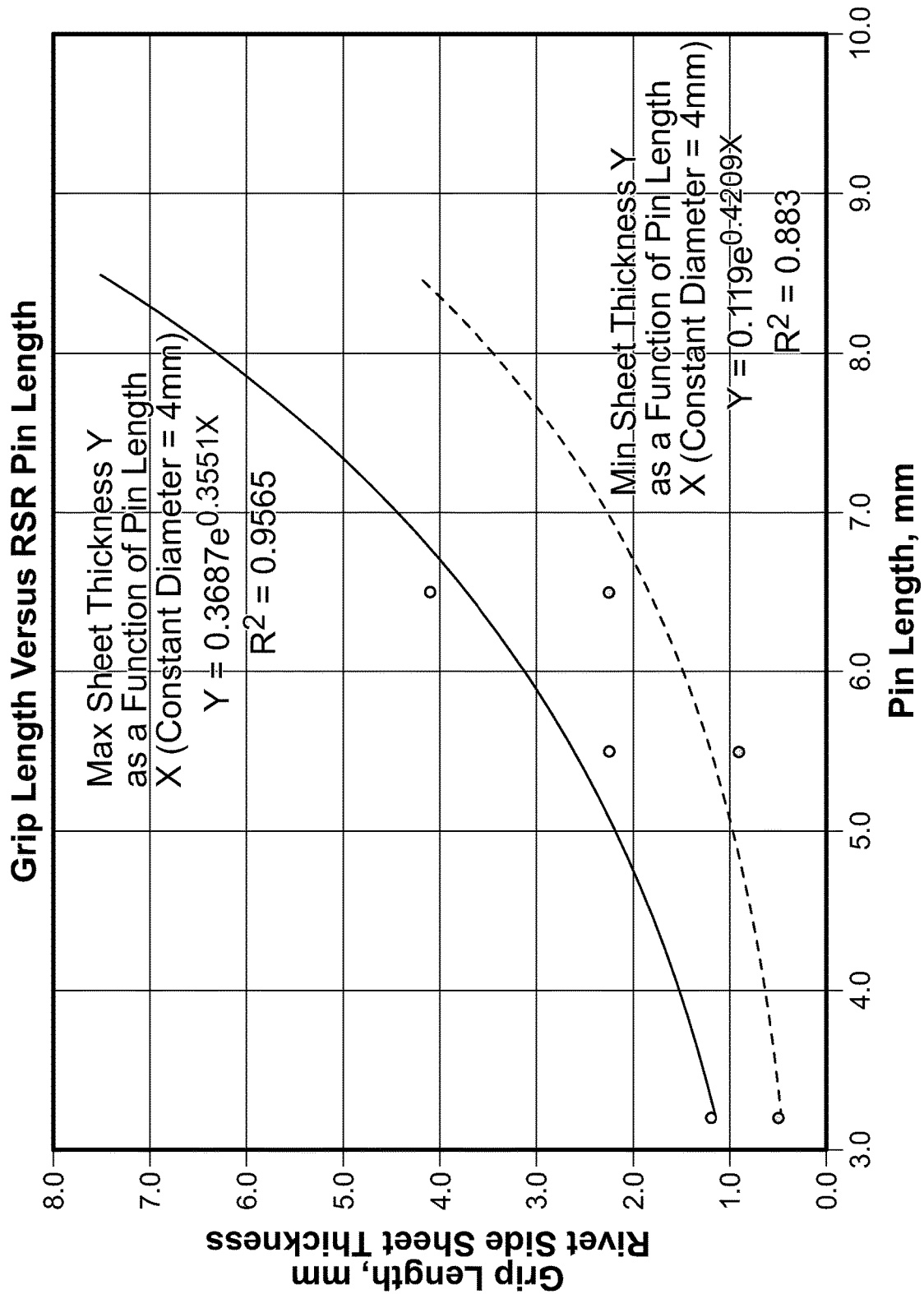
FIG. 51 is a graph of grip range vs. rivet pin length.

FIG. 51 shows a graph of grip range vs. rivet pin length based upon six plotted specimens prepared using a rivet 10 (FIG. 2), having a rivet diameter DR of 4 mm and pin lengths LP of 3.2 mm, 5.5 mm and 6.5 mm. Each of the rivets was tested to determine the maximum and minimum thickness T1 of the upper sheet 26 that could be used in the RSR process described above and still produce good welds, as shown in the table below.

| Pin Length | Min Grip | Max Grip |
| --- | --- | --- |
| 3.2 | 0.5 | 1.2 |
| 5.5 | 0.9 | 2.3 |
| 6.5 | 2.3 | 4.1 |

Based on this data, the grip range for the smallest pin length tested is (1.2−0.5)/3.2=21% of the pin length and (4.1−2.3)/6.5=27% for the largest pin length, so for this sample the grip range is greater than 20% of the pin length.

The plotted specimen data was subjected to regression analysis to determine the relationship between the maximum sheet thickness (here expressed by the variable y (same as TMAX referred to above) in terms of the rivet length x (same as RL referred to above). The relationship determined by this method was the maximum, $y=0.3687e^{0.3551x}$; where x is the rivet length RL and the statistical measure of fit of the equation to the curve, $R^2=0.9565$.

The same process was done for the minimum sheet thickness and y (same as TMIN referred to above) $=0.119e^{0.4209x}$; where x is the rivet length RL and the statistical measure of fit of the equation to the curve $R^2=0.883$.

Figure 52:
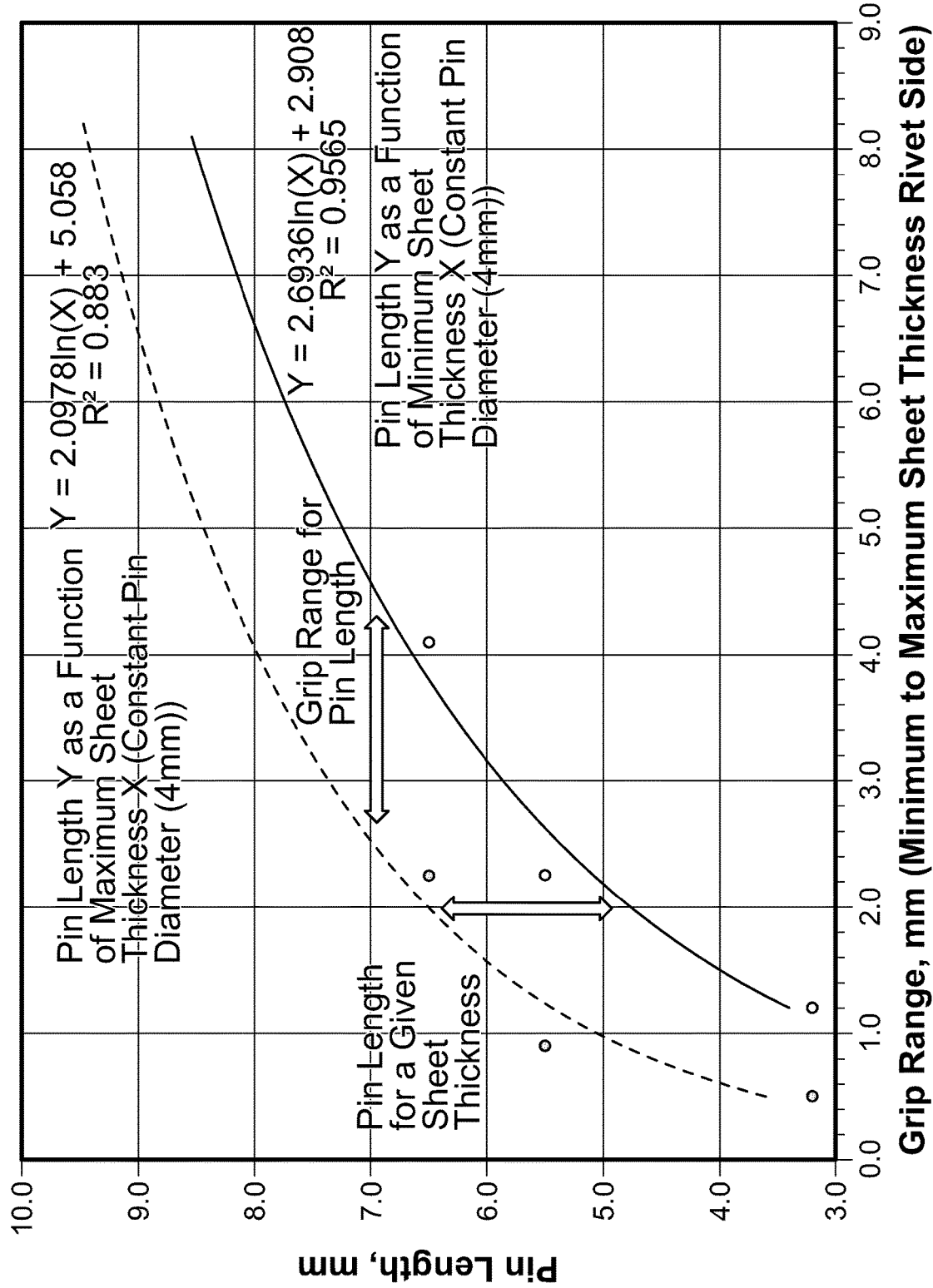
FIG. 52 is a graph of rivet pin length vs. grip range.

FIG. 52 shows a graph of rivet pin length vs. grip range based upon the same data used in producing FIG. 51. The plotted specimens were subjected to regression analysis to determine the relationship between the pin length y (same as RL) as a function of maximum thickness x (same as TMAX referred to above)=$0.3687e^{0.3551x}$; where the statistical measure of fit of the equation to the curve, $R^2=0.9565$. The pin length y associated with minimum sheet thickness, x (same as TMIN referred to above)=$0.119e^{0.4209x}$; where the statistical measure of fit of the equation to the curve $R^2=0.883$.

The technology disclosed herein is adaptable to join a plurality of different types of materials. In one example, a weld cell may process several different parts for an assembly. The technology of the present disclosure allows the joining of parts that have joints e.g., J1 using a pilot hole 28 (FIG. 2) and those without a pilot hole 28 with the same welding equipment W and rivet 10. For example, a rivet 10 having diameter DR=4 mm, pin length LR=5.5 mm) can be used to join piloted joints with an upper sheet 26 (FIG. 2) thickness over 3 mm but also make non-piloted joints using upper sheets 26 over 2 mm thick. The weld schedules between both joints will vary, but the overall welding equipment, feeder, and rivet can remain the same. As a result, a weld cell in a fabrication facility, such as an automobile manufacturing plant, may accommodate a variety of gauges of sheets and process conditions. Multiple materials may be joined using the disclosed technology in a single cell. For example, 3 mm CFRP (Carbon Fiber Reinforced Polymer) may be joined to steel, but also 2 mm aluminum to the same steel structure, in a different location. The same rivet, welding equipment, and feeder can process both types of joints. In the case of CFRP to steel, a pilot hole will be required, but the aluminum to steel joint can be done with either a pilot or pilot-less approach.

Rivet Feeding Apparatus

FIGS. 30-37 illustrate a welding and fastener (rivet) feeding and holding apparatus 1310. In an embodiment, the apparatus 1310 is a pinch welder utilized in connection with resistance spot weld rivets, e.g., (RSR 10 of FIGS. 1 and 33). In an embodiment, the welding apparatus 1310 includes upper and lower resistance welding arms 1312A, 1312B that are spaced apart and opposed to one another. The resistance welding arm 1312A includes a corresponding welding electrode 1314A (equivalent to E1 of FIG. 2), while the resistance welding arm 1312B includes a corresponding welding electrode 1314B (like E2 of FIG. 2).

Figure 31:
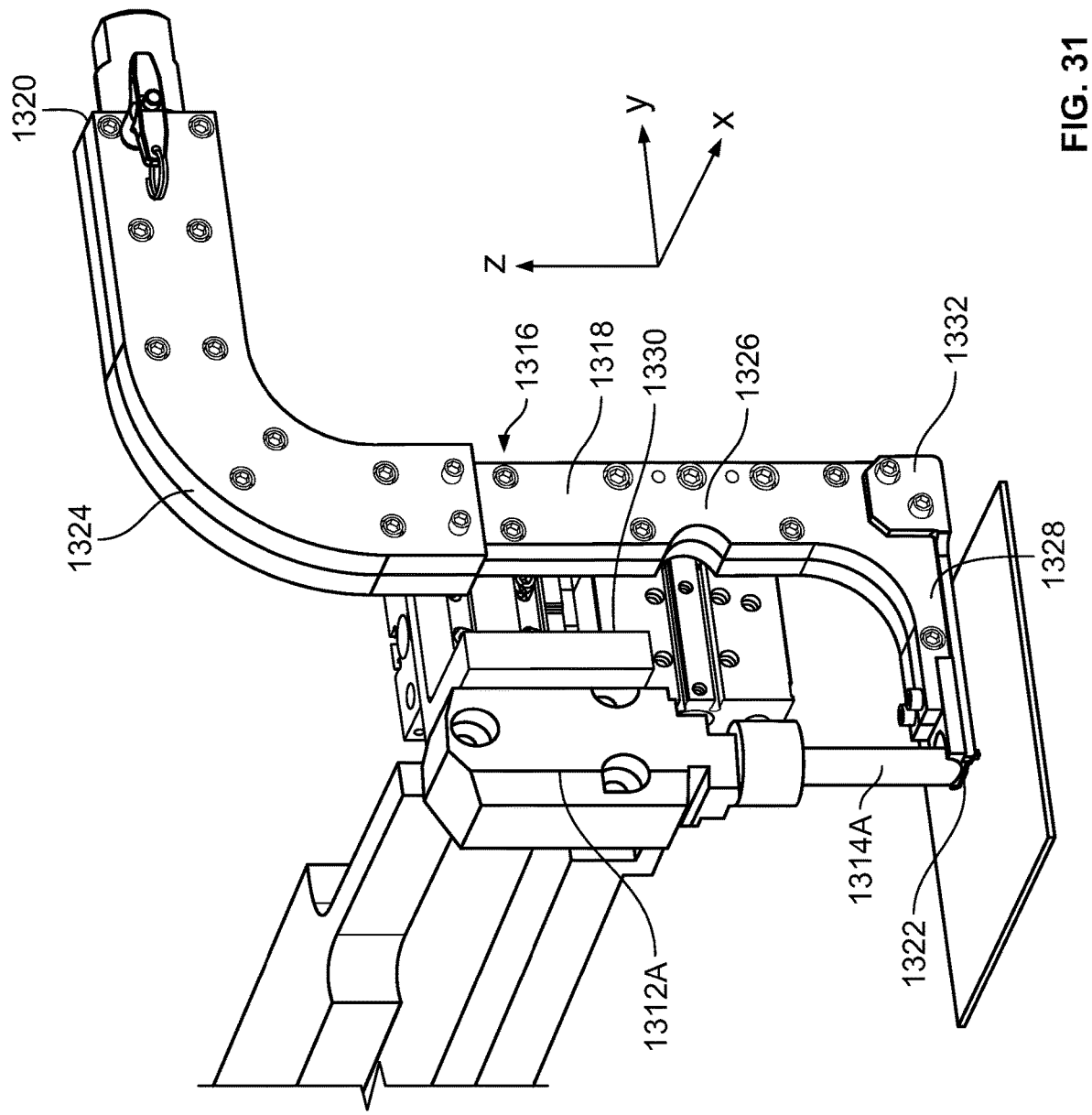
FIG. 31 is an enlarged perspective view of the rivet feeder of FIG. 30.

Referring to FIG. 31, an RSR feeder 1316 is attached to the resistance welding arm 1312A. In an embodiment, the RSR feeder 1316 has an "S" shape, and includes a feed track 1318 having a first end 1320 and a second end 1322, a top curved portion 1324 located proximate the first end 1320, an intermediate, vertical linear portion 1326, and a horizontal bottom portion 1328 located proximate the second end 1322. In an embodiment, the RSR feeder 1316 is attached to the resistance welding arm 1312A by mounting block 1330. In an embodiment, the RSR feeder 1316 includes a feed finger block 1332 attached to a bottom portion 1328 thereof. In an embodiment, the feed track 1318 includes slides X (not shown) Y and Z that enable X-Y-Z motion of the feed track 1318 relative to the resistance welding arm 1312A.

Figure 32:
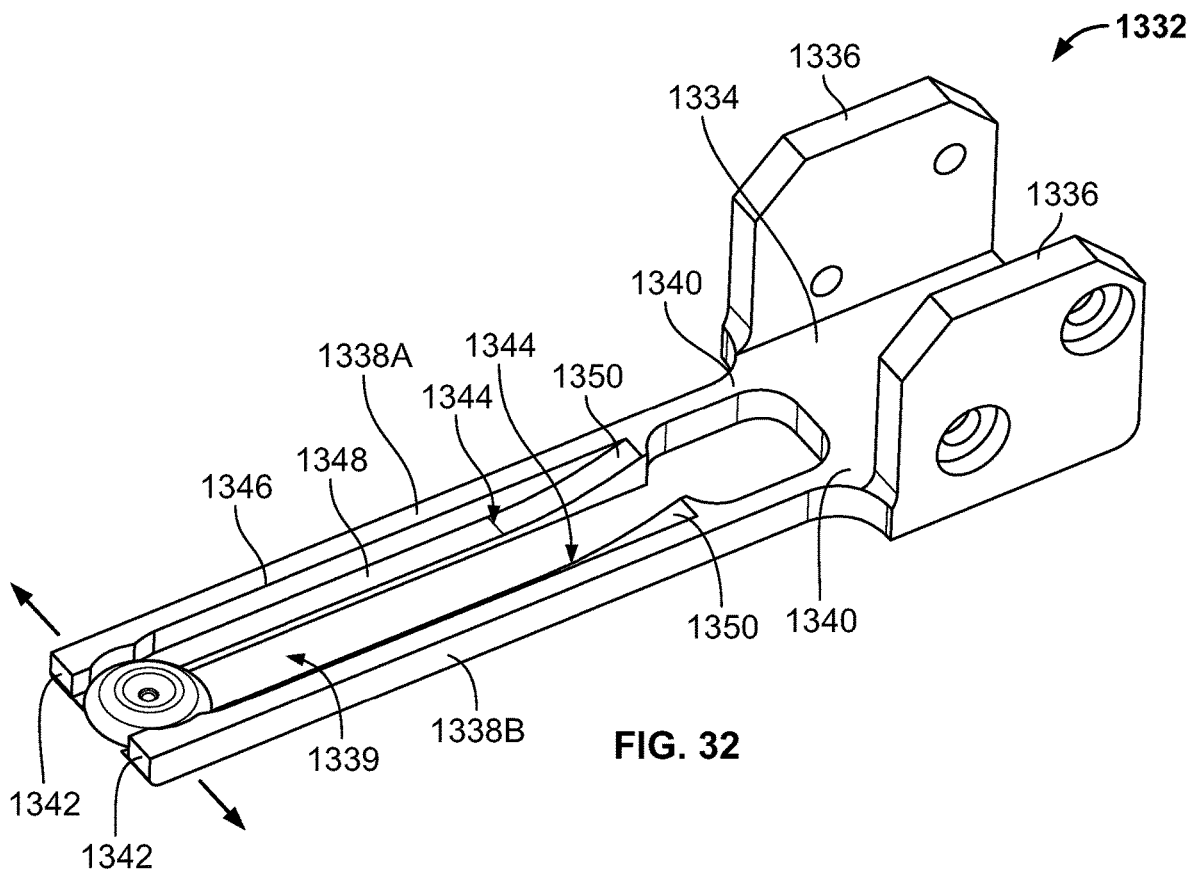
FIG. 32 is a perspective view of a feeding block employed by rivet feeder of FIG. 31.
Figure 33:
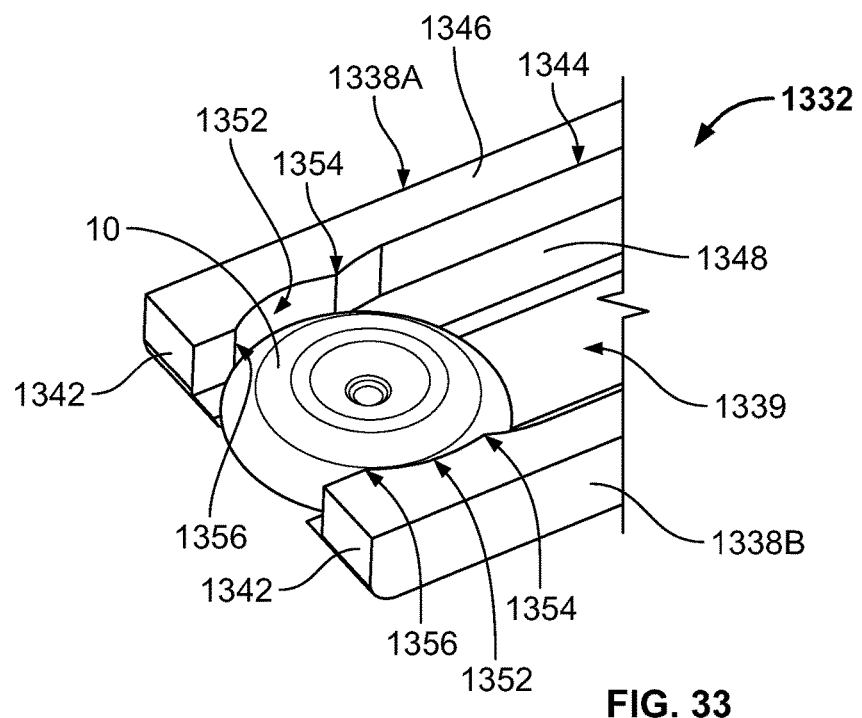
FIG. 33 is an enlarged view of the feeding block of FIG. 32, holding a rivet.
Figure 34:
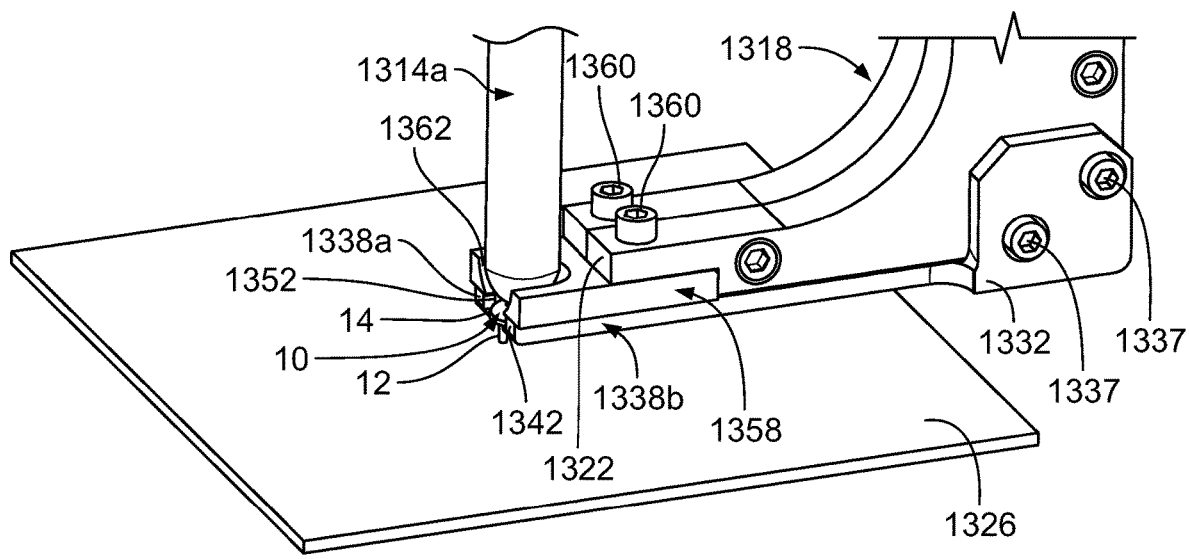
FIG. 34 is an enlarged view of the rivet feeder of FIG. 31 proximate the feeding block.

Referring to FIGS. 32 and 33, the feeding block 1332 includes a base 1334 having a pair of mounting brackets 1336 extending outwardly for mounting the feeding block 1332 to the bottom portion 1328 of the RSR feeder 1316 by fasteners 1337 (which are shown in FIG. 34). A pair of feed fingers 1338A, 1338B extends longitudinally from the base 1334 and are opposed and spaced apart from one another, forming a space 1339 therebetween. In an embodiment, and as to be further discussed in detail below, the feed fingers 1338A, 1338B are adapted to flex laterally and apart from one another. Each of the feed fingers 1338A, 1338B includes a first end 1340 integral with the base 1334 and a free, second end 1342 opposite the first end 1340. Each of the feed fingers 1338A, 1338B includes a track 1344 formed by an inner wall 1346 and a lower wall 1348. Each of tracks 1344 extends from proximate to the first end 1340 and to the second end 1342. The lower wall 1348 of each of the tracks 1344 begins with an inclined, ramped portion 1350 located proximate the first end 1340. Proximate to the second end 1342, the inner wall 1346 of each of the fingers 1338A, 1338B includes an inner guiding diameter portion 1352, which forms an anti-return point 1354 at one end thereof and a stop point 1356 at the other end thereof. In an embodiment, the width between the inner guiding diameter portions 1352 is narrower than the width between the inner walls 1346 of the fingers 1338A, 1338B. As discussed in greater detail below, the fingers 1338A, 1338B are adapted to receive and removeably retain a rivet 10 for RSR welding to make a joint J1, J2, J3, etc., as described above.

Figure 35:
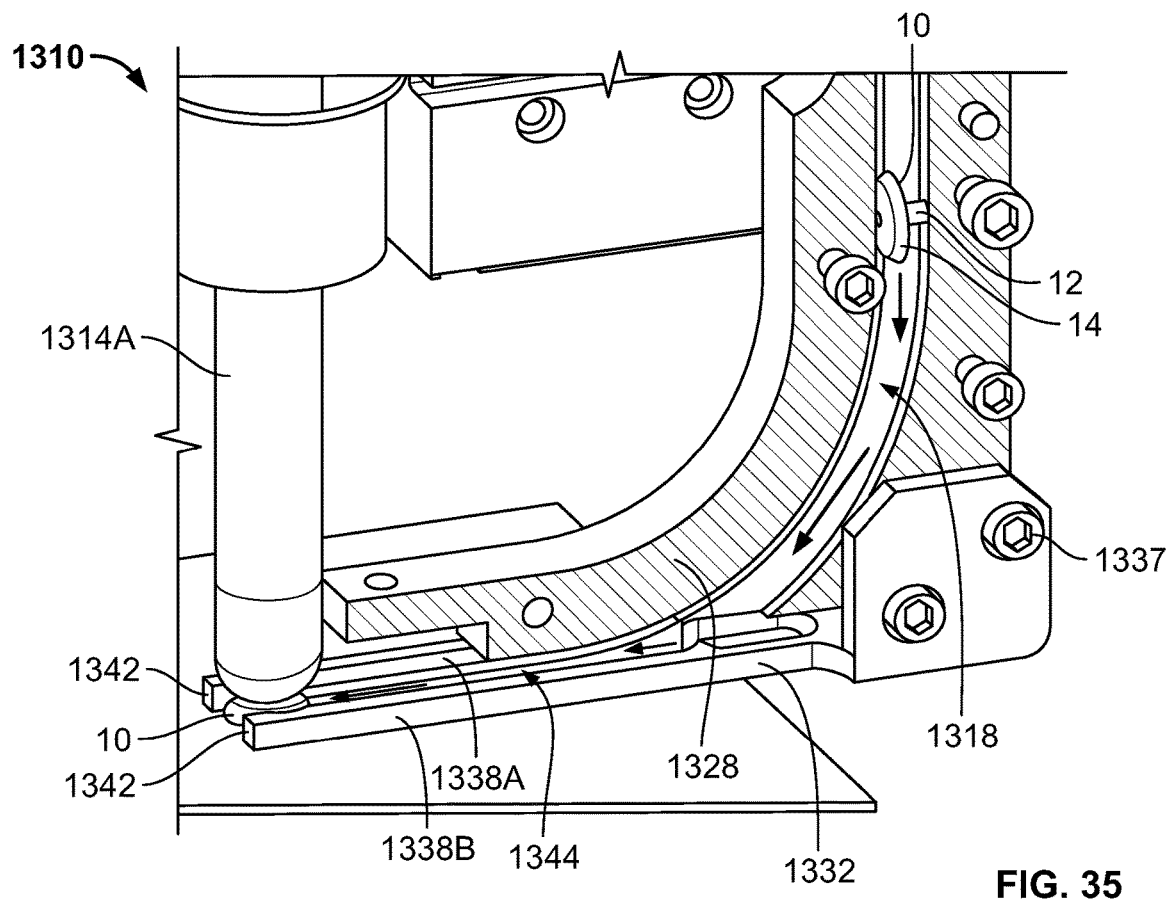
FIG. 35 is a partial cross-sectional view of the rivet feeder shown in FIG. 34.

Referring to FIGS. 31, 34 and 35, a finger cover 1358 is mounted to the second end 1322 of the feed track 1318 by fasteners 1360. The finger cover 1358 is positioned on top of the feed fingers 1338A, 1338B of the feeding block 1332 at the second ends 1342 thereof. In an embodiment, the finger cover 1358 includes a bowl-shaped cavity 1362 that is aligned with the guiding diameter portions 1352 of the feed fingers 1338A, 1338B, and is sized and shaped to receive a tip of the electrode 1314A.

As described above, the rivets 10, have a head 14 and a pin 12 extending therefrom. The rivets 10 are fed into the first end 1320 of the feed track 1318 with air pressure. The rivets 10 may be fed one at a time or in a stack of multiple rivets 10. The rivets 10 travel along the feed track 1318 through each of the portions 1324, 1326, 1328 of the feeder 1316, with the head 14 of the rivets 10 sliding along the track 1318 with the pin 12 positioned in an associated space within the track. When a rivet 10 reaches the bottom portion 1328, it travels on the track 1344 of the feed fingers 1338A, 1338B and stops proximate the ends 1342 of the feed fingers 1338A, 1338B. As shown in FIGS. 31 and 35, X-axis, Y-axis and Z-axis motions are used to move the feeder 1316 to position the rivet 10 under the tip of the welding electrode 1314A. Motion along the X, Y and Z axes may be provided by a linear slide/actuator. In an embodiment, the linear slide is pneumatic.

In an embodiment, the feed fingers 1338A, 1338B employ a momentum-based retention system. In this regard, the rivet 10 travels down the feed track 1318 at a relatively high velocity, and the momentum of the rivet 10 is such that when the rivet 10 engages the track 1344 of the feeding block 1332, it causes the feed fingers 1338A, 1338B to flex open laterally and outwardly as the rivet 10 passes the anti-return points 1354 on the fingers 1338A, 1338B. The momentum of the rivets is just high enough for the feed fingers 1338A, 1338B to flex open. The air pressure pushing the rivets 10 is controlled, such that the rivet 10 can pass through the anti-return points 1354 but not past the stop points 1356, since the width between the stop points 1356 is narrower and, thus, more force would be required to go past them. When the rivet 10 reaches the stop points 1356, it is nestled within the guiding diameter portions 1352 of the feed fingers 1338A, 1338B, and is in position and ready to be fed under the electrode 1314A by the X, Y and Z slides. The electrode 1314A of the welding arm 1312A is then moved down to pin the rivet 10 to the stack-up 22 (FIG. 2) as described above. After the rivet 10 is pinned down, the RSR feeder can then be retracted along the y axis such that the feed fingers 1338A, 1338B are pulled clear of the rivet 10, pulling the RSR feeder out of the circuit prior to current being supplied to the electrodes 1314A and 1314B. Once the rivet 10 is welded to the stack-up 22, the next rivet 10 may then be fed to the feed fingers 1338A, 1338B by pressurized air and the cycle repeats.

The apparatus 1310 may accommodate rivets 10 having various pin lengths LR without the need to change the feed track 1318. The apparatus 1310 may be used for resistance spot weld rivets and for other types of rivets and fasteners. In an embodiment, the feed fingers 1338A, 1338B may utilize a detent or a leaf spring that provides an anti-return feature.

The rivet 10 may have a pin 12 with length LP permitting the feeder to hold the rivet 10 and insert the pin 12 into a pilot hole 28 in the upper sheet 26, lower the pin 12 toward the lower sheet 24 until the tip 16 of the rivet contacts the lower sheet 24. The pin length LP preferably allows an electrode 1314A to pin the fastener against the lower sheet 24 to be welded, while still having clearance to withdraw the feeder fingers 1338A, 1338B from the rivet 10 after it is pinned. More particularly, the pin length LP must be greater than or equal to the thickness T1 of the upper layer 1326+the thickness of the feeder fingers below the bottom surface of the cap+a clearance allowing withdrawal of the fingers plus a mechanical clearance. In one example, the pin length LP may be the thickness T1+1.5 mm. Once the electrode 1314A pins the rivet 10 in place, the feeder fingers 1338A, 1338B may be withdrawn from a position holding the rivet 10 to a position free of the rivet 10 and out of electrical continuity with it. Once removed from electrical contact with the rivet 10, the electrodes 1314A, 1314B can carry the electrical current without the current following a conductive path through the feeder fingers 1338A, 1338B. In addition, removing the feeder fingers 1338A, 1338B clear before welding, avoids their contamination by weld splatter and exudate from the weld area.

The present disclosure reveals a compact rivet feeding/holding apparatus that fits within a limited space and does not employ complicated actuators and mechanisms, as well as an apparatus that provides robust means to hold a rivet in place that is not sensitive to environmental factors, such as dirt, carbon build-up, clogging, dust, and sparks.

FIG. 36 shows the rivet 10 held between fingers 1338A and 1338B and pressed against lower sheet 1324 by electrode 1314A. The pin 1312 extends into pilot hole 1328 in sheet 1326, which has a thickness T1. The rivet length LR is taken up by the finger thickness FT, the clearance C1, and the thickness T1. The clearance allows the fingers 1338A, 1338B to be withdrawn after the rivet 10 is captured between the lower sheet 1324 and the electrode 1314A. Without a clearance C1, the fingers 1338A, 1338B would be pinched/captured between the rivet head 14 and the upper sheet 1326, preventing the fingers from being withdrawn while leaving the rivet 10 in position, as shown. The rivet length LR and the diameter DR should be selected to accommodate being held, as shown, but also to fill to the intended degree the pilot hole 1328 of diameter DP when compressed to a position where the head 14 is pressed against the upper layer 1326.

Figure 37:
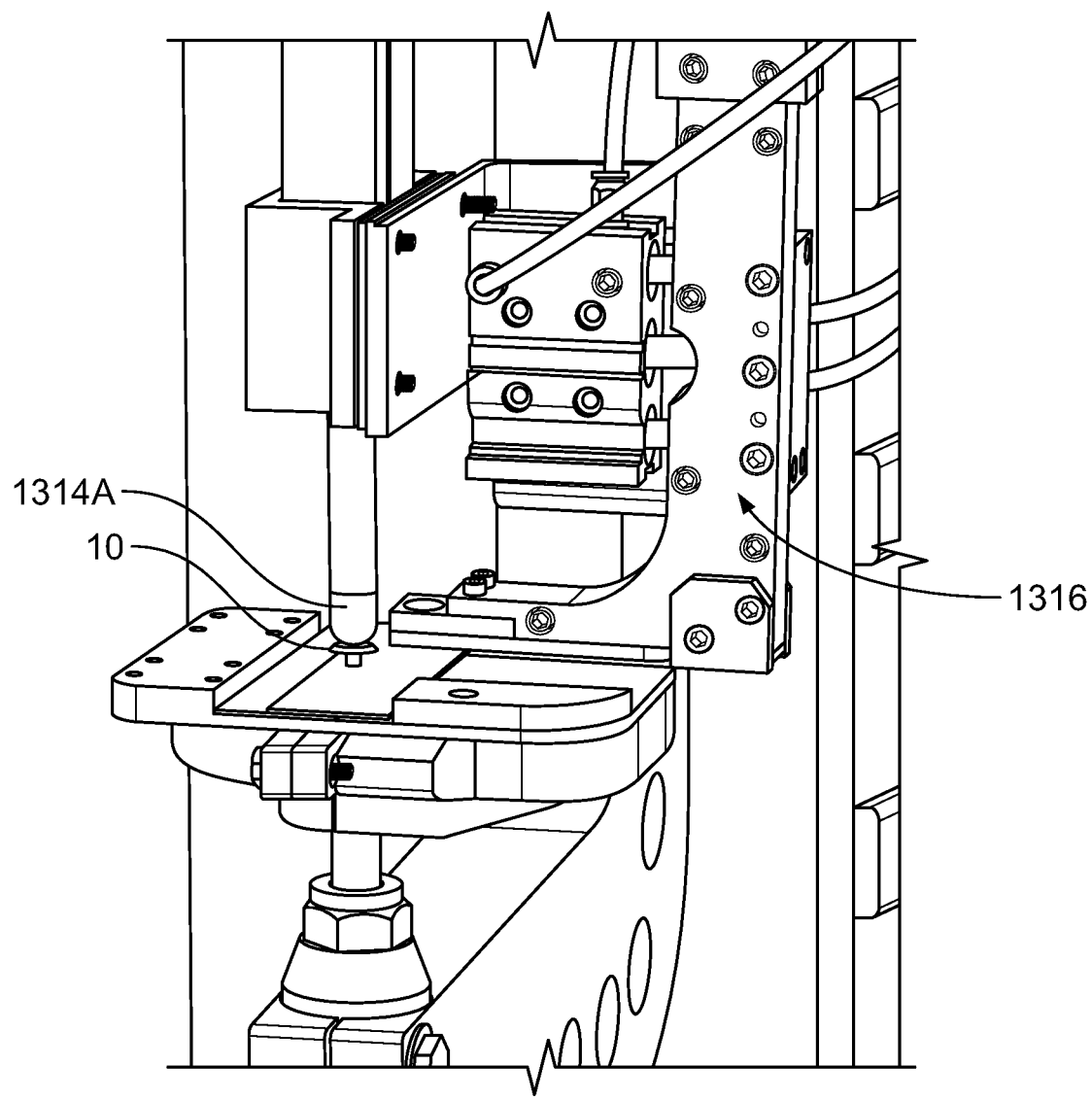
FIG. 37 is a side view of the rivet feeder of FIG. 31 in a retracted position.

FIG. 37 shows the rivet 10 clamped by the electrode 1314A with the fastener holder 1316 withdrawn to a retracted position, such that welding is ready to take place without involving fastener holder 1316 in the current flow.

Joint Strength

Figure 38:
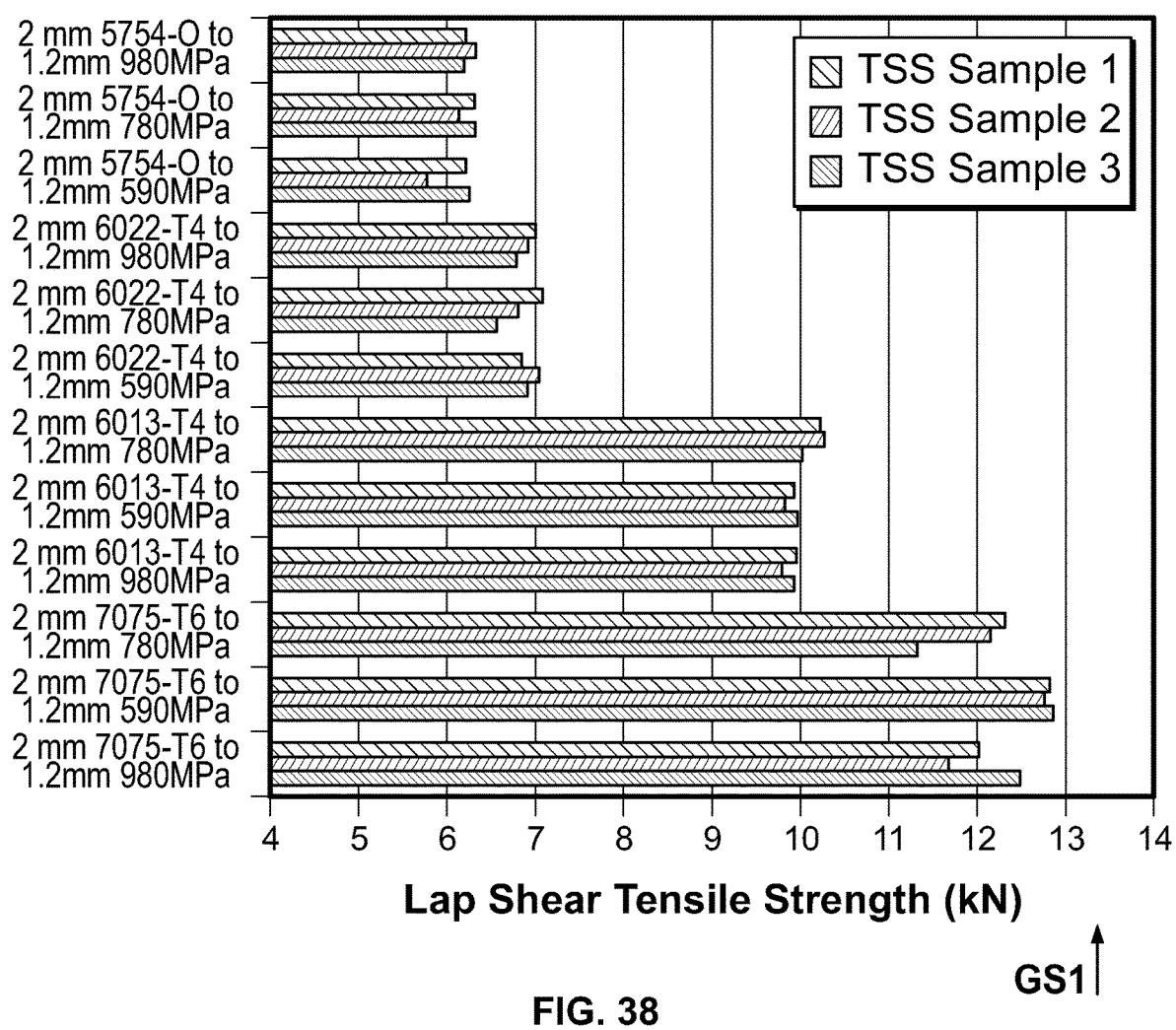
FIG. 38 is a graph of lap shear tensile strength for a plurality of joints formed in accordance with an exemplary embodiment of the present disclosure.
Figure 39:
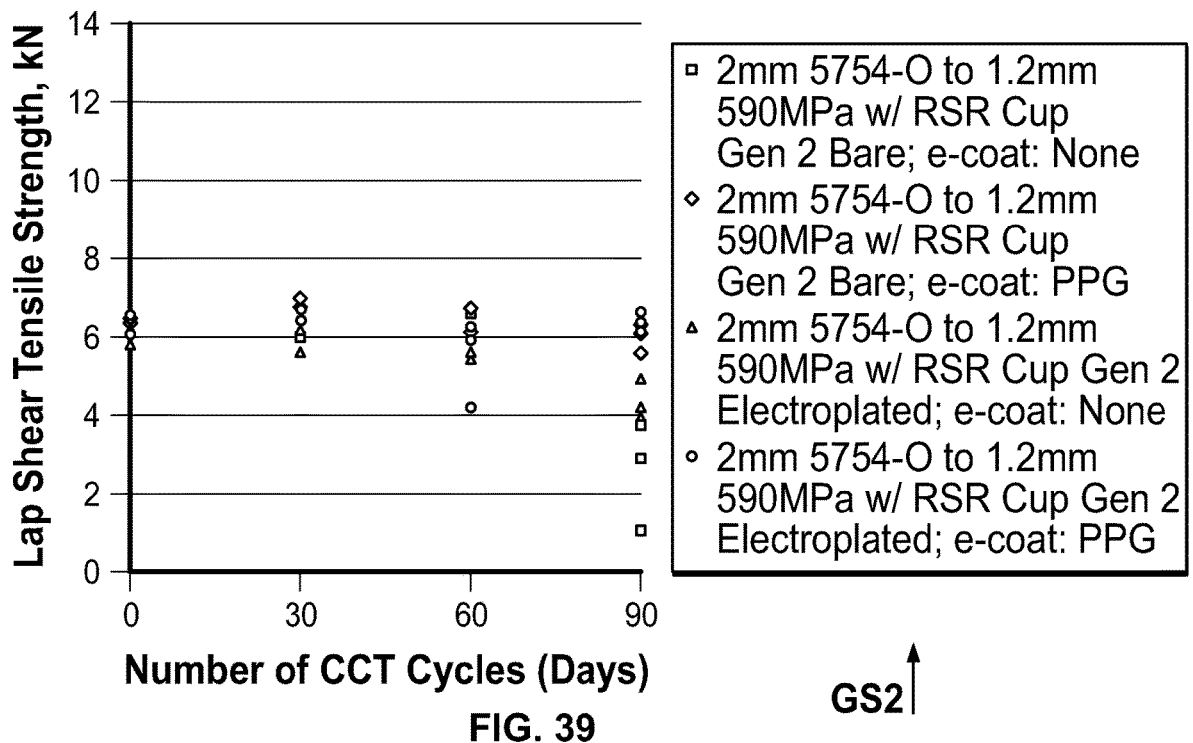
FIGS. 39-42 are graphs of lap shear tensile strength for a plurality of joints formed in accordance with an exemplary embodiment of the present disclosure after exposure to corrosive testing cycles.
Figure 40:
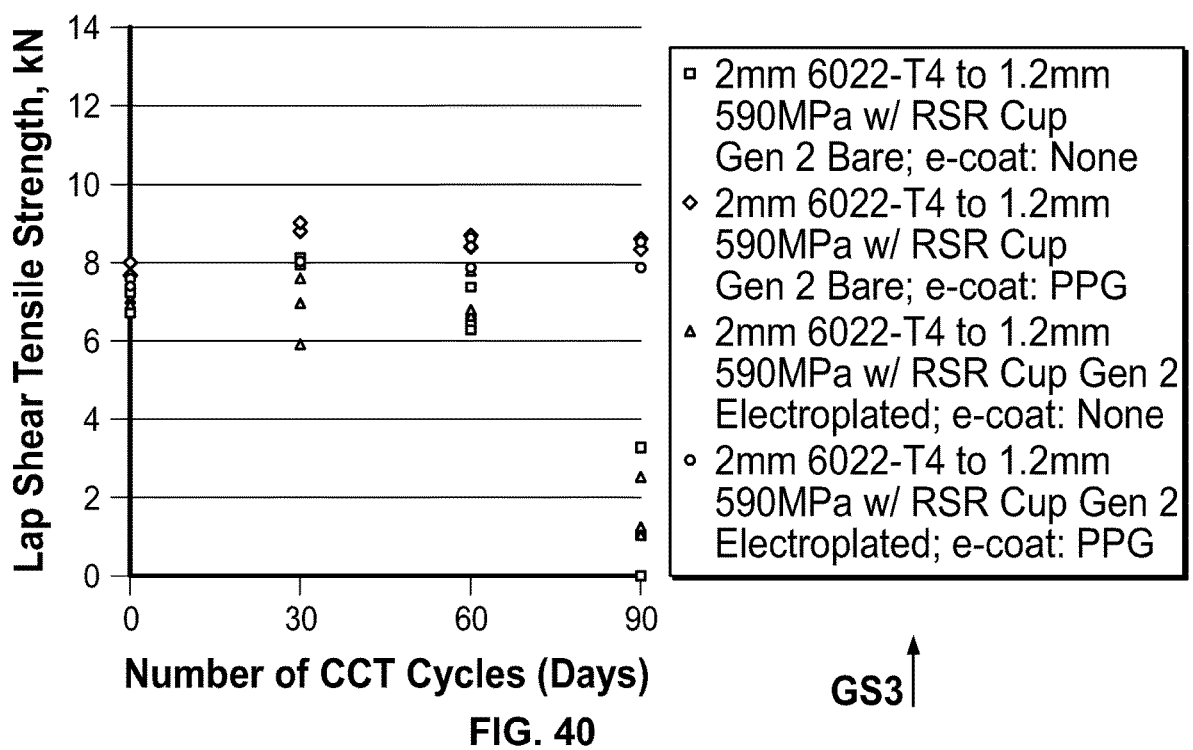
Figure 41:
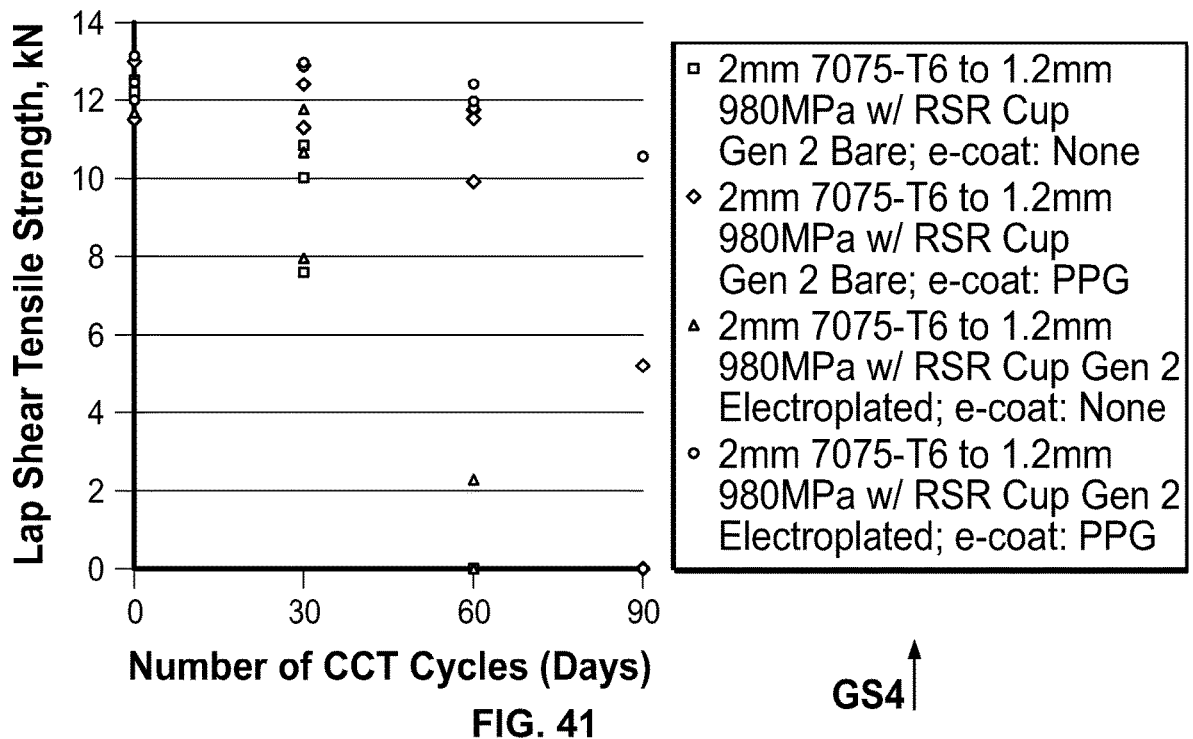
Figure 42:
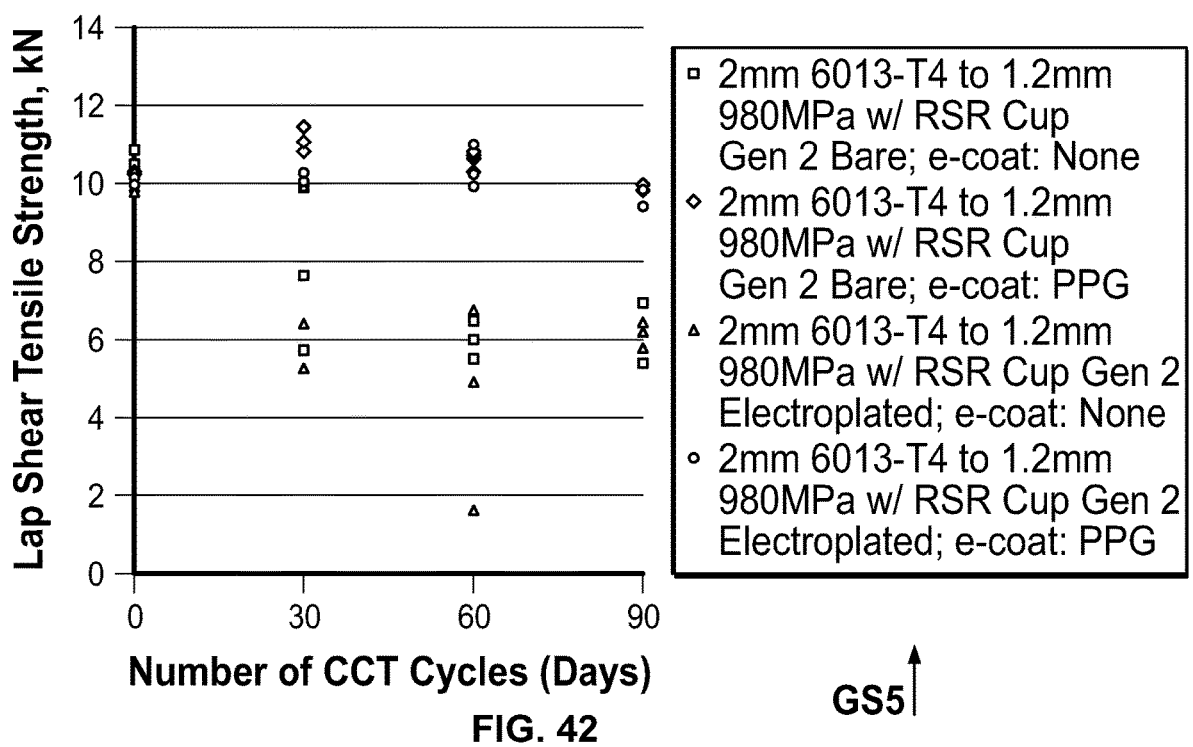

FIG. 38 shows a graph GS1 of lap shear tensile strength for a plurality of joints formed in accordance with the present disclosure from two sheets of different materials as shown on the Y axis, the resultant Lap Shear strength being shown in the X direction. In each instance, a sheet of aluminum 2 mm thick of the specific alloy shown is paired with a sheet of steel 1.2 mm thick as identified and joined by RSR. The TSS ranged from 6 to 14 k and the CTS ranged from 4 to 6 kN Corrosion Resistance FIGS. 39-42 show graphs GS2, GS3, GS4, GS5, respectively, of lap shear tensile strength for a plurality of joints formed in accordance with the present disclosure prior to and after exposure to corrosive testing cycles of 30, 60 and 90 days duration. The legends identify the specific combination of alloy sheets in the joint and any anti-corrosion treatment that was applied to the rivet and/or sheets, i.e., none, e-coat, PPG and electroplated. If the rivet 10 and conjoined sheets, e.g., 24, 26 (FIG. 2) are both uncoated, this provides the least amount of protection against corrosive exposure. If both the rivet 10 and conjoined sheets, e.g., 24, 26 are coated this would provide increased protection against corrosive exposure. An uncoated rivet signifies that the rivets were bare steel. A coated rivet was electroplated with zinc prior to welding. After the joints are fully assembled, they were tested in the as-welded condition and after a phosphating and e-coat procedure that is routinely done on all body in white assemblies in the production of vehicles, such as automobiles and trucks. For each day (24 hours) of testing, the following schedule was followed.

| Procedure | Exposure | Duration |
| --- | --- | --- |
| Salt Spray | 50 C. | 0.17 |
| Drying | 60 C., <30% RH | 2.58 |
| Wet | 60 C., 95% RH | 1.25 |
| Drying | 60 C., <30% RH | 2.67 |
| Wet | 60 C., 95% RH | 1.33 |
| Drying | 60 C., <30% RH | 2.67 |
| Wet | 60 C., 95% RH | 1.33 |
| Drying | 60 C., <30% RH | 2.67 |
| Wet | 60 C., 95% RH | 1.33 |
| Drying | 60 C., <30% RH | 2.67 |
| Wet | 60 C., 95% RH | 1.33 |
| Drying | 60 C., <30% RH | 2.67 |
| Wet | 60 C., 95% RH | 1.33 |
| Totals | | 24.00 |

The testing showed that 5754-O temper (FIG. 39) and 6022-T4 temper (FIG. 40) displayed good strength through 60 cycles without E-coat and 90 cycles with E-coat. 7075-T6 temper (FIG. 41) and 6013-T4 temper (FIG. 42) strength levels decreased at 30 cycles without E-coat and at 90+ cycles with E-coat.

FIGS. 43-48 show photographs P1-P6, respectively, of joints made in accordance with the present disclosure after corrosion testing for 30 days.

Figure 43:
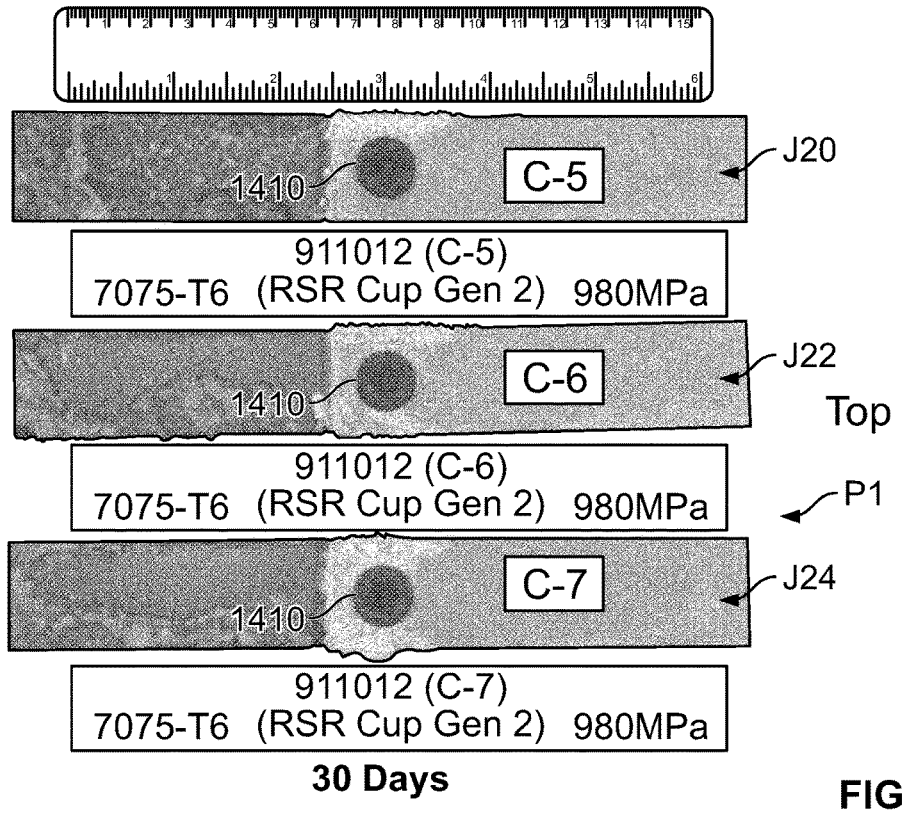
FIGS. 43-48 are photographs of RSR joints made in accordance with the embodiments of the present disclosure after corrosion testing.
Figure 44:
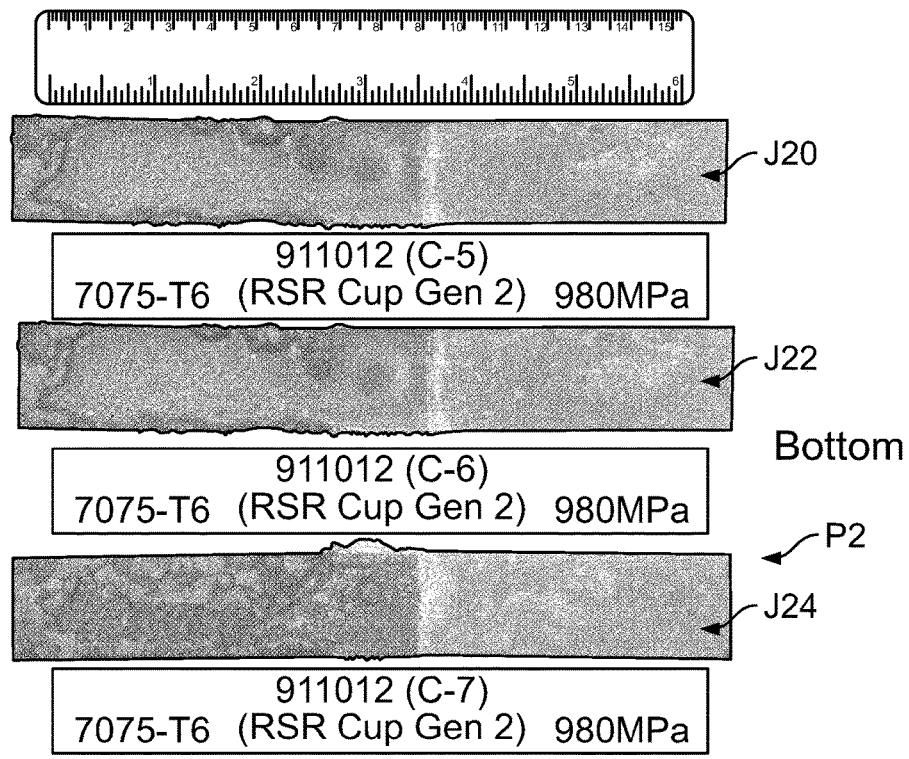
Figure 45:
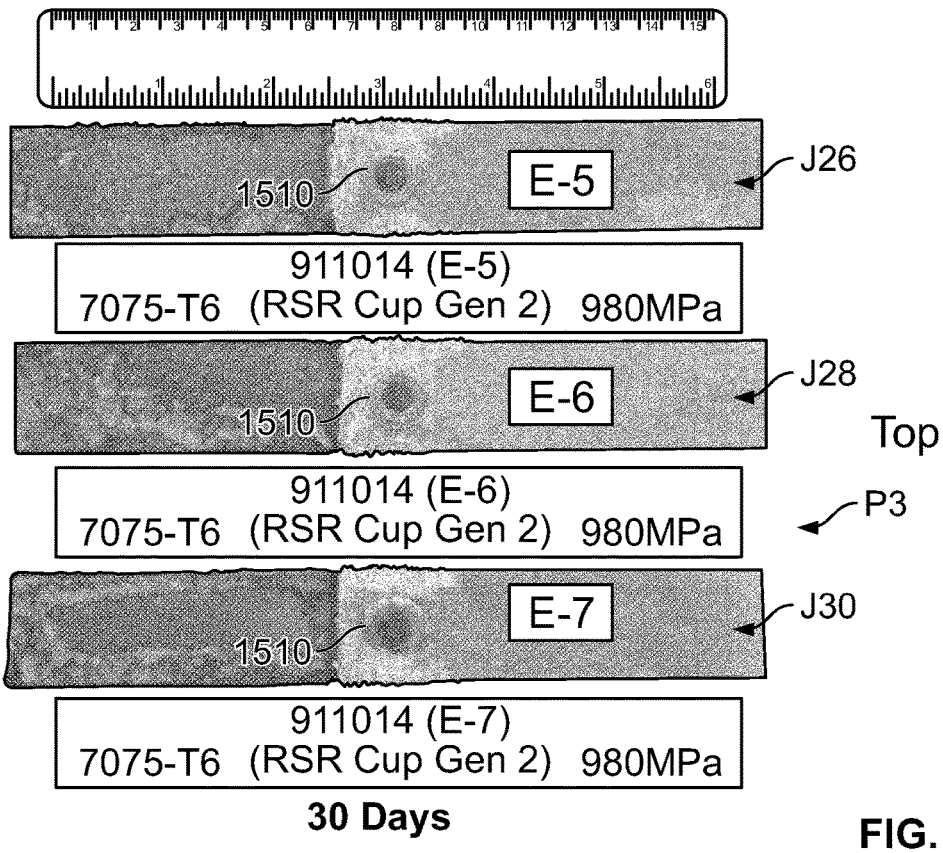
Figure 46:
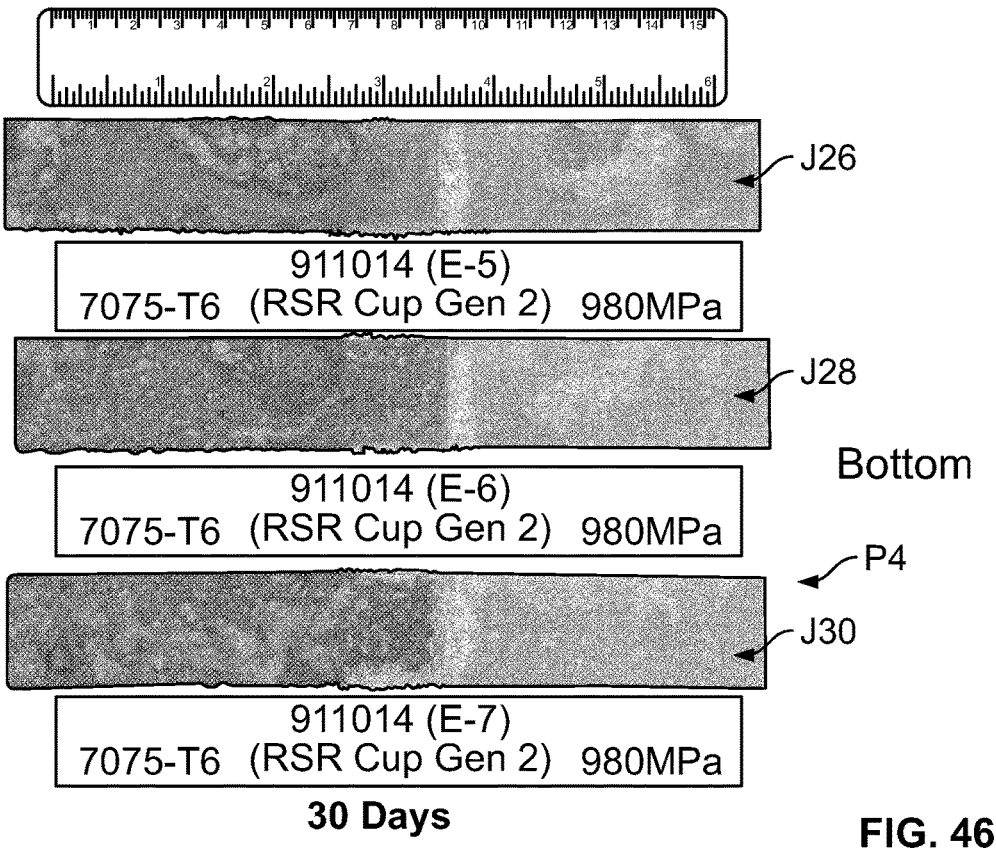
Figure 47:
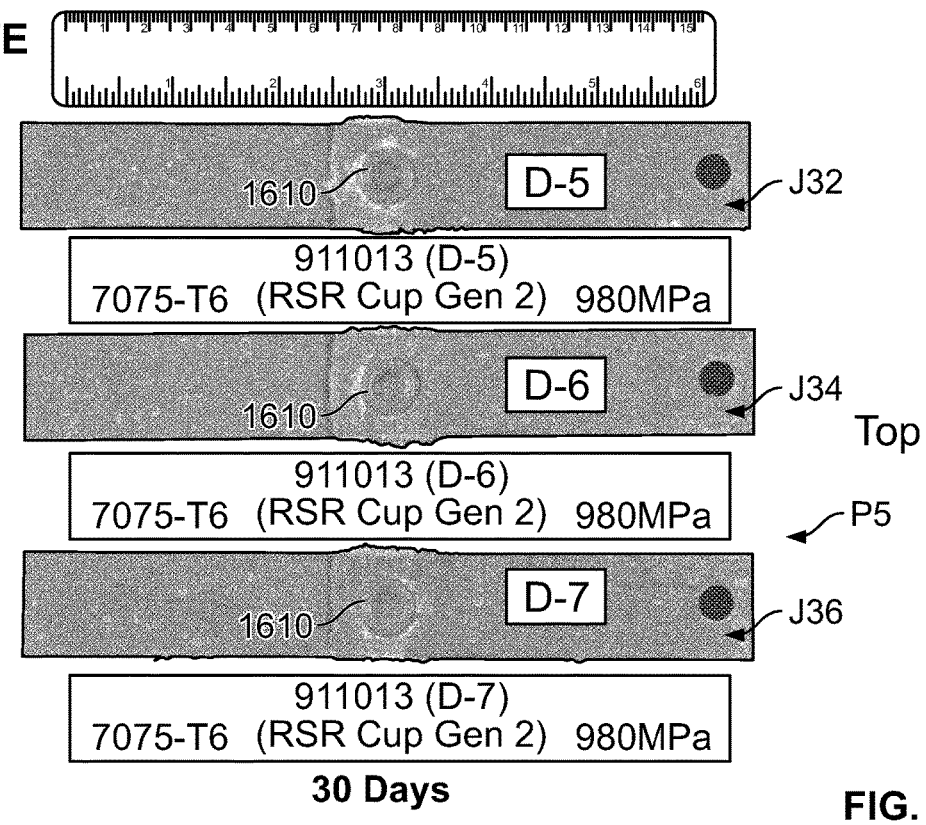
Figure 48:
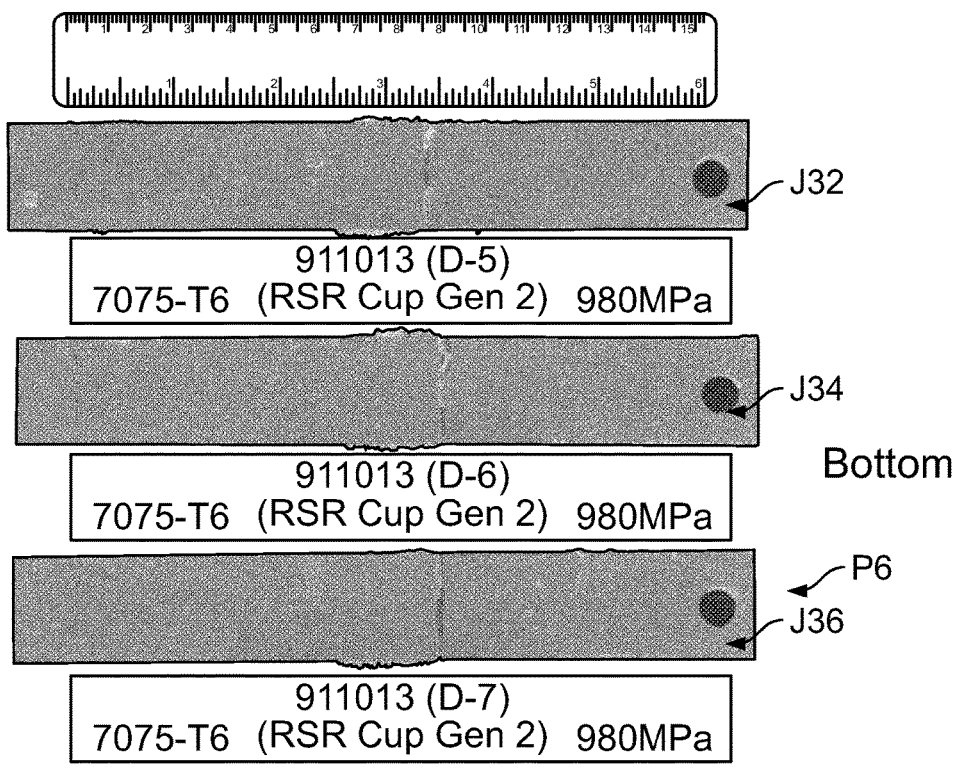

FIGS. 43 and 44 show joints J20-J24 utilizing an uncoated rivet 1410 made from 1006 grade steel. FIGS. 45 and 46 show joints J26-J30 utilizing a rivet 1510, made from 1006 grade zinc electroplated steel. FIGS. 47 and 48 show joints J32-J36 utilizing a rivet 1610, made from 1006 grade zinc electroplated steel that also had an E-coat obtained commercially from PPG processing (ppg.com, ppgecoat.com). FIGS. 43, 45 and 47 show the top of the joints, i.e., with the rivets 1410, 1510 and 1610 visible, whereas FIGS. 44, 46 and 48 show the other side of the joint, where the rivets 1410, 1510 and 1610 are not visible. In each of the joints J20-J30, a strip of 7075 Aluminum in T6 temper was joined to a strip of 980 MPa steel.

FIG. 49 shows a cross-section of a joint J40. A steel rivet 1410 having a head diameter of 14 mm, a pin 1412 of diameter DR of 4.0 mm prior to compression, an initial (pre-deformed) rivet length LR (See FIG. 1) of 5.5 mm is used to join an aluminum upper sheet 1426 having a thickness T1 of 2.0 mm and a pilot hole having a diameter DP of 5 mm to a 780 MPa steel lower sheet 1424 with a thickness T2 of 1.2 mm. As described above, the pin 1412 mushrooms at the end 1416 when the weld 1430 is formed, forming an hourglass shape. In this embodiment, an upper bulge 1412B of the pin 1412 is also formed during compression and extends over the upper sheet 1426.

FIG. 50 shows a cross-section of a joint J41. A steel rivet 1510 having a head diameter of 14 mm, a pre-compressed pin 1512 of diameter DR of 4 mm, an initial (pre-deformed) rivet length LR (See FIG. 1) of 5.5 mm is used to join an aluminum upper sheet 1526 having a thickness T1 of 3.2 mm, with a pilot hole having a diameter DP of 6 mm to a 780 MPa steel lower sheet 1524 with a thickness T2 of 1.2 mm. The pin 1512 mushrooms at the end 1516 when the weld 1530 is formed. In this embodiment, an upper edge of the pilot hole 1528 is rounded by the deformed rivet 1510 as it is pressed into and welded to the lower sheet 1524, resulting in a symmetrical, mating, arcuate cross-sections for the pin 1512 and the sheet 1526 proximate the pilot hole 1528.

It will be understood that the embodiments described herein are merely exemplary and that a person skilled in the art may make many variations and modifications without departing from the spirit and scope of the claimed subject matter. All such variations and modifications are intended to be included within the scope of the appended claims.

We claim:

1. A method for fastening a first material to a second electrically conductive material using electrical resistance welding, comprising:
   (A) forming a pilot hole in the first material;
   (B) placing the first material over the second material;
   (C) infusing an adhesive in the pilot hole;
   (D) placing an electrically conductive rivet with a head having a downwardly extending peripheral lip at least partially defining a cavity under the head and a pin that is weldable to the second material in electrical contact with the second material by extending the pin through the adhesive and the pilot hole, the rivet having at least one vent formed annularly within the peripheral lip of the head;
   (E) applying an electrical potential across the rivet and the second material, inducing a current to flow through the rivet and the second material; and
   (F) urging the rivet towards the second material, the step of applying causing resistive heating of the rivet, the current causing the rivet to weld to the second material forming a weld, the step of urging causing compression of the pin, the head capturing material extruded from the pilot hole during the steps of placing the fastener in electrical contact with the second material, applying the electrical potential, urging and forming the weld.

2. The method of claim 1, further comprising the step of venting material from under the head through the at least one vent during the step of applying.

3. The method of claim 1, wherein the material extruded includes the adhesive and is projected through the at least one vent in a direction parallel to the upper sheet.

4. The method of claim 1, wherein the rivet pin has a diameter smaller than the pilot hole before the step of applying and the pin expands radially within the pilot hole during the step of urging, the step of urging being conducted in a continuous manner.

5. The method of claim 4, wherein the pin of the rivet expands radially at the tip thereof to a greater extent than at portions of the pin distal to the tip.

6. The method of claim 5, wherein the radial expansion of the tip extends between the first material and the second material.

7. The method of claim 6, wherein the radial expansion of the tip causes the first material to be pushed toward the head.

8. The method of claim 7, wherein the pushing of the first material causes the first material to enter into the cavity under the head.

9. The method of claim 8, wherein the first material pushed into the cavity keys into a wall dividing the cavity constraining relative rotation of the first material relative to the head.

10. The method of claim 1, further including steps of gripping the rivet in a gripper, positioning the rivet in the pilot hole below a welding electrode, moving the welding electrode down on the rivet, pinning the rivet between the electrode and the bottom sheet, and withdrawing the gripper from the rivet before the step of applying the current.

11. The method of claim 1, wherein the rivet has a grip range ≥20% of the pin length.

12. The method of claim 1, wherein the tolerance in pilot hole diameter is <9%.

13. The method of claim 1, wherein the tolerance in placement position of the rivet during the step of placing in the pilot hole is between 1.2 and 1.8 times a diameter of the pin.

14. The method of claim 1, wherein the adhesive is a dielectric and further comprising the step of controlling the direction of current flow by interposing the adhesive between the rivet and the first material during the step of applying.

15. The method of claim 1, wherein the position of the pin during the step of placement has an off-center tolerance range of at least 1 mm where the pilot hole has a diameter in the range of 3.6 to 12.6 mm and the pin diameter is in the range of 3.0 to 7.0 mm.

16. A method for fastening a first electrically conductive material to a second electrically conductive material using electrical resistance welding, comprising:
   (A) placing the first and second materials together in physical and electrical contact, the first material having a lower melting point than the second material;
   (B) placing an electrically conductive rivet that is weldable to the second material and which has a higher melting point than the first material in electrical contact with the first material to form an electrically conductive stack inclusive of the rivet, the first material and the second material, the rivet having a head and a pin extending from the head, the head having a downwardly directed peripheral lip at least partially defining a cavity under the head and at least one vent formed annularly within the peripheral lip of the head, the pin having a tip distal to the head;
   (C) applying an electrical potential across the stack, inducing a current to flow through the stack and causing resistive heating, the resistive heating causing a softening of the first material;
   (D) urging the rivet through the softened first material toward the second material and into contact with the second material, further urging the fastener after contacting the second material resulting in expanding the tip of the fastener in a radial direction, the expansion of the tip pushing the first material toward the head; and
   (E) after the pin contacts the second material, welding the rivet to the second material;
   (F) capturing an upwelled portion of the first material that is displaced when the rivet is urged through the first material and welded to the second material, the upwelled portion being captured within the cavity in the head; and
   (G) venting the upwelled portion of the first material through the at least one vent of the head of the rivet.

17. A rivet for fastening a first material having a pilot hole therein to a second material that is electrically conductive using electrical resistance welding, comprising:
   a head with a downwardly directed peripheral lip and at least one vent formed annularly within the peripheral lip of the head, a pin extending from the head and having a tip at an end distal to the head, the pin capable of being inserted through the pilot hole when the first and second materials are placed in a stack, the rivet being formed from electrically conductive material and capable when subjected to an electrical potential applied across the rivet and the second material of conducting an electrical current that passes through the second material, the current causing resistive heating of the rivet, the rivet being capable of being welded at the tip to the second material and capturing the first material between the head and the second material after the tip is welded to the second material with the peripheral lip contacting the first material, the head being capable of capturing material extruded from the pilot hole when the rivet is welded, wherein a portion of the pin distal to the head is capable of assuming a cross-sectional area greater than a cross-sectional area of another portion of the pin located proximate to the head, and the head is further capable of inducing flow of the material extruded when the rivet is welded along the surface of the shaft in a direction from the portion of the pin distal to the head to the another portion of the pin proximate to the head toward and along a bottom surface of the peripheral lip.

18. The rivet of claim 17, wherein the pin has a vent groove extending along at least a portion of its length.

19. The rivet of claim 18, wherein the pin has a length and diameter sufficient to fill a pilot hole having a diameter in a range of 1.2 to 1.8 times the diameter of the pin such that the head is adapted to contact the first material.

20. The rivet of claim 19, wherein the peripheral lip includes a curve having a radius R.

21. A joint, comprising:
(A) an upper sheet having a pilot hole therein;
(B) a lower sheet of electrically conductive material;
(C) a rivet with a head, a peripheral lip, at least one vent formed annularly within the peripheral lip, and a pin that is welded to the lower sheet by electrical resistance welding, the pin extending through the pilot hole and welded to the lower sheet, the head pressing against the upper sheet clamping the upper sheet between the head and the lower sheet; and
(D) an adhesive disposed between the rivet and the upper sheet.

22. The joint of claim 21, wherein the pin has a tip distal to the head that is welded to the lower sheet.

23. The joint of claim 22, wherein the pin has an hourglass shape between the head and the tip.

24. The joint of claim 23, wherein the upper sheet in the area of the pilot hole conforms to the hourglass shape of the pin in a complementary fashion.

25. The joint of claim 21, wherein the diameter of the weld formed between the pin and the lower sheet has a diameter greater than 1.5*sqrt (the thickness in millimeters of the lower sheet).

* * * * *